United States Patent
Ji et al.

(10) Patent No.: US 11,019,620 B2
(45) Date of Patent: *May 25, 2021

(54) APPARATUS AND METHOD FOR INTER-BAND PAIRING OF CARRIERS FOR TIME DIVISION DUPLEX TRANSMIT- AND RECEIVE-SWITCHING AND ITS APPLICATION TO MULTIPLEXING OF DIFFERENT TRANSMISSION TIME INTERVALS

(71) Applicant: QUALCOMM Incorporated, San Diego, CA (US)

(72) Inventors: Tingfang Ji, San Diego, CA (US); John Edward Smee, San Diego, CA (US); Joseph Binamira Soriaga, San Diego, CA (US); Naga Bhushan, San Diego, CA (US); Peter Gaal, San Diego, CA (US); Alexei Yurievitch Gorokhov, San Diego, CA (US); Krishna Kiran Mukkavilli, San Diego, CA (US); Peter Ang, San Diego, CA (US); Michael Alexander Howard, Cardiff, CA (US); Rotem Cooper, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1562 days.

This patent is subject to a terminal disclaimer.

(21) Appl. No.: 14/567,993

(22) Filed: Dec. 11, 2014

(65) Prior Publication Data

US 2015/0333898 A1    Nov. 19, 2015

Related U.S. Application Data

(60) Provisional application No. 62/000,454, filed on May 19, 2014, provisional application No. 62/000,443, filed on May 19, 2014.

(51) Int. Cl.
*H04W 72/04* (2009.01)
*H04L 5/26* (2006.01)
(Continued)

(52) U.S. Cl.
CPC ...... *H04W 72/0453* (2013.01); *H04B 7/2615* (2013.01); *H04L 5/0005* (2013.01);
(Continued)

(58) Field of Classification Search
CPC ........... H04W 72/0453; H04W 72/042; H04W 72/0446; H04W 72/1257; H04W 76/15;
(Continued)

(56) References Cited

U.S. PATENT DOCUMENTS 6,466,557 B1    10/2002  Doi
6,587,444 B1    7/2003   Lenzo et al.
(Continued)

FOREIGN PATENT DOCUMENTS

CN    1451250 A    10/2003
CN    1921322 A    2/2007
(Continued)

OTHER PUBLICATIONS

International Search Report and Written Opinion—PCT/US2015/029973—ISA/EPO—dated Aug. 10, 2015.
(Continued)

*Primary Examiner* — Hardikkumar D Patel
(74) *Attorney, Agent, or Firm* — Qualcomm IP Dept.; James Hunt Yancey, Jr.; Jeffrey T Burgess

(57) ABSTRACT

Aspects of the present disclosure provide for the pairing of an inter-band carrier with a time division duplex (TDD) carrier. If the paired band is a frequency division duplex (FDD) band, then base stations and mobile devices may transmit and receive additional thin control channels on FDD carriers to enable full duplex operations. If the paired
(Continued)

band is a TDD band, then a conjugate or inverse carrier may be used such that full duplex, or a close approximation thereto, is achieved. With the introduction of a paired channel and fast control channels, rapid uplink/downlink switching may be achieved for TDD carriers efficiently and effectively. Other aspects, embodiments, and features are also claimed and described.

80 Claims, 26 Drawing Sheets

(51) Int. Cl.
  *H04B 7/26* (2006.01)
  *H04L 5/00* (2006.01)
  *H04W 72/12* (2009.01)
  *H04L 5/14* (2006.01)
  *H04W 76/15* (2018.01)

(52) U.S. Cl.
  CPC ............... *H04L 5/14* (2013.01); *H04L 5/26* (2013.01); *H04W 72/042* (2013.01); *H04W 72/0446* (2013.01); *H04W 72/1257* (2013.01); *H04W 76/15* (2018.02)

(58) Field of Classification Search
  CPC ........ H04W 72/04; H04L 5/0005; H04L 5/14; H04L 5/26; H04L 5/006; H04L 5/0055; H04L 5/1694; H04L 5/001; H04L 5/1469; H04B 7/2615; H04J 3/22; H04J 4/00; H04J 3/1694
  See application file for complete search history.

(56) References Cited

U.S. PATENT DOCUMENTS

| | | | |
|---|---|---|---|
| 6,859,655 | B2 | 2/2005 | Struhsaker et al. |
| 7,860,036 | B2 | 12/2010 | Wang et al. |
| 8,077,670 | B2 | 12/2011 | Fan et al. |
| 8,208,925 | B2 | 6/2012 | Attar et al. |
| 8,498,639 | B2 | 7/2013 | Chen et al. |
| 8,670,376 | B2 | 3/2014 | Damnjanovic et al. |
| 8,797,983 | B2 | 8/2014 | Sun |
| 8,934,350 | B2 | 1/2015 | Chen et al. |
| 8,958,379 | B2 | 2/2015 | He et al. |
| 9,295,048 | B2* | 3/2016 | Malladi ................ H04J 4/00 |
| 9,320,062 | B2 | 4/2016 | Malladi et al. |
| 9,332,466 | B2* | 5/2016 | Yang ................ H04W 36/08 |
| 9,369,990 | B2 | 6/2016 | Damnjanovic et al. |
| 9,497,747 | B2 | 11/2016 | Damnjanovic et al. |
| 10,512,064 | B1 | 12/2019 | Singh et al. |
| 2005/0013263 | A1 | 1/2005 | Kim et al. |
| 2006/0072508 | A1 | 4/2006 | Zou et al. |
| 2007/0171932 | A1 | 7/2007 | Basuthakur et al. |
| 2008/0009280 | A1 | 1/2008 | Ushiki et al. |
| 2008/0279125 | A1 | 11/2008 | Hottinen |
| 2008/0310360 | A1 | 12/2008 | Heo et al. |
| 2009/0070650 | A1 | 3/2009 | Bourlas et al. |
| 2009/0080386 | A1 | 3/2009 | Yavuz et al. |
| 2009/0135748 | A1 | 5/2009 | Lindoff et al. |
| 2009/0180408 | A1* | 7/2009 | Graybeal .......... H04W 72/1257 370/281 |
| 2009/0180433 | A1 | 7/2009 | Ahn et al. |
| 2009/0245155 | A1 | 10/2009 | Fukunaga et al. |
| 2009/0257388 | A1 | 10/2009 | Khandekar et al. |
| 2009/0262699 | A1 | 10/2009 | Wengerter et al. |
| 2009/0323625 | A1 | 12/2009 | Lee et al. |
| 2010/0027491 | A1 | 2/2010 | Reina et al. |
| 2010/0039970 | A1 | 2/2010 | Papasakellariou et al. |
| 2010/0124183 | A1* | 5/2010 | Sorond ................ H04J 3/22 370/280 |
| 2010/0210279 | A1 | 8/2010 | Karaoguz et al. |
| 2010/0214996 | A1 | 8/2010 | Santhanam et al. |
| 2010/0254268 | A1 | 10/2010 | Kim et al. |
| 2011/0013581 | A1 | 1/2011 | Lee et al. |
| 2011/0044391 | A1 | 2/2011 | Ji et al. |
| 2011/0075624 | A1 | 3/2011 | Papasakellariou et al. |
| 2011/0085506 | A1 | 4/2011 | Lee et al. |
| 2011/0116465 | A1 | 5/2011 | Miki et al. |
| 2011/0164532 | A1 | 7/2011 | Kawamura et al. |
| 2011/0164536 | A1 | 7/2011 | Lin et al. |
| 2011/0268075 | A1 | 11/2011 | Heo et al. |
| 2011/0273996 | A1 | 11/2011 | Kim et al. |
| 2011/0274031 | A1 | 11/2011 | Gaal et al. |
| 2011/0286397 | A1 | 11/2011 | Kim et al. |
| 2011/0292890 | A1 | 12/2011 | Kulkarni et al. |
| 2011/0317615 | A1 | 12/2011 | Soong et al. |
| 2012/0004841 | A1 | 1/2012 | Schunder et al. |
| 2012/0039179 | A1 | 2/2012 | Seo et al. |
| 2012/0039283 | A1 | 2/2012 | Chen et al. |
| 2012/0044841 | A1* | 2/2012 | Chen ................ H04B 7/155 370/279 |
| 2012/0057500 | A1 | 3/2012 | Nakayama |
| 2012/0063324 | A1 | 3/2012 | Kim et al. |
| 2012/0069826 | A1 | 3/2012 | Nakao et al. |
| 2012/0099519 | A1 | 4/2012 | Kim et al. |
| 2012/0122465 | A1 | 5/2012 | Landstroem et al. |
| 2012/0230238 | A1 | 9/2012 | Dalsgaard et al. |
| 2012/0250642 | A1 | 10/2012 | Qu et al. |
| 2012/0320846 | A1 | 12/2012 | Papasakellariou et al. |
| 2012/0327916 | A1 | 12/2012 | Ahn et al. |
| 2013/0003929 | A1 | 1/2013 | McNabb, Jr. et al. |
| 2013/0021587 | A1 | 1/2013 | Miyazaki et al. |
| 2013/0021954 | A1 | 1/2013 | Montojo et al. |
| 2013/0030158 | A1 | 1/2013 | Sagi et al. |
| 2013/0039291 | A1 | 2/2013 | Blankenship et al. |
| 2013/0045741 | A1 | 2/2013 | Martin et al. |
| 2013/0083737 | A1 | 4/2013 | Earnshaw et al. |
| 2013/0083740 | A1 | 4/2013 | Eriksson et al. |
| 2013/0107867 | A1 | 5/2013 | Li et al. |
| 2013/0114517 | A1 | 5/2013 | Blankenship et al. |
| 2013/0155915 | A1 | 6/2013 | Park et al. |
| 2013/0170406 | A1 | 7/2013 | Kishiyama et al. |
| 2013/0182623 | A1 | 7/2013 | Fan et al. |
| 2013/0194981 | A1 | 8/2013 | Wang et al. |
| 2013/0201834 | A1 | 8/2013 | Klingenbrunn et al. |
| 2013/0215875 | A1 | 8/2013 | Yang et al. |
| 2013/0223366 | A1 | 8/2013 | Papasakellariou et al. |
| 2013/0225193 | A1 | 8/2013 | Lee et al. |
| 2013/0229940 | A1 | 9/2013 | Baker et al. |
| 2013/0250903 | A1 | 9/2013 | Ahn et al. |
| 2013/0272187 | A1 | 10/2013 | Malladi et al. |
| 2013/0301503 | A1 | 11/2013 | Park |
| 2013/0301582 | A1 | 11/2013 | Jiang et al. |
| 2013/0303214 | A1 | 11/2013 | Ahmadi |
| 2013/0336302 | A1 | 12/2013 | Lee et al. |
| 2014/0008620 | A1 | 1/2014 | Morohashi et al. |
| 2014/0044095 | A1 | 2/2014 | Li et al. |
| 2014/0056184 | A1 | 2/2014 | Yang et al. |
| 2014/0056188 | A1 | 2/2014 | Yang et al. |
| 2014/0086189 | A1 | 3/2014 | Takeda et al. |
| 2014/0086201 | A1 | 3/2014 | Nagata et al. |
| 2014/0092856 | A1 | 4/2014 | Yang et al. |
| 2014/0098780 | A1 | 4/2014 | Kim et al. |
| 2014/0133369 | A1 | 5/2014 | Cheng et al. |
| 2014/0133452 | A1 | 5/2014 | Nogami et al. |
| 2014/0153426 | A1 | 6/2014 | Kim et al. |
| 2014/0169238 | A1 | 6/2014 | Cai et al. |
| 2014/0192755 | A1 | 7/2014 | Kim et al. |
| 2014/0198733 | A1 | 7/2014 | Yin et al. |
| 2014/0204922 | A1 | 7/2014 | Kim et al. |
| 2014/0211717 | A1 | 7/2014 | Jitsukawa |
| 2014/0226607 | A1 | 8/2014 | Holma et al. |
| 2014/0286299 | A1 | 9/2014 | Ihm et al. |
| 2014/0293840 | A1 | 10/2014 | Beale |
| 2014/0293912 | A1 | 10/2014 | Chao et al. |
| 2014/0307643 | A1 | 10/2014 | Froberg Olsson et al. |
| 2014/0334397 | A1 | 11/2014 | Chen et al. |
| 2014/0362832 | A1 | 12/2014 | Rudolf et al. |
| 2014/0369245 | A1 | 12/2014 | Pecen et al. |
| 2015/0043355 | A1 | 2/2015 | Kim et al. |
| 2015/0085766 | A1 | 3/2015 | Kim et al. |

(56) References Cited

U.S. PATENT DOCUMENTS

| | | | |
|---|---|---|---|
| 2015/0110032 A1 | 4/2015 | Nagata et al. | |
| 2015/0117348 A1 | 4/2015 | Takano et al. | |
| 2015/0139104 A1 | 5/2015 | Seo et al. | |
| 2015/0173101 A1 | 6/2015 | Webb et al. | |
| 2015/0181566 A1 | 6/2015 | Stopler | |
| 2015/0264662 A1 | 9/2015 | Sahlin et al. | |
| 2015/0264664 A1 | 9/2015 | Kawasaki et al. | |
| 2015/0319021 A1 | 11/2015 | Xue et al. | |
| 2015/0333898 A1 | 11/2015 | Ji et al. | |
| 2015/0334685 A1 | 11/2015 | Ji et al. | |
| 2015/0334686 A1 | 11/2015 | Ji et al. | |
| 2015/0334702 A1 | 11/2015 | Ji et al. | |
| 2015/0334709 A1 | 11/2015 | Ji et al. | |
| 2015/0334729 A1 | 11/2015 | Ji et al. | |
| 2015/0351116 A1 | 12/2015 | Shoshan et al. | |
| 2016/0007347 A1 | 1/2016 | Nagata et al. | |
| 2016/0081107 A1 | 3/2016 | Yang et al. | |
| 2016/0143035 A1 | 5/2016 | Xue et al. | |
| 2016/0157103 A1 | 6/2016 | Teng et al. | |
| 2016/0164622 A1 | 6/2016 | Yi et al. | |
| 2016/0262137 A1 | 9/2016 | Behravan et al. | |
| 2016/0381587 A1 | 12/2016 | Alexey et al. | |
| 2017/0208584 A1 | 7/2017 | Qu et al. | |
| 2017/0318564 A1 | 11/2017 | Lee et al. | |
| 2020/0015247 A1 | 1/2020 | Ji et al. | |
| 2020/0015248 A1 | 1/2020 | Ji et al. | |
| 2020/0260421 A1 | 8/2020 | Takeda et al. | |

FOREIGN PATENT DOCUMENTS

| | | | |
|---|---|---|---|
| CN | 1943141 A | 4/2007 | |
| CN | 101141801 A | 3/2008 | |
| CN | 201094150 Y | 7/2008 | |
| CN | 101277167 A | 10/2008 | |
| CN | 101868028 A | 10/2010 | |
| CN | 101917773 A | 12/2010 | |
| CN | 102077670 A | 5/2011 | |
| CN | 102300244 A | 12/2011 | |
| CN | 101485216 B | 1/2012 | |
| CN | 102362447 A | 2/2012 | |
| CN | 102474298 A | 5/2012 | |
| CN | 102651675 A | 8/2012 | |
| CN | 102792656 A | 11/2012 | |
| CN | 102934504 A | 2/2013 | |
| CN | 103139819 A | 6/2013 | |
| CN | 104620629 A | 5/2015 | |
| EP | 2547058 A2 | 1/2013 | |
| EP | 2613600 A1 * | 7/2013 | ........ H04W 72/0453 |
| EP | 2725753 A1 | 4/2014 | |
| EP | 2879456 A1 | 6/2015 | |
| GB | 2506153 A | 3/2014 | |
| JP | 2007529934 A | 10/2007 | |
| JP | 2011512064 A | 4/2011 | |
| JP | 2012054711 A | 3/2012 | |
| JP | 2013102394 A | 5/2013 | |
| JP | 2613600 A1 * | 7/2013 | ........... H04L 1/0026 |
| JP | 2014027429 A | 2/2014 | |
| JP | 2014078807 A | 5/2014 | |
| JP | 2017521894 A | 8/2017 | |
| KR | 20110013425 A | 2/2011 | |
| KR | 20130085983 A | 7/2013 | |
| KR | 20140040733 A | 4/2014 | |
| RU | 2464709 C2 | 10/2012 | |
| RU | 2012118758 A | 11/2013 | |
| RU | 2012135724 A | 4/2014 | |
| TW | 201406095 A | 2/2014 | |
| TW | 201406180 A | 2/2014 | |
| TW | 201431393 A | 8/2014 | |
| WO | WO-2005088866 A1 | 9/2005 | |
| WO | 2007025260 A2 | 3/2007 | |
| WO | WO-2007025160 A2 | 3/2007 | |
| WO | 2008098223 A2 | 8/2008 | |
| WO | 2009036086 A1 | 3/2009 | |
| WO | WO-2009063001 A2 | 5/2009 | |
| WO | 2010019523 A1 | 2/2010 | |
| WO | 2010019679 A2 | 2/2010 | |
| WO | 2010057008 A1 | 5/2010 | |
| WO | 2012044988 A1 | 4/2012 | |
| WO | 2012161914 A1 | 11/2012 | |
| WO | 2013041138 A1 | 3/2013 | |
| WO | 2013073899 A1 | 5/2013 | |
| WO | 2013168467 A1 | 11/2013 | |
| WO | 2013168974 A1 | 11/2013 | |
| WO | WO-2013192601 A2 | 12/2013 | |
| WO | WO 2013192601 A2 * | 12/2013 | ............ H04L 5/001 |
| WO | WO-2014041480 A1 | 3/2014 | |
| WO | WO-2014045015 A1 | 3/2014 | |
| WO | 2014047860 A1 | 4/2014 | |
| WO | 2014148962 A1 | 9/2014 | |
| WO | WO-2014205742 A1 | 12/2014 | |

OTHER PUBLICATIONS

3GPP TS 36.331: "3rd Generation Partnership Project; Technical Specification Group Radio Access Network; Evolved Universal Terrestrial Radio Access (E-UTRA); Radio Resource Control (RRC); Protocol specification", Release 12, V12.1.0, Retrieved from URL: http://www.3gpp.org/ftp/Specs/archive/36_series/36.331/36331-c10. zip, Retrieved on: Mar. 13, 2014, 356 Pages.

NSN, et al., "IoT Indication for Inter-Band TDD CA with Different UL/DL Configuration", 3GPP draft; 36331_CR1463_(REL-12)_R2-140987, 3rd Generation Partnership Project (3GPP), Mobile Competence Centre; 650 Route Des Lucioles; F-06921 Sophia-Antipolis Cedex; France, vol. RAN WG2_No. Prague, Czech Republic; Feb. 10, 2014-Feb. 14, 2014, Mar. 8, 2014 (Mar. 8, 2014), 12 Pages, XP050816411, Retrieved from the Internet: URL: http://www.3gpp.org/ftp/tsg_ran/WG2_RL2/Specifications/201403_draft_specs_after_RAN_63/ [retrieved on Mar. 8, 2014] "UE-EUTRA—Capability field descriptions"—"inter-BandTDD-CA—WithDifferentConfig"; p. 11.

NTT DOCOMO: "Views on Remaining Open Issues on Dual Connectivity", 3GPP Draft; R1-142266, 3rd Generation Partnership Project (3GPP), Mobile Competence Centre; 658, Route Des Lucioles; F-06921 Sophia-Antipolis Cedex; France, vol. RAN WG1, No. Seoul, Korea; May 19, 2014-May 23, 2014, May 18, 2014 (May 18, 2014), pp. 1-5, XP050789383, Retrieved from the Internet: URL: http://www.3gpp.org/ftp/Meetings_3GPP_SYNC/RAN1/RAN1/Docs/ [retrieved on May 18, 2014] section"2.5. Simultaneous Rx/Tx capability".

European Search Report—EP18188252—Search Authority—The Hague—dated Nov. 26, 2018.

Taiwan Search Report—TW104114924—TIPO—dated Oct. 18, 2018.

Huawei: "Control channel design in frequency domain", 3GPP R1-061402, May 12, 2006.

Motorola Mobility: "Handling Overlap of EPDCCH and PDSCH Resources", 3GPP TSG-RAN WG1#70 R1-123786, France, 3GPP, Aug. 5, 2012, pp. 1-3.

Qualcomm Incorporated: "Basic UE Capability Mode of Operation", 3GPP TSG-RAN WG1#77 R1-142463, France, 3GPP, May 10, 2014, pp. 1-5.

Qualcomm Incorporated: Basic UE Capability Mode of Operation, 3GPP TSG-RAN WG2#86 R2-142708, France, 3GPP, May 10, 2014, pp. 1-5.

Tsai, Lee & Chen, Summary of Official Letter, English translation of Taiwan Office Action dated Aug. 30, 2018.

Chinese Office Action issued in Application No. 201580025518.3, dated Dec. 27, 2018.

Chinese Office Action issued in Application No. 201580025519.8, dated Dec. 5, 2018, 16 pages.

Chinese Office Action issued in Application No. 201580026415.9, dated Jan. 23, 2019.

Japanese Office Action issued in Application No. 2016-567997, dated Feb. 8, 2019.

Korean Office Action issued in Application No. 1020167032767, dated Jan. 29, 2019, 4 pages.

Newzealand Office Action issued in Application No. 725292, dated Dec. 17, 2018, 3 pages.

(56) References Cited

OTHER PUBLICATIONS

Russian Office Action issued in Application No. 2016144753, dated Dec. 20, 2018, 18 pages.
Russian Office Action issued in Application No. 2016144758, dated Dec. 6, 2018, 17 pages.
Russian Office Action issued in Application No. 2016145059, dated Dec. 20, 2018.
Taiwan Search Report—TW104114930—TIPO—dated Jan. 9, 2019.
European Search Report—EP18188252—EPO—dated Nov. 18, 2018.
Ericsson, Test Proposal for CA_39A-41A Performance Requirement, 36PP TSG-RAN WG4 Meeting #70bis, San Jose Cabo, Mexico, Mar. 31-Apr. 4, 2014.
European Office Action for European Patent Application No. EP15723633, dated Feb. 13, 2019, 8 pages.
European Office Action for European Patent Application No. EP15723633, dated Aug. 5, 2019, 5 pages.
European Office Action for European Patent Application No. EP15724154, dated Aug. 5, 2019, 5 pages.
European Office Action for European Patent Application No. EP15724154, dated Feb. 13, 2019, 8 pages.
Response to the European Office Action dated Feb. 13, 2019 for the EP Application No. EP15723633, dated Jun. 7, 2019, 4 pages.
Response to the European Office Action dated Feb. 13, 2019 for the EP Application No. EP15724154, dated Jun. 7, 2019, 4 pages.
Decision on Appeal issued in U.S. Appl. No. 14/567,993 dated Feb. 8, 2021, 8 pages.
Decision on Appeal issued in U.S. Appl. No. 14/567,985 dated Jan. 28, 2021, 8 pages.
Huawei et al., "Way Forward on DCI Formats for TDD/FDD CA", 3GPP TSG RAN WG1 #76, R1-140978, Feb. 17, 2014, 3 pages.

\* cited by examiner

Uplink/Uplink Multiplexing with Full Duplex Communication

FDD-TDD Pairing: Multiplexing LoLat UL on Regular UL

*FDD-TDD Pairing: Multiplexing LoLat UL on Regular UL*

*FDD-TDD Pairing: Multiplexing LoLat UL on Regular UL*

*FDD-TDD Pairing: Multiplexing LoLat DL on Regular UL*

FDD-TDD Pairing: Multiplexing LoLat DL on Regular UL

FIG. 11 FDD-TDD Pairing: Multiplexing LoLat UL on Regular DL

FDD-TDD Pairing: Multiplexing
LoLat UL on Regular DL

*TDD-TDD Inverse (Conjugate) Pairing*

*TDD-TDD Inverse (Conjugate) Pairing*

TDD-TDD Pairing: Multiplexing LoLat UL on Regular UL

*TDD-TDD Pairing: Multiplexing LoLat UL on Regular UL*

FDD-TDD Pairing: Multiplexing
LoLat UL on Regular UL

*TDD-TDD Pairing: Multiplexing LoLat DL on Regular UL*

TDD-TDD Pairing: Multiplexing
LoLat DL on Regular UL

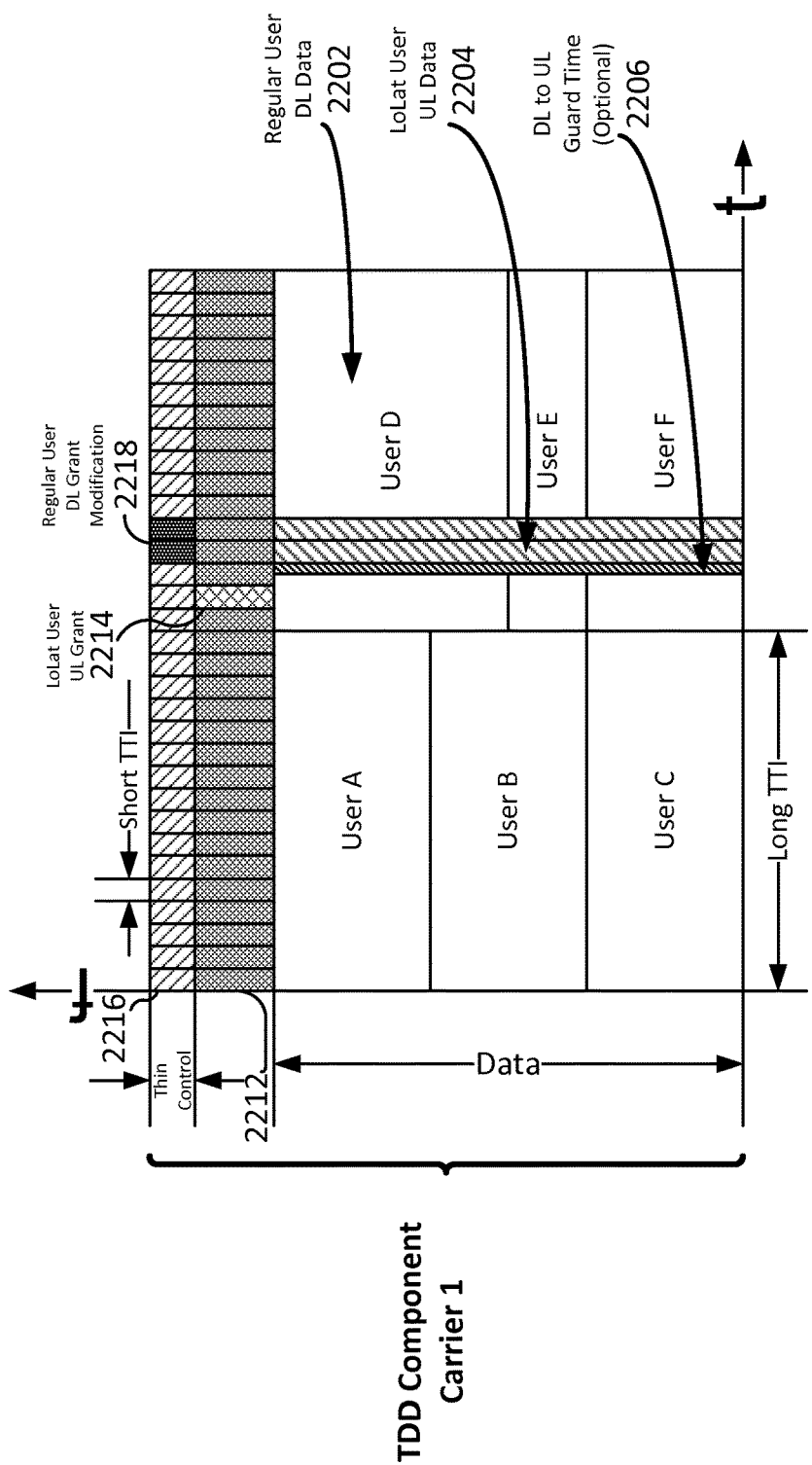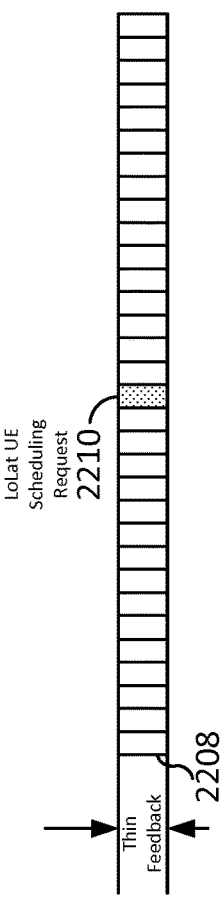
FIG. 22
*TDD-TDD Pairing: Multiplexing LoLat UL on Regular DL*

TDD-TDD Pairing: Multiplexing LoLat UL on Regular DL

APPARATUS AND METHOD FOR INTER-BAND PAIRING OF CARRIERS FOR TIME DIVISION DUPLEX TRANSMIT- AND RECEIVE-SWITCHING AND ITS APPLICATION TO MULTIPLEXING OF DIFFERENT TRANSMISSION TIME INTERVALS

PRIORITY CLAIM

This application claims priority to and the benefit of provisional patent application No. 62/000,454, titled "Apparatus and Method for Inter-Band Pairing of Carriers for Time Division Duplex Transmit- and Receive-Switching and its Application to Multiplexing of Different Transmission Time Intervals" and filed in the U.S. Patent and Trademark Office on May 19, 2014, and provisional patent application No. 62/000,443, titled "Apparatus and Method for Synchronous Multiplexing and Multiple Access for Different Latency Targets Utilizing Thin Control" and filed in the U.S. Patent and Trademark Office on May 19, 2014, the entire content of which is incorporated herein by reference.

TECHNICAL FIELD

Aspects of the present disclosure relate generally to wireless communication systems, and more particularly, to pairing inter-band time division duplex (TDD) carriers to achieve full duplex communication.

BACKGROUND

Wireless communication networks are widely deployed to provide various communication services such as telephony, video, data, messaging, broadcasts, and so on. Such networks, which are usually multiple access networks, support communications for multiple users by sharing the available network resources.

Within such wireless networks a variety of data services may be provided, including voice, video, and emails. More recently, wireless communication networks are being utilized for an even broader range of services, including mission critical applications and remote control applications such as tele-surgery, where real-time feedback is necessary. In such applications, very low latency is critical to enable a suitably high quality of service. That is, the time for information to be transmitted from a communication device, and a response received back at the communication device, may need to be extremely rapid, on the order of milliseconds.

As the demand for mobile broadband access continues to increase, research and development continue to advance wireless communication technologies not only to meet the growing demand for mobile broadband access, but to advance and enhance the user experience.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

Various aspects of the present disclosure provide for the pairing of an inter-band carrier with a time division duplex (TDD) carrier. If the paired band is a frequency division duplex (FDD) band, then base stations and mobile devices may transmit and receive additional thin control channels on FDD carriers to enable full duplex operations. If the paired band is a TDD band, then a conjugate or inverse carrier may be used such that full duplex, or a close approximation thereto, is achieved. With the introduction of a paired channel and fast control channels, rapid uplink/downlink switching may be achieved for TDD carriers efficiently and effectively.

In one aspect, the disclosure provides a method, apparatus, and computer-readable medium having code for implementing wireless communication utilizing an algorithm for pairing inter-band carriers for time division duplex transmit- and receive switching. Here, a subordinate entity may wirelessly communicate with a scheduling entity utilizing a first transmission time interval (TTI) over a first carrier, the first carrier being a time division duplex (TDD) carrier. Further, the subordinate entity may wirelessly communicate utilizing a second TTI different from the first TTI and at least partially overlapping the first TTI, over a second carrier paired with the first carrier but separated from the first carrier in frequency.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 22 is a schematic diagram illustrating a synchronous multiple access channel structure with paired TDD carriers for multiplexing low latency uplink data with regular downlink data according to one example.

DETAILED DESCRIPTION

Figure 1:
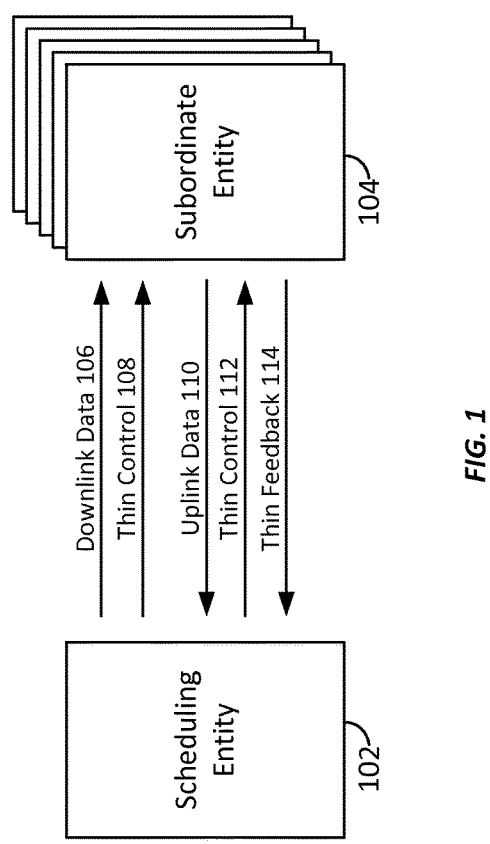
FIG. 1 is a block diagram conceptually illustrating an example of a scheduling entity communicating with one or more subordinate entities according to some embodiments.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The various concepts presented throughout this disclosure may be implemented across a broad variety of telecommunication systems, network architectures, and communication standards. For example, the $3^{rd}$ Generation Partnership Project (3GPP) is a standards body that defines several wireless communication standards for networks involving the evolved packet system (EPS), frequently referred to as long-term evolution (LTE) networks. LTE networks can provide end-to-end latency between a transmitting device and a receiving device on the order of 50 ms, with over-the-air latency for a particular packet being in the range of 10 ms. Currently known LTE functionality provides for a round trip time (RTT) for certain feedback signaling (i.e., hybrid automatic repeat request (HARQ) signaling) of at least about 8 ms, using a transmission time interval (TTI) of 1 ms. (Here, a TTI corresponds to a minimum duration of a unit of information that can be decoded.) For time division duplex (TDD) LTE configurations, the uplink/downlink configuration has a relatively fixed configuration, which takes around 10 ms to change. In general, LTE provides for a one-size-fits-all approach, with all services and packets relying on these same latency ranges.

Evolved versions of the LTE network, such as a fifth-generation (5G) network, may provide for many different types of services or applications, including but not limited to web browsing, video streaming, VoIP, mission critical applications, multi-hop networks, remote operations with real-time feedback (e.g., tele-surgery), etc. Here, these different sets of services may benefit from having multiple latency targets that are drastically different from one another. However, the one-size-fits-all aspects of the LTE network described above can make the multiplexing of traffic with different latency targets very difficult.

The spectrum compatibility of a system that supports such diverse latency targets can be challenging. For example, the time multiplexing of regular/low latency traffic could violate the requirements of low latency packets. Furthermore, reserved frequency domain resources for low latency traffic would limit the peak rate and trunking efficiency. Thus, for next generation networks there is a need for new ways to support the ability to multiplex various types, classes, and categories traffic and services, including but not limited to traffic having drastically different latency characteristics.

According to some aspects of the present disclosure, apparatus, methods, and computer instructions are disclosed, providing for the pairing of an inter-band carrier with a time division duplex (TDD) carrier. If the paired band is a frequency division duplex (FDD) band, then base stations and mobile devices may transmit and receive additional thin control channels on FDD carriers to enable full duplex operations. If the paired band is another TDD band, then a conjugate or inverse carrier may be used such that full duplex communication is achieved. With the introduction of the paired channel and fast control channels, rapid uplink/downlink switching may be achieved for TDD carriers efficiently and effectively, enabling the multiplexing of various types, classes, and categories of traffic and services.

Referring now to FIG. 1, a block diagram is provided illustrating a scheduling entity 102 and a plurality of subordinate entities 104 engaged in wireless communication utilizing thin control channels 108/112 and a thin feedback channel 114, described in further detail below. Of course, the channels illustrated in FIG. 1 are not necessarily all of the channels that may be utilized between a scheduling entity 102 and subordinate entities 104, and those of ordinary skill in the art will recognize that other channels may be utilized in addition to those illustrated, such as other control and feedback channels. As illustrated in FIG. 1, the scheduling entity 102 may broadcast downlink data 106 to one or more subordinate entities 104. In accordance with aspects of the present disclosure, the term downlink may refer to a point-to-multipoint transmission originating at the scheduling entity 102. Broadly, the scheduling entity 102 is a node or device responsible for scheduling traffic in a wireless communication network, including the downlink transmissions and, in some examples, uplink data 110 from one or more subordinate entities to the scheduling entity 102. (Another way to describe the scheme may be to use the term broadcast channel multiplexing.) In accordance with aspects of the present disclosure, the term uplink may refer to a point-to-point transmission originating at a subordinate entity 104. Broadly, the subordinate entity 104 is a node or device that receives scheduling control information, including but not limited to scheduling grants, synchronization or timing information, or other control information from another entity in the wireless communication network such as the scheduling entity 102.

In a further aspect of the disclosure, the scheduling entity 102 may broadcast a thin control channel 108 and/or 112 to one or more subordinate entities 104. As described herein below, the use of a thin control channel 108/112 can enable modification/puncturing of uplink and/or downlink data being transmitted using a first, long transmission time interval (TTI), with other data (e.g., low latency (LoLat) packets) utilizing a second, short TTI.

Furthermore, the subordinate entities 104 may transmit a thin feedback channel 114 to the scheduling entity 102. The thin feedback channel may in some examples include a request for the scheduling entity to modify/puncture a first, long TTI with LoLat packets utilizing a second, short TTI. Here, in response to the request transmitted on the thin feedback channel 114, the scheduling entity 102 may transmit in the thin control channel 112 information that may schedule modification/puncturing of the long, first TTI with LoLat packets utilizing the second, short TTI.

Figure 2:
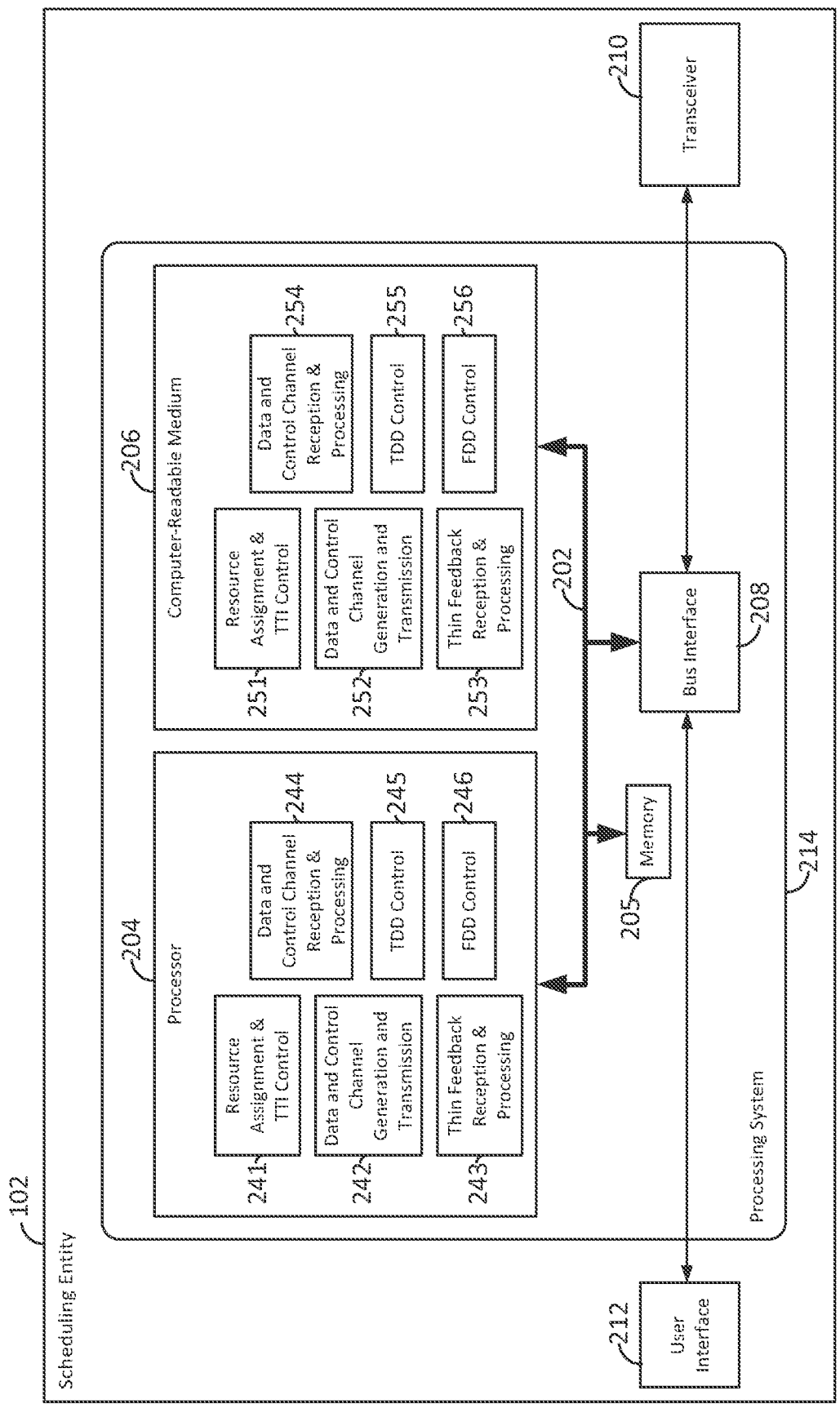
FIG. 2 is a block diagram illustrating an example of a hardware implementation for a scheduling entity employing a processing system according to some embodiments.

FIG. 2 is a conceptual diagram illustrating an example of a hardware implementation for a scheduling entity 102 employing a processing system 214. In accordance with various aspects of the disclosure, an element, or any portion of an element, or any combination of elements may be implemented with a processing system 214 that includes one or more processors 204.

In various aspects of the disclosure, the apparatus 200 may be any suitable radio transceiver apparatus, and in some examples, may be embodied by a base station (BS), a base transceiver station (BTS), a radio base station, a radio transceiver, a transceiver function, a basic service set (BSS), an extended service set (ESS), an access point (AP), a Node B, an eNode B (eNB), mesh node, relay, or some other suitable terminology. Within the present document, a base station may be referred to as a scheduling entity, indicating that the base station provides scheduling information to one or more subordinate entities.

In other examples, the apparatus 200 may be embodied by a wireless user equipment (UE). Examples of a UE include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, an entertainment device, a vehicle component, a wearable computing device (e.g., a smart watch, a health or fitness tracker, etc.), an appliance, a sensor, a vending machine, or any other similar functioning device. The UE may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a UE may be referred to either as a scheduling entity, or a subordinate entity. That is, in various aspects of the present disclosure, a wireless UE may operate as a scheduling entity providing scheduling information to one or more subordinate entities, or may operate as a subordinate entity in accordance with scheduling information provided by a scheduling entity.

Examples of processors 204 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. That is, the processor 204, as utilized in an apparatus 200, may be used to implement any one or more of the processes described below and illustrated in FIGS. 5-26.

In this example, the processing system 214 may be implemented with a bus architecture, represented generally by the bus 202. The bus 202 may include any number of interconnecting buses and bridges depending on the specific application of the processing system 214 and the overall design constraints. The bus 202 links together various circuits including one or more processors (represented generally by the processor 204), a memory 205, and computer-readable media (represented generally by the computer-readable medium 206). The bus 202 may also link various other circuits such as timing sources, peripherals, voltage regulators, and power management circuits, which are well known in the art, and therefore, will not be described any further. A bus interface 208 provides an interface between the bus 202 and a transceiver 210. The transceiver 210 provides a means for communicating with various other apparatus over a transmission medium. Depending upon the nature of the apparatus, a user interface 212 (e.g., keypad, display, speaker, microphone, joystick) may also be provided.

In some aspects of the disclosure, the processor 204 may include resource assignment and TTI control circuitry 241, configured to generate, schedule, and modify a resource assignment or grant of time-frequency resources. The resource assignment and TTI control circuitry 241 may further be configured to determine the TTI to utilize for uplink and downlink transmissions, e.g., whether data transmissions should utilize a first, long TTI, or a second, short TTI. The resource assignment and TTI control circuitry 241 may operate in coordination with resource assignment and TTI control software 251. The processor 204 may further include data and control channel generation and transmission circuitry 242, configured to generate and transmit uplink and downlink data and control channels, as well as uplink feedback channels and downlink control channels, including but not limited to a thin control channel, a thin feedback channel, a LoLat grant channel, a grant modification channel, and an assignment channel. The data and control channel generation and transmission circuitry 242 may operate in coordination with data and control channel generation and transmission software 252. The processor 204 may further include thin feedback reception and processing circuitry 243, configured to receive scheduling requests on an uplink feedback channel, the scheduling requests being configured to request a grant of time-frequency resources for uplink user data transmissions. The thin feedback reception and processing circuitry 243 may operate in coordination with thin feedback reception and processing software 253. The processor 204 may further include data channel reception and processing circuitry 244, configured to receive and process user data on uplink data channels from one or more subordinate entities. The data channel reception and processing circuitry 244 may operate in coordination with data channel and reception and processing software 254. The processor 204 may further include TDD control circuitry 245 and FDD control circuitry 246, configured to control wireless communication (e.g., transmission and/or reception of data and/or control channels) on one or more TDD or FDD carriers, respectively. The TDD control circuitry may operate in coordination with TDD control software 255. The FDD control circuitry may operate in coordination with FDD control software 256.

The processor 204 is responsible for managing the bus 202 and general processing, including the execution of software stored on the computer-readable medium 206. The software, when executed by the processor 204, causes the processing system 214 to perform the various functions described below for any particular apparatus. The computer-readable medium 206 may also be used for storing data that is manipulated by the processor 204 when executing software.

One or more processors 204 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 206. The computer-readable medium 206 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium 206 may reside in the processing system 214, external to the processing system 214, or distributed across multiple entities including the processing system 214. The computer-readable medium 206 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

Figure 3:
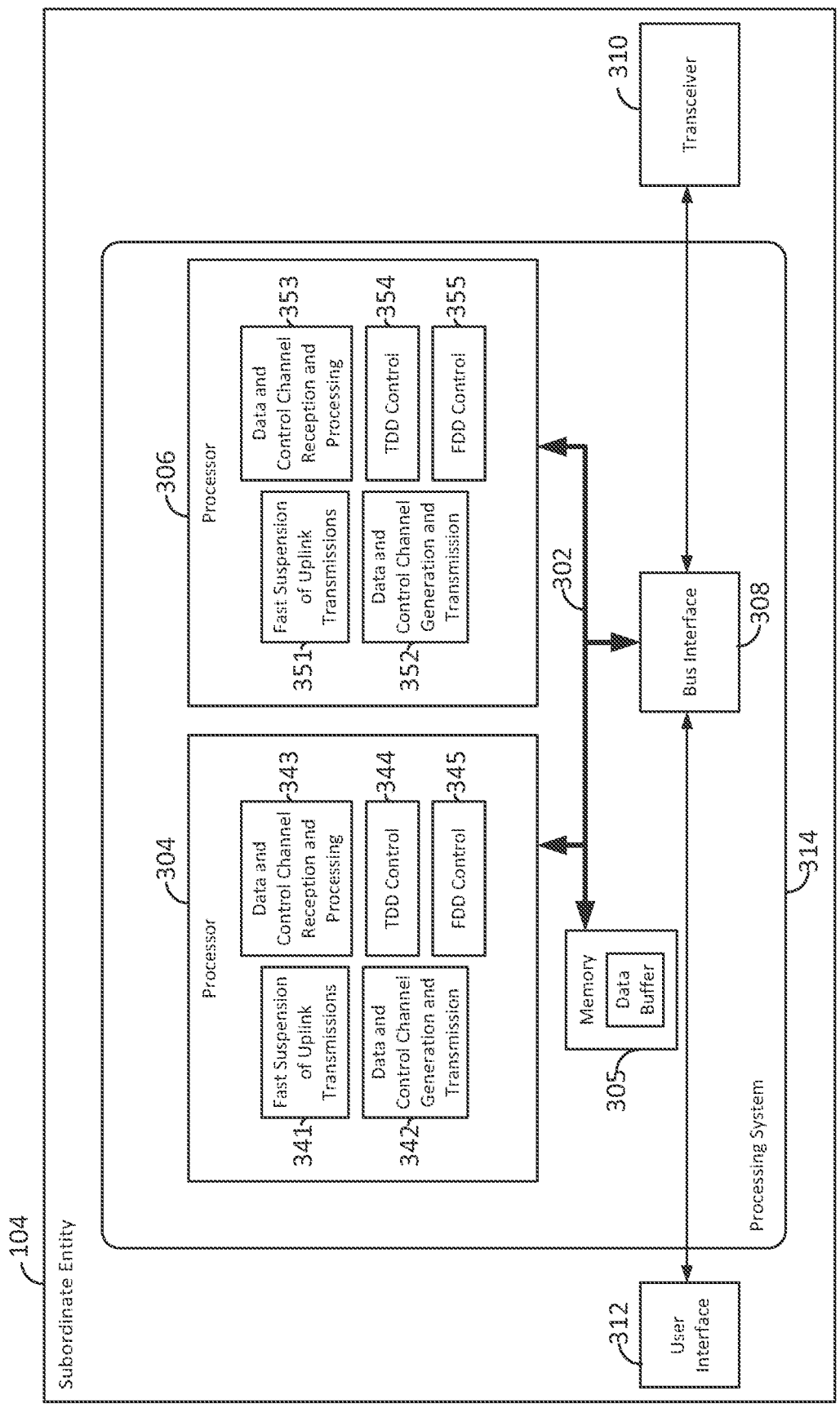
FIG. 3 is a block diagram illustrating an example of a hardware implementation for a subordinate entity employing a processing system according to some embodiments.

FIG. 3 is a conceptual diagram illustrating an example of a hardware implementation for an exemplary subordinate entity 104 employing a processing system 314. In accordance with various aspects of the disclosure, an element, or any portion of an element, or any combination of elements may be implemented with a processing system 414 that includes one or more processors 304.

The processing system 314 may be substantially the same as the processing system 214 illustrated in FIG. 2, including a bus interface 308, a bus 302, memory 305, a processor 304, and a computer-readable medium 306. Furthermore, the subordinate entity 304 may include a user interface 312 and a transceiver 310 substantially similar to those described above in FIG. 2. The processor 304, as utilized in a subordinate entity 104, may be used to implement any one or more of the processes described below and illustrated in FIGS. 5-26.

In some aspects of the disclosure, the processor 304 may include fast suspension of uplink transmissions circuitry 341, configured for quickly suspending uplink transmissions, e.g., by driving a zero input to a power amplifier within the transceiver 310, or in another example, being capable of quickly turning off the power amplifier in the transceiver 310. The fast suspension of uplink transmissions circuitry 341 may operate in coordination with fast suspension of uplink transmissions software 351. The processor 304 may further include data and control channel generation and transmission circuitry 342, configured to generate and transmit uplink data on a data channel, and to generate and transmit uplink control information and feedback information on control and feedback channels. The data and control channel generation and transmission circuitry 342 may operate in coordination with data and control channel generation and transmission software 352. The processor 304 may further include data and control channel reception and processing circuitry 343, configured for receiving and processing downlink data on a data channel, and to receive and process control information on one or more downlink control channels. In some examples, received downlink data and/or control information may be temporarily stored in a data buffer within memory 305. The data and control channel reception and processing circuitry 343 may operate in coordination with data and control channel reception and processing software 353. The processor 304 may further include TDD control circuitry 344 and FDD control circuitry 345, configured to control wireless communication (e.g., transmission and/or reception of data and/or control channels) on one or more TDD or FDD carriers, respectively. The TDD control circuitry may operate in coordination with TDD control software 354. The FDD control circuitry may operate in coordination with FDD control software 355.

As described below, some aspects of the disclosure provide for wireless communication utilizing a TDD carrier paired with a second carrier, and multiplexing long and short TTIs on the paired carriers. Further aspects of the disclosure provide for wireless communication utilizing a pair of TDD carriers for full duplex communication.

Of course, these examples are merely provided to illustrate certain concepts of the invention. Those of ordinary skill in the art will comprehend that these are merely exemplary in nature, and other examples may fall within the scope of the disclosure and the appended claims.

Thin Control Channel in a Full Duplex System

Figure 4:
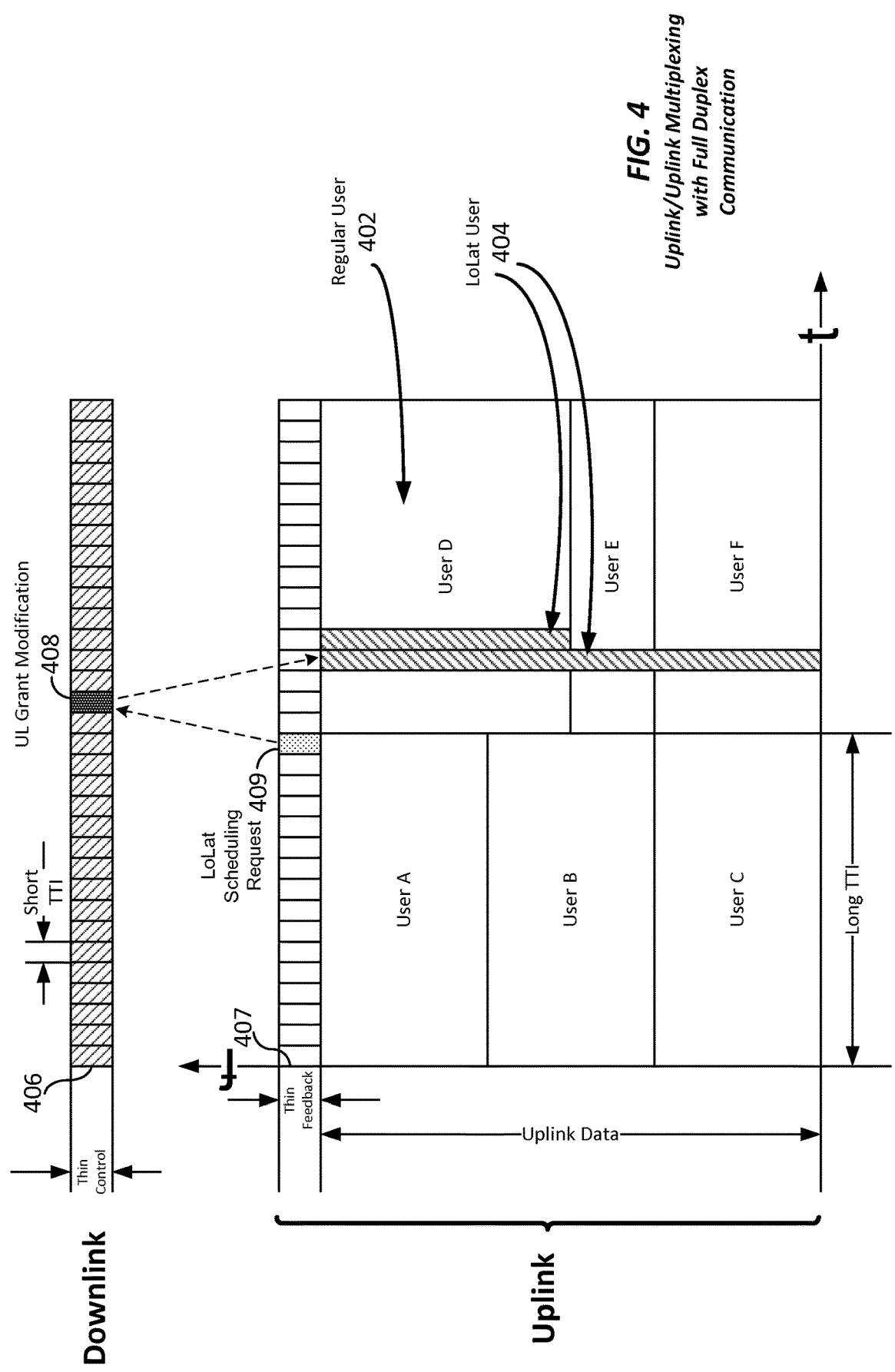
FIG. 4 is a schematic diagram illustrating a synchronous multiple access channel structure in a full duplex system for multiplexing low latency uplink data with regular uplink data according to one example.

Some aspects of the present disclosure provide for synchronous multiplexing of different classes of services and traffic having different latency targets. For example, multiplexing may be enabled by utilizing a certain "thin control channel," described below. This thin control channel may provide for fast signaling to enable the multiplexing of data with short TTIs and other data with long TTIs. As one example, high priority, low latency (LoLat) data having a short TTI may be enabled to interrupt regular traffic having a long TTI. FIG. 4 is a schematic diagram illustrating an example of a synchronous multiple access channel structure including a "thin" control channel as it may be implemented according to some aspects of the present disclosure. As illustrated in FIG. 4, the channel structure may be applicable to an uplink data transmission, i.e., a transmission from a subordinate entity 104 to a scheduling entity 102. Of course, this channel structure is not limited to such a scheme, but rather may be generalized to be applicable to any link where the receiving device is scheduling the traffic.

In the illustration, the horizontal axis (t) represents time, while the vertical axis (f) generally represents frequency (not to scale). Channel resources for various users of the air interface occupy given areas within the channel, as outlined in the different blocks. For example, some of the time-frequency resources may be utilized by "regular" users 402, which have less stringent latency requirements for their communication. In the illustration, as one example, six regular users 402 labeled User A, B, C, D, E, and F are each scheduled time-frequency resources as indicated by their respectfully labeled blocks. Of course, in various examples any number of users may be scheduled the use of resources. Further, while in the illustration all of the time-frequency resources are shown being assigned to regular users, in various examples some or even all of the time-frequency resources may be unassigned, or assigned for another purpose other than for regular user data.

In the context of the present disclosure, a regular user 402 may be a subordinate entity 104 that receives a resource assignment from a scheduling entity 102, where the resource assignment indicates for the subordinate entity 104 to utilize a long transmission time interval (TTI). Such regular users 402 may be more tolerant to latency in their communication, and may in some examples be more optimized for capacity. Accordingly, these users may utilize such longer TTIs for packets that can tolerate more latency than other users or other types of communication that might require low latency (LoLat) communication. A long TTI may broadly be any TTI that is longer than a short TTI, described in further detail below. In some examples, a long TTI may be a TTI that has a duration of a plurality of data symbols, or time slots. Some non-limiting examples of a long TTI may have a duration of 100 µs, 240 µs, or 1 ms. Of course, any suitable duration for a long TTI may be utilized within the scope of the disclosure.

Furthermore, as illustrated in FIG. 4, in addition to the uplink data traffic channels used by the regular users 402, a "thin" feedback channel 407 in the uplink direction may be utilized as illustrated. Here, the thin feedback channel 407 may be the same as the thin feedback channel 114 described above and illustrated in FIG. 1. Within the present disclosure, the thin feedback channel may lie in one or more frequency sub-band(s) outside of (e.g., above) the frequency sub-bands utilized by the uplink traffic transmissions, such as the allocated time-frequency resources described above for regular users A-F 402. The width of the thin feedback channel 407 in the frequency direction may be reduced or minimized so as to reduce or minimize the amount of overhead utilized by the thin feedback channel 407.

Still further, as illustrated in FIG. 4, in addition to the uplink traffic and feedback channels, a thin control channel 406 may be utilized in the downlink direction as illustrated. Here, the thin control channel 406 may be the same as one or both of the thin control channels 108/112 described above and illustrated in FIG. 1. Within the present disclosure, the thin control channel may lie in one or more frequency sub-band(s) outside of the frequency sub-bands utilized by the uplink traffic and feedback transmissions, such as the allocated time-frequency resources described above for regular users A-F 402 and the thin feedback channel 407. For example, in a frequency division duplex (FDD) system, the thin control channel 406 may be in a different band than the uplink traffic and feedback channels. The width of the thin control channel 406 in the frequency direction may be reduced or minimized so as to reduce or minimize the amount of overhead utilized by the control channel 406. In a further aspect, all active users (e.g., subordinate entities 104 including but not necessarily limited to the regular users 402) in communication with the scheduling entity 102 that broadcasts the thin control channel 406 may monitor (and, in some examples, buffer) the thin control channel 406 shown herein.

As illustrated in FIG. 4, each time slot, symbol, or unit of the thin control channel 406 may correspond to the duration of a short TTI. That is, in some examples, the short TTI may correspond to the time duration of a single symbol. Some non-limiting examples of a short TTI may have a duration of 10 µs, 20 µs, 100 µs, or any other suitable duration that is shorter than the long TTI. In some examples, the long TTI may represent an integer multiple of short TTIs. In some examples, a common symbol duration may be utilized within both the long TTI and the short TTI, or in other examples, different symbol durations may be utilized within the long TTI and the short TTI. The duration of information symbols carried within either of the long or short TTIs may also take any suitable duration, with one example being a 10 µs duration for each symbol. In an example wherein orthogonal frequency division multiplexing is adopted, an additional 1 µs cyclic prefix may be added to the symbol duration.

In an aspect of the present disclosure, this thin control channel 406 can enable dynamic multiplexing of the traffic for the LoLat users 404, who utilize the short TTI, and the traffic for the regular users 402, who utilize the long TTI. That is, a plurality of regular users 402 may be transmitting uplink communications utilizing an existing assignment of time-frequency resources. Here, any suitable control channel, including but not necessarily limited to the thin control channel 406, may be utilized to grant resources to the various entities in the network, such that those subordinate entities 104 may transmit uplink data according to their respective assignments utilizing the long TTI.

Here, it may be the case that a subordinate entity in the network wishes to transmit LoLat data. Here, in order to maintain orthogonality among a plurality of subordinate entities, a central, scheduling entity may be utilized to schedule the uplink transmissions by each of the subordinate entities, and they may generally not randomly transmit uplink data without receiving assigned time-frequency resources for such transmission. Accordingly, when a subordinate entity determines that it has traffic (e.g., high priority traffic) that it wishes to be transmitted with a lower latency, then the subordinate entity may transmit a LoLat scheduling request 409 on the thin feedback channel 407. The LoLat scheduling request 409 is illustrated as occupying a single short TTI, although this is not necessarily always the case, and various LoLat scheduling requests might occupy any suitable number of short TTIs or symbol lengths. The contents of the LoLat scheduling request 409 may include information about the LoLat data that the transmitting entity wishes to transmit, such as, for example, length, data type, priority, latency, or any other suitable information relating to the LoLat data.

In response to the LoLat scheduling request 409, the receiving end of the LoLat scheduling request 409 (e.g., the scheduling entity) may accordingly determine to grant a scheduling adjustment. In this way, the scheduling entity may make resources available for the requesting subordinate entity to make its LoLat transmission. Thus, the scheduling entity may transmit, on the thin control channel 406, an uplink grant modification 408 to its regular users 402. The uplink grant modification 408 may notify the regular users 402 that their grant is being modified, and that the previously allocated long TTI time-frequency resources will be punctured, and that the resources will not be used by the regular users 402. Here, puncturing the resources of the regular user 402 may in some examples mean that the regular user 402 ceases transmitting during the time associated with the re-assigned short TTI. In other examples, where one or more means of channel multiplexing may be used (including but not limited to frequency division multiplexing and code division multiplexing), puncturing the resources of the regular user 402 may mean that the regular user 402 ceases using punctured resources but may continue transmitting uplink data utilizing another frequency or another scrambling code, other than the resource granted to the LoLat user 404, in order to maintain orthogonality. As described above, the thin control channel 406 may be a point-to-multipoint broadcast channel monitored by all subordinate entities in communication with the scheduling entity. In this way, any user or users having their formerly granted time-frequency resources punctured by the uplink grant modification 408 can be informed or instructed not to transmit their uplink transmission utilizing the particular time-frequency resource now allocated to a LoLat user 404.

In a further aspect, the uplink grant modification 408 may not only include grant modification information directed to the regular users 402, but in some examples may further include grant information directed to the requesting LoLat user 404 indicating that the punctured time-frequency resources have been allocated to the LoLat user 404. In another example within the scope of the present disclosure, the grant information directed to the requesting LoLat user 404 may be carried on a separate uplink grant channel (not illustrated). That is, the thin control channel may in some examples exclude grant information for the LoLat user 404, this information being transmitted on any suitable downlink channel readable by the requesting LoLat user 404. In any case, grant information directed to the requesting LoLat user 404 may include information identifying the LoLat user 404, identifying one or more time-frequency resources, modulation and coding schemes, transmission schemes, or any other suitable information relating to the granted resource for the requesting LoLat user 404.

Figure 10:
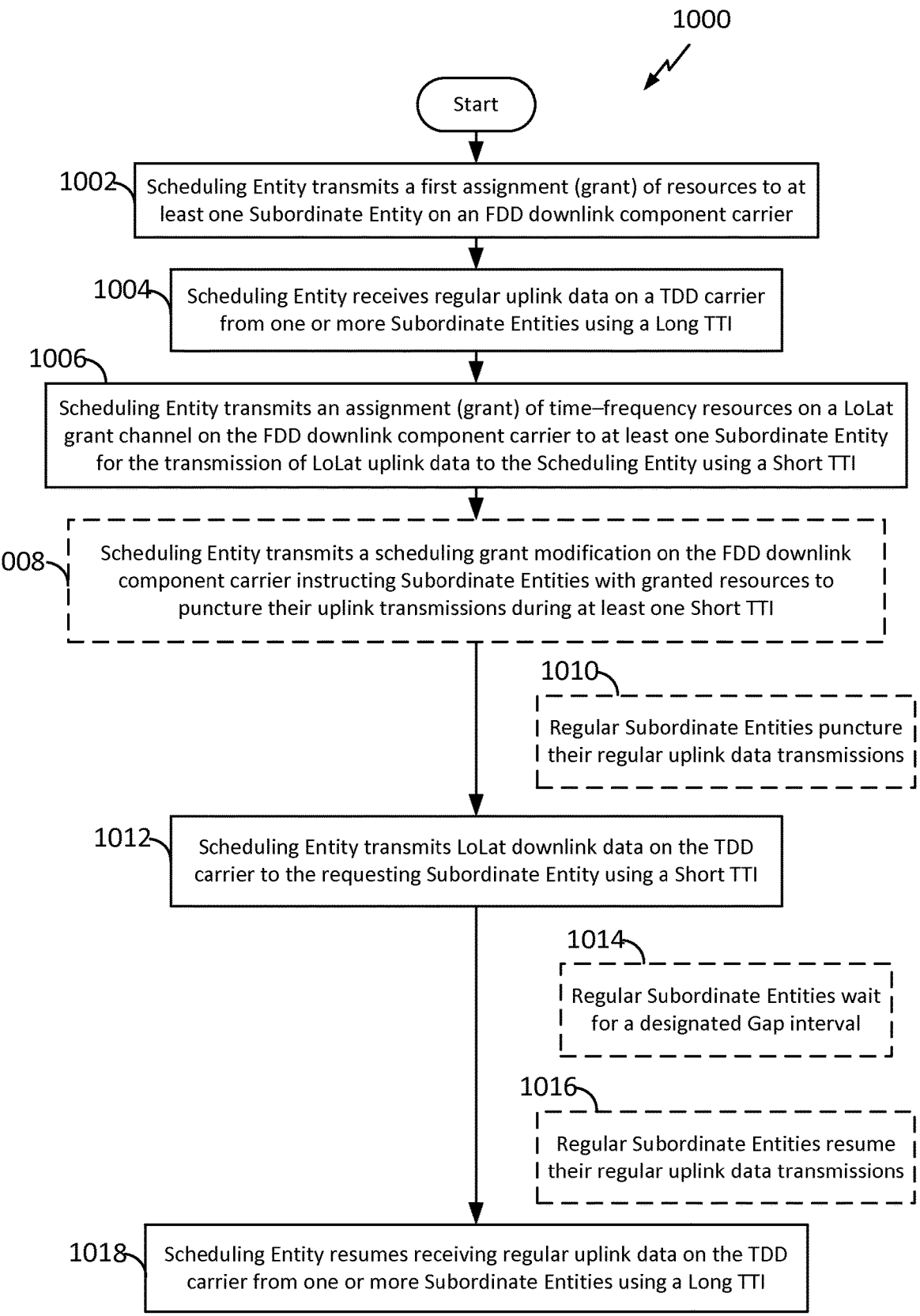
FIG. 10 is a flow chart illustrating an example of multiplexing low latency downlink data with regular uplink data utilizing a thin control channel from the point of view of a scheduling entity, according to some embodiments.

In the illustration of FIG. 10, the LoLat user 404 transmits the LoLat scheduling request 409, but all subordinate entities, including the regular users 402, receive the uplink grant modification 408. Here, in a further aspect of the disclosure, the regular users 402 may be configured such that they are capable of decoding the uplink grant modification 408 relatively quickly, so that they can promptly cease transmitting (e.g., puncture their transmissions) during the re-allocated short TTI(s). In this way, the time-frequency resources may quickly be made available for the LoLat user 404 to transmit its LoLat symbols.

The illustrated example of FIG. 4 applies to a full-duplex scheme, wherein downlink channels such as the thin control channel 406 may be utilized at the same time as uplink channels such as the uplink data channels. In this scheme, because communication in both directions simultaneously is enabled, all of the active users may monitor (and, in some examples, buffer) the thin control channel 406 shown herein. However, in a half-duplex scheme, such as a time division duplex (TDD) channel structure, multiplexing of data having different TTIs necessitates additional considerations.

Thin Control Channels in a TDD System—Paired Carriers

Thin control channels such as the thin control channel 406 described above have been identified as an enabling feature for many potential uses. For example, by utilizing a thin control channel, a communication system can be provided with low-latency data rate control, coordinated multi-point (CoMP) solutions, and improved access to unlicensed bands. Of course, these are merely some examples of features that may be enabled with the use of a thin control channel, and those of ordinary skill in the art will comprehend that other features may be enabled by way of the thin control channel. One relevant feature provided by the use of the thin control channel is opportunistic transmission/reception switching, wherein the thin control channel in one direction may be utilized to rapidly modify data communication in the other direction.

Time division duplexing (TDD) is a well-known duplexing technique that provides for two-way communication between devices by applying time division multiplexing to separate the signals going in different directions from one another. As an example, channel resources may be divided into time slots, where some of the time slots are allocated for uplink transmissions, and other time slots are allocated for downlink transmissions. In this TDD scheme, only uplink or downlink transmissions, and not both, may take place during any particular time slot within that TDD band. One drawback of the TDD scheme is that it is only a half-duplex scheme, because only one direction of communication is possible at any given instant. Because of its half-duplex nature, opportunistic transmission/reception switching with a fast control channel during the middle of an ongoing transmission/reception, as described above in relation to FIG. 4 with the introduction of a thin control channel, is in general not possible. That is, referring again to FIG. 4, if a particular user (e.g., User D) is transmitting its uplink at the time when the uplink grant modification 408 is transmitted, this user would not receive the uplink grant modification 408, and thus, would not be informed of the grant modification, prohibiting the puncturing of its uplink transmission to make room for the LoLat user 404.

One exception, wherein TDD alone may be sufficient, may be in the case of the multiplexing of resources with different TTIs on downlink communications (e.g., downlink/downlink multiplexing, where one downlink transmission of a first TTI may be interrupted by another downlink transmission of a second TTI), which can be achieved without full duplex operation. That is, in this case, the transmission of a thin control channel and a data channel would be in the same downlink direction, and thus, the transmitter could continue transmitting, and the receiver could continue receiving, in a one-direction (or half-duplex) configuration.

Therefore, to provide for improved functionality from a thin control channel in the case of uplink/uplink multiplexing, downlink/uplink multiplexing, or uplink/downlink multiplexing, the enablement of full duplex operation and functionality, even on a TDD spectrum, would be desirable.

Referring again to FIG. 4, this example of thin control for uplink data (i.e., transmissions from a subordinate entity) includes bi-directional full duplex communication, including regular user data 402 and a thin feedback channel 407 in the uplink direction, as well as a thin control channel 406 in the downlink direction. Here, it can be seen that the thin control channel 406 may transmit during each short TTI, and in addition, if a transmitting device (e.g., subordinate entity) wishes to interrupt and transmit LoLat data 404, then at the same time as one of the thin control channel transmissions in the downlink direction, the LoLat user 404 may transmit in the uplink direction a LoLat scheduling request 409. (Additionally, the inserted LoLat packets may be downlink packets, or any other variation from the uplink packets that were interrupted).

In a strict TDD system, this scheme would not be possible, because the device could not autonomously (without informing the other side of the link) interrupt transmissions in one direction with transmissions in the other direction. Similarly, if the UE is undertaking uplink transmissions, if it is a strict TDD system, the UE would not be aware of any attempt by the receiving device to modify the grant, because while transmitting the uplink it would not be receiving anything on the downlink at all.

Therefore, in accordance with some aspects of the present disclosure, a channel structure is provided that incorporates a pairing of a TDD carrier with a second carrier, wherein the TDD carrier and the second carrier may be in different bands from one another (inter-band carriers). When the paired carrier provides an inverse, conjugate, or complementary direction of communication as that of the TDD carrier, full-duplex communication can be achieved, at least in some of the time slots, by simultaneous utilization of an uplink direction of communication in one carrier and a downlink direction of communication in the other carrier.

In some examples, the paired (second) carrier may be in a frequency division duplex (FDD) band, which is capable of full duplex communication. That is, if the paired carrier is an FDD carrier, the paired carrier can include a plurality of carriers, such as an uplink component carrier and a downlink component carrier. Accordingly, if the paired carrier is in an FDD band, then both ends of the link (scheduling and subordinate) can simultaneously transmit and receive a thin control channel on the FDD carrier.

In other examples, the paired carrier may be in a TDD band. In this case, in an aspect of the present disclosure, the two paired TDD carriers may implement conjugate or inverse duplexing, such that full duplex is achieved. This conjugate duplexing generally establishes that during some or all of the time slots or frames in one of the carriers, when those frames are configured for communication in one direction, then at that same time, a corresponding time slot or frame in the paired carrier is configured for communication in the other direction. In this way, by implementing paired carriers and fast (thin) control channels, among other functions, rapid uplink/downlink switching and multiplexing can be achieved for TDD carriers in an efficient and effective manner.

Downlink/Downlink Multiplexing

In an aspect of the disclosure, described above, downlink/downlink multiplexing (e.g., enabling fast and dynamic switching between long and short TTIs) for data transmitted on a TDD carrier, need not necessarily utilize paired carriers. That is, because a thin control channel may be carried in the same direction, and at the same time as the downlink data on a TDD carrier, dynamic switching of TTIs can be accomplished on the fly by the scheduling entity that is transmitting the downlink utilizing a single TDD carrier.

FDD-TDD Carrier Pairing

In some aspects of the disclosure, a TDD carrier may be paired with a second carrier that lies in a frequency division duplex (FDD) band, wherein the FDD carrier may include paired uplink and downlink component carriers that provide for full duplex communication in the FDD band. As described in further detail below, with this pairing, dynamic uplink/downlink switching can be achieved on data channels on the TDD carrier with the help of control channels on the FDD carrier.

FDD-TDD Carrier Pairing: Multiplexing LoLat UL on a Regular UL

Figure 5:
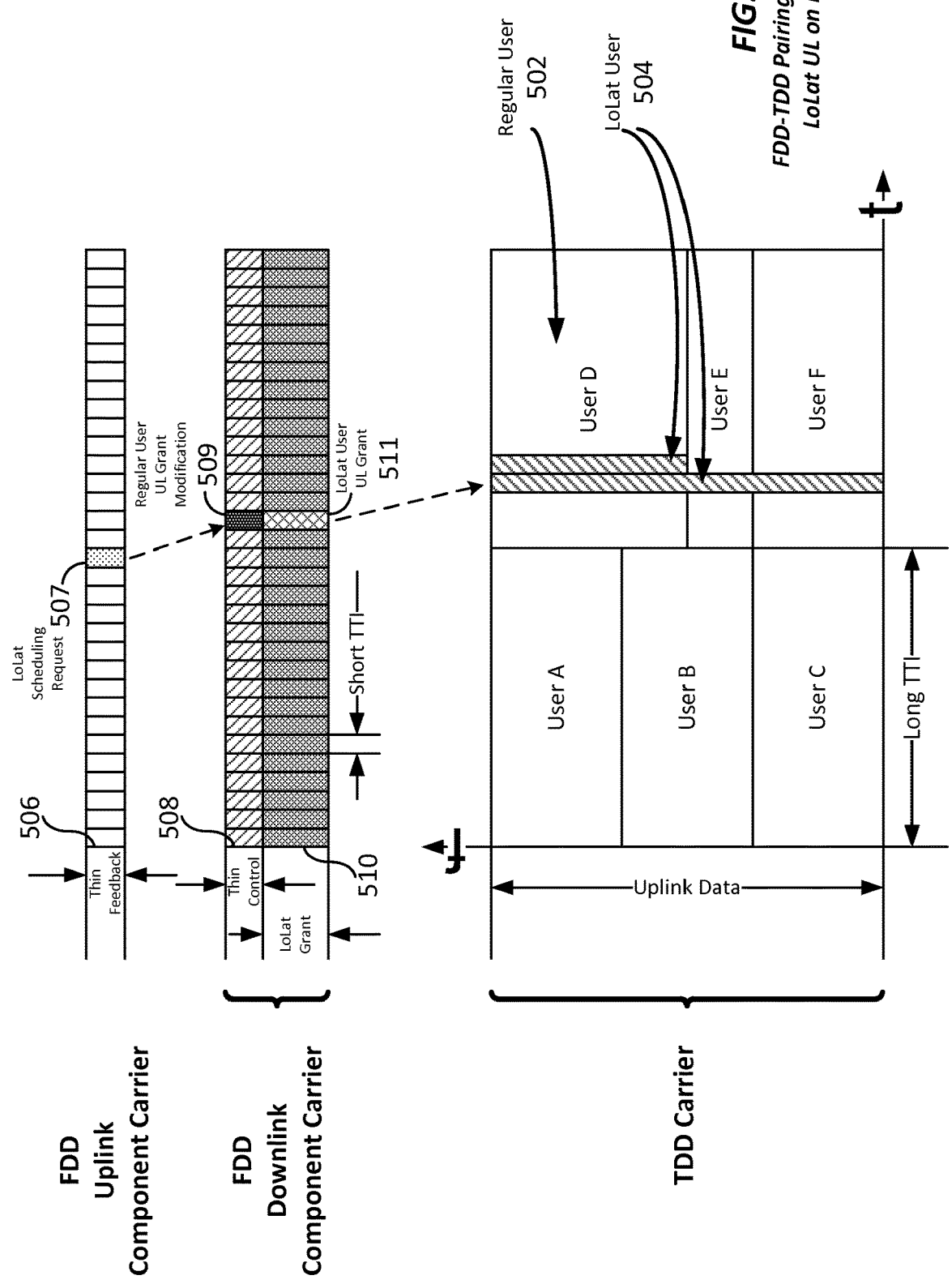
FIG. 5 is a schematic diagram illustrating a synchronous multiple access channel structure with a time division duplex (TDD) carrier being paired with a frequency division duplex (FDD) carrier for multiplexing low latency uplink data with regular uplink data according to one example.

FIG. 5 illustrates one example of pairing a TDD carrier with an FDD carrier, providing for multiplexing of LoLat uplink transmissions with regular uplink transmissions (i.e., transmissions from a subordinate entity) on the TDD carrier. In the illustrated example, the TDD carrier is illustrated in much the same way as the TDD carrier in FIG. 4, with uplink resources allocated to different users being represented by the large blocks spanning a long TTI. Here, as will be described in further detail below, a subordinate entity (e.g., a UE) may request, and be granted, resources for a LoLat transmission that may be multiplexed with the "regular" uplink transmissions from other users. At the top of the figure, resources on an FDD band are allocated, including an uplink component carrier and a downlink component carrier.

In the illustrated example, control channels for controlling the TDD uplink data are carried on the FDD component carriers. That is, the FDD band includes in its uplink component carrier a thin feedback channel 506 that a subordinate entity can utilize to transmit information such as a low latency (LoLat) scheduling request 507. The FDD band further includes, in its downlink component carrier, a thin control channel 508, which may carry uplink grant modification information 509 that modifies an uplink resource grant corresponding to the subordinate entity uplink transmission on the TDD carrier. Still further, the FDD band includes, in its downlink component carrier, a LoLat grant channel 510, which may carry grant information 511 for the subordinate entity that requested LoLat scheduling to utilize in a LoLat uplink transmission on the TDD carrier.

In addition to the illustrated channels, time-frequency resources corresponding to the long TTI may be granted for uplink transmissions on the TDD carrier to one or more subordinate entities (e.g., Users A-F) by utilizing any suitable downlink grant channel (not necessarily one of the illustrated channels). As these uplink transmissions are ongoing, if a particular subordinate entity, denoted as the LoLat user 504, wishes to request resources for a LoLat uplink transmission, this subordinate entity may transmit a LoLat scheduling request 507 on the thin feedback channel 506 on the FDD uplink component carrier. Here, the LoLat scheduling request 507 may utilize the short TTI, although this is not necessarily always the case. In response, if the scheduling entity wishes to grant the requested LoLat resource, the scheduling entity 102 may transmit, on the FDD downlink component carrier, an uplink grant modification 509 on the thin control channel 508, and a LoLat grant 511 on the LoLat grant channel 511. Here, the an uplink grant modification 509 on the thin control channel 508 may be configured to inform all of the subordinate entities that are utilizing an existing grant of uplink time-frequency resources that some or all of their granted resources are being modified or removed, to make way for the LoLat transmission. Further, the LoLat grant 511 on the LoLat grant channel 510 may be configured to inform the subordinate entity that transmitted the LoLat scheduling request (i.e., the LoLat user 504) of its granted time-frequency resources. In the illustration, the LoLat grant 511 is shown as occupying a wider bandwidth than the UL grant modification 509. This represents that, while the UL grant modification 509 may simply be a few bits representing the frequency resources that are being re-allocated away from a regular user 502, and a number of short TTIs, the LoLat grant 511 may include more precise information relating to the LoLat resource assignment such as a user ID, the assignment information, a modulation and coding scheme, etc. Accordingly, the LoLat user 504 may transmit its LoLat uplink transmission on the TDD carrier, while other "regular" users 502 (such as Users D, E, and F) may cease their uplink transmissions, resulting in an orthogonal multiple access scheme between regular and LoLat uplink transmissions on the TDD carrier.

In this example, the regular users 502 (e.g., subordinate entities 104), whose uplink resources were punctured, may benefit from having an ability to quickly decode the uplink grant modification 509. That is, the time from when the uplink grant modification 509 is received at the regular user 502, until that user ceases its uplink transmissions, may be very short. To accommodate the quick reaction time, the subordinate entity 104 may be configured for a fast suspension of its uplink transmissions, e.g., by driving a zero input to a power amplifier within the transceiver 310, or in another example, being capable of quickly turning off the power amplifier. Furthermore, the LoLat user 504 also may have only a brief time from the receiving of its LoLat uplink grant 511, and its transmission of LoLat uplink data. Accordingly, fast processing of the LoLat grant 511 and transmission utilizing the scheduled time-frequency resources would be beneficial and reduce latency.

Figure 6:
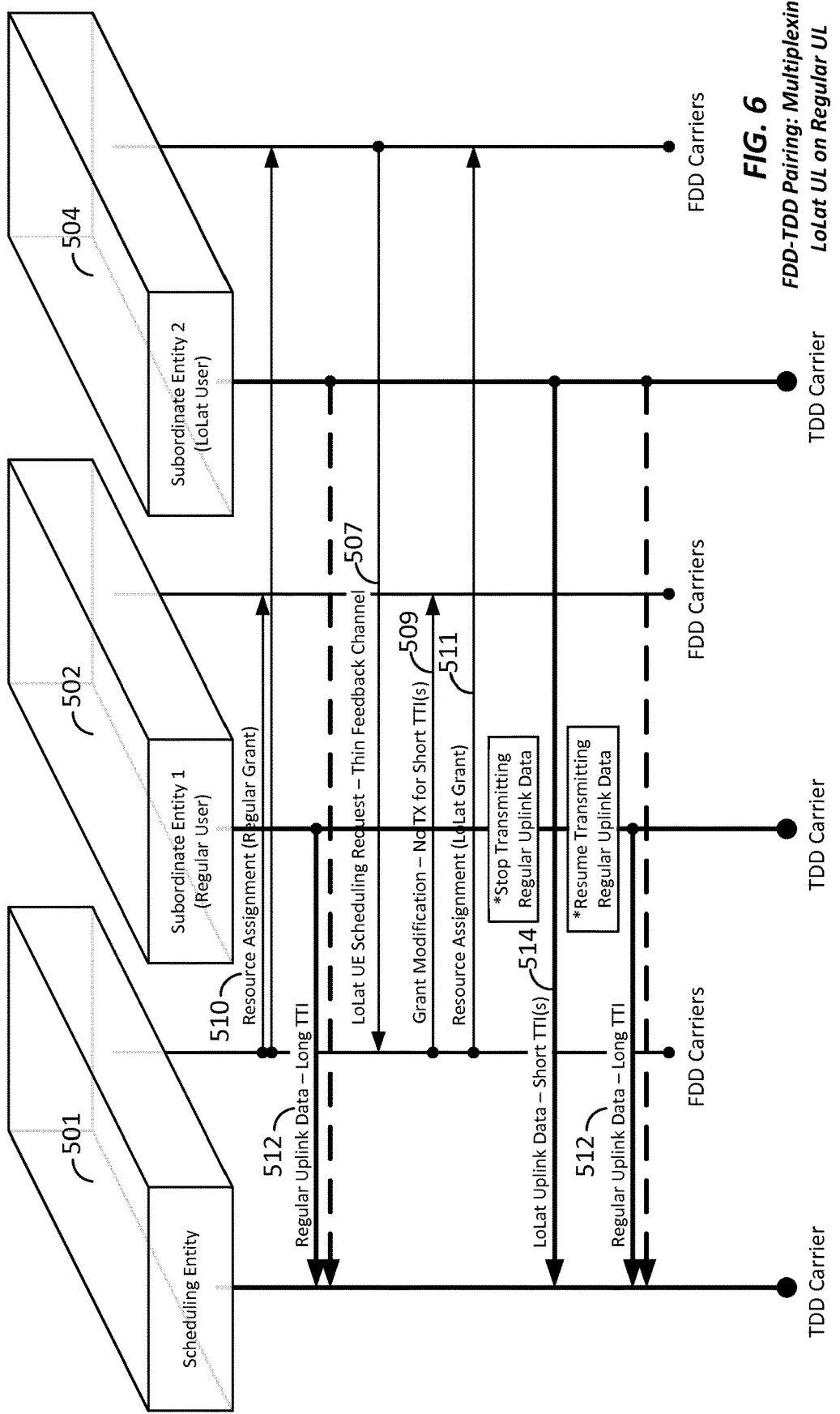
FIG. 6 is a call flow diagram illustrating an example of multiplexing low latency uplink data with regular uplink data utilizing a thin control channel according to some embodiments.

FIG. 6 is a call flow diagram illustrating an exemplary resource assignment and re-assignment procedure as it might occur in accordance with one example for multiplexing uplink data with different latency targets utilizing a TDD data carrier paired with FDD component carriers for control information. In this illustration, time moves forward in the downward direction, and communication signals between the illustrated entities are denoted with arrows between the lines below the respective entities. As illustrated, a scheduling entity 501 is in communication with a plurality of subordinate entities 104, including a regular user 502 and a LoLat user 504. Each entity 501, 502, and 504 is configured for communication over a TDD carrier, and an FDD carrier. The respective TDD and FDD carriers are illustrated schematically with the two vertical lines extending down from each respective entity.

Figure 7:
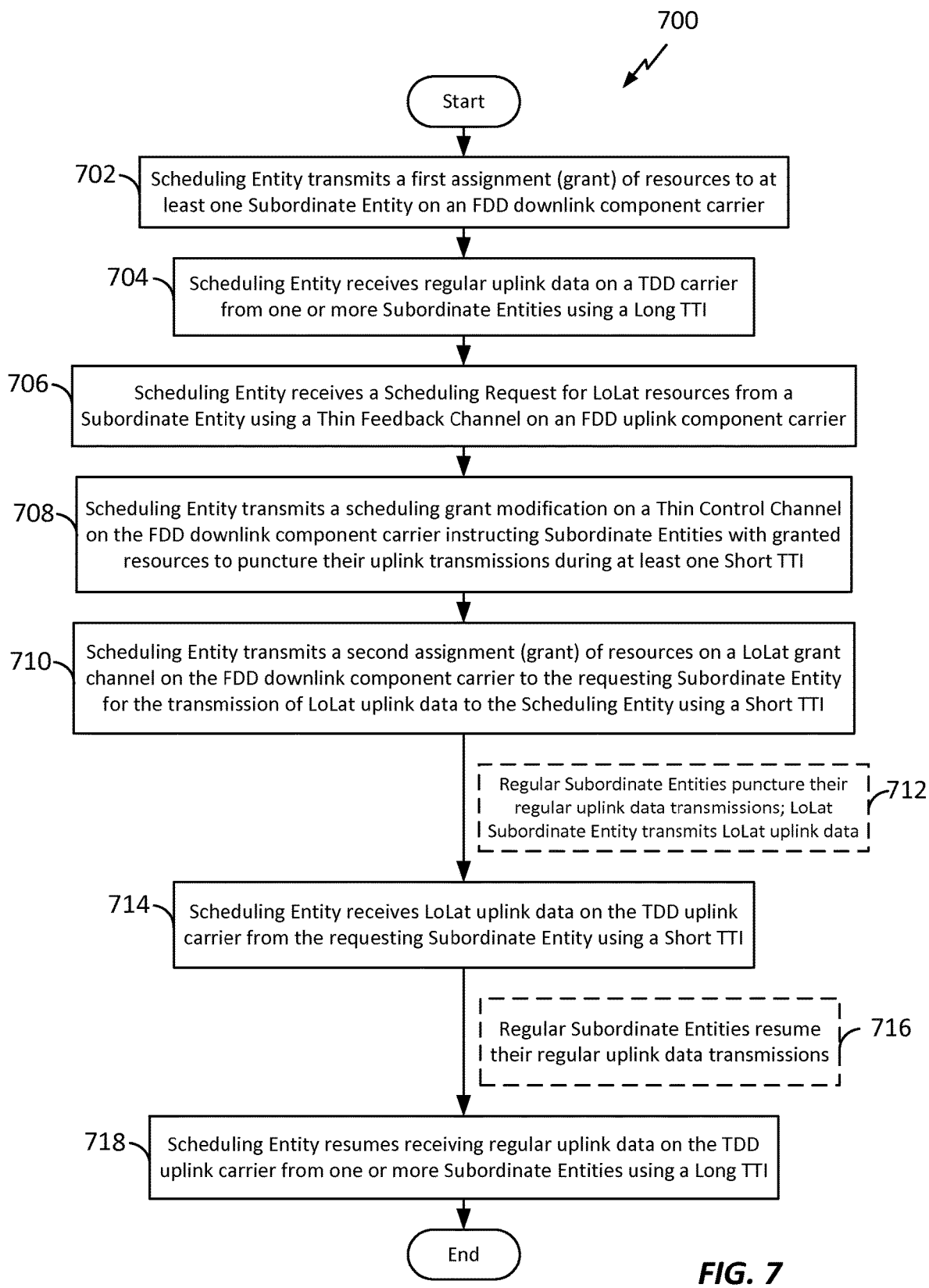
FIG. 7 is a flow chart illustrating an example of multiplexing low latency uplink data with regular uplink data utilizing a thin control channel from the point of view of a scheduling entity, according to some embodiments.

FIG. 6 is described below in conjunction with a flow chart illustrated in FIG. 7. That is, FIG. 7 is a flow chart illustrating an exemplary process 700 for resource assignment and re-assignment in accordance with some aspects of the present disclosure. The process 700 is described from the point-of-view of a scheduling entity 501, and may accordingly, as described in conjunction with FIG. 6, be operational at the scheduling entity 102 described above in conjunction with FIGS. 1 and/or 2. In other examples within the scope of the present disclosure, the process 700 may be operational by a general purpose processor, a processing system 214 as described above and illustrated in FIG. 2, or any suitable means for carrying out the described functions. The specific order of steps or blocks shown in FIG. 7 is merely exemplary in nature, and in various aspects of the disclosure, these steps or blocks may occur in any suitable order, with some examples including two or more steps or blocks occurring simultaneously.

At block 702, the scheduling entity 501 may transmit a first assignment or grant 510 of time-frequency resources to at least one subordinate entity on the FDD downlink component carrier. Any suitable control channel on the FDD downlink component carrier may be utilized for the first resource assignment, such as a downlink assignment channel. Here, the first resource assignment 510 may be configured to indicate which time-frequency resource or resources are assigned to the respective subordinate entities for regular transmissions of uplink data, that is, transmissions utilizing the long TTI. In accordance with the first resource assignment 510, at block 704, the scheduling entity 501 may receive regular uplink data 512 on the TDD uplink carrier from the at least one subordinate entity (e.g., the subordinate entities 502 and 504) utilizing the long TTI. Here, with reference to FIG. 5, this regular uplink data 512 may correspond to the transmissions from regular users 502. As illustrated in FIG. 6 with the dashed-line arrow, regular uplink data may optionally be transmitted from the second subordinate entity 504, depending on the contents of the first resource assignment 510 and whether the second subordinate entity 504 is configured to transmit uplink data transmissions utilizing the long TTI.

The blocks 702 and 704 may repeat, or be iterated a plurality of times in various examples, as regular uplink data 512 may continue to be transmitted from the subordinate entities. However, at any given time, it may arise that the subordinate entity 504 (i.e., the LoLat user 504) may wish to transmit LoLat data to the scheduling entity 501. Accordingly, at block 706, the scheduling entity 501 may receive a LoLat scheduling request 507 on the thin feedback channel 506 on the FDD uplink component carrier from the LoLat user 504 (i.e., the second subordinate entity 504). The LoLat scheduling request 507 may include information identifying the requesting subordinate entity 504, and including any pertinent information relating to the LoLat data desired to be transmitted.

At block 708, the scheduling entity 501 may transmit an uplink scheduling grant modification 509 on the thin control channel 508 on the FDD downlink component carrier. Here, the uplink scheduling grant modification 509 may instruct the regular users such as the first subordinate entity 502, having granted time-frequency resources for long-TTI uplink transmissions, to puncture their uplink transmissions during at least one designated short TTI. Further at block 710, the scheduling entity 501 may transmit a second resource assignment or grant 511 of time-frequency resources to the requesting subordinate entity (i.e., the LoLat user 504) on the LoLat grant channel 510 on the FDD downlink component carrier. Here, the second resource assignment 511 may include information identifying the requesting subordinate entity 504, and information identifying time-frequency resources granted on the TDD uplink carrier for the LoLat uplink transmission. In some examples, the transmission of the uplink scheduling grant modification 509 at block 708, and the transmission of the second resource assignment 511 at block 710, may occur simultaneously. That is, these transmissions may be multiplexed, for example, utilizing different time-frequency resources. In other examples, these transmissions may be at different times, according to the details of a particular implementation.

Block 712 represents operations at one or more subordinate entities, such as regular users 502 and LoLat user(s) 504. That is, in response to the uplink grant modification 509, the regular users (i.e., the first subordinate entity 502) may puncture their previously scheduled uplink data transmissions that utilize the long TTI. Further, in response to the second resource assignment 511, the LoLat user(s) (i.e., the second subordinate entity 504) may transmit the LoLat uplink data 514 utilizing the assigned time-frequency resources on the TDD carrier.

At block 714, the scheduling entity 501 may receive the LoLat uplink data 514 transmitted from the requesting subordinate entity 504 utilizing the short TTI on the TDD carrier.

Block 716 represents operations at one or more subordinate entities, such as the regular users 502 and, in some examples, LoLat user(s) 504. That is, the regular subordinate entities may resume their regular uplink data transmissions on the TDD uplink carrier when transmission of the LoLat uplink data has been completed. Accordingly, at block 718, the scheduling entity 502 may resume receiving regular uplink data on the TDD uplink carrier from one or more subordinate entities utilizing the long TTI.

By utilizing the above scheme, pairing a TDD carrier for uplink data transmissions with FDD carriers for control channel transmissions, a thin control channel 508 can enable a scheduling entity to multiplex at least two different data types or categories, having different TTIs, for uplink transmissions from a set of subordinate entities.

FDD-TDD Carrier Pairing: Multiplexing LoLat DL on Regular UL

Figure 8:
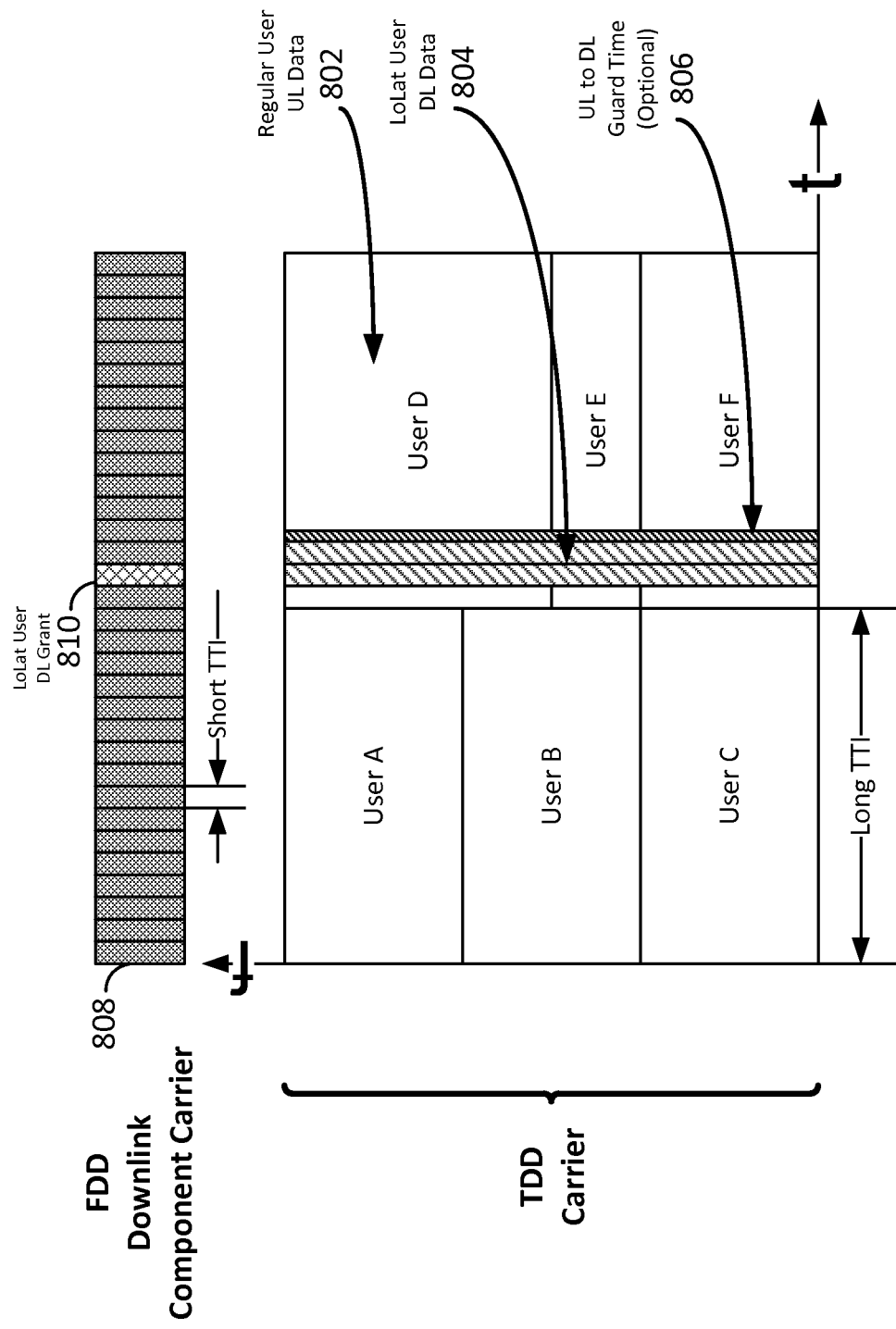
FIG. 8 is a schematic diagram illustrating a synchronous multiple access channel structure with a TDD carrier being paired with an FDD carrier for multiplexing low latency downlink data with regular uplink data according to one example.

FIG. 8 illustrates another example of pairing a TDD carrier with an FDD carrier, providing for multiplexing of LoLat downlink transmissions (i.e., transmissions from a scheduling entity) with regular uplink transmissions (i.e., transmissions from a subordinate entity) on the TDD carrier. In the illustrated example, the TDD carrier is illustrated in much the same way as the TDD carrier in FIG. 4, with uplink resources shown with a plurality of users (subordinate entities) transmitting "regular" uplink data utilizing a long TTI. Here, as will be described in further detail below, the scheduling entity may modify the scheduling assignment or grant of time-frequency resources, interrupting the ongoing uplink transmissions on the TDD carrier, with downlink transmissions on the TDD carrier.

In the illustrated example, a control channel for controlling the user data carried on the TDD carrier is carried on an FDD downlink component carrier. That is, the FDD band includes in its downlink component carrier a LoLat grant channel 808, in which a subordinate entity may receive information such as a LoLat downlink grant 810.

In this example, because an FDD carrier is paired with the TDD carrier, the subordinate entity may always be receiving a control channel in the downlink direction on the FDD carrier, even while uplink transmissions are ongoing on the TDD carrier. Furthermore, in an aspect of the disclosure, if a particular subordinate entity is not currently transmitting uplink data on the TDD carrier, then that particular user may be configured always to listen for downlink data on the TDD carrier.

In addition to the illustrated channels, time-frequency resources corresponding to the long TTI may be granted for uplink transmissions on the TDD carrier to one or more subordinate entities (e.g., Users A-F) by utilizing any suitable downlink grant channel (not necessarily one of the illustrated channels).

At any given time, during the regular users' 802 transmission of the uplink data on the TDD carrier, the scheduling entity may determine to transmit LoLat downlink data on the TDD carrier. That is, at any time, one or more subordinate entities in communication with the scheduling entity, such as a LoLat user 804, may come to need LoLat communication with the network, wherein more stringent latency requirements for communication are needed than the relatively long latency resulting from the communication by regular users utilizing the long TTI. Thus, in an aspect of the present disclosure, the availability of the LoLat grant channel 808 on the FDD downlink component carrier may enable dynamic multiplexing of the traffic for one or more subordinate entities that desire low latency communication (hereinafter referred to as LoLat users 804), who can utilize a short TTI for data traffic, and the traffic for the regular users 802, who utilize the long TTI for data traffic.

Accordingly, on the LoLat grant channel 808 on the FDD downlink component carrier, at any given time, the scheduling entity may broadcast a LoLat downlink grant 810. The LoLat downlink grant 810 may be structured in any suitable manner. As one example, the LoLat downlink grant 810 may include information to identify one or more LoLat users for which LoLat downlink data is being granted, information identifying time-frequency resources being allocated to the user, and any other suitable information regarding receiving and decoding of the downlink data.

At the same time, on the TDD carrier, the scheduling entity may broadcast LoLat downlink data to the LoLat user(s) 804, in accordance with the LoLat downlink grant 810. That is, in some examples, the LoLat downlink grant 810 and the LoLat downlink data may be transmitted at the same time, i.e., during the same short TTI. However, this is not necessarily the case, and in other examples, the LoLat downlink grant 810 and the LoLat downlink data may be transmitted during completely non-overlapping short TTIs, or, as illustrated in FIG. 8, a single short TTI may be utilized for the LoLat downlink grant 810, which may overlap with any number (including zero) of short TTIs during which the LoLat downlink data is transmitted on the TDD carrier.

That is, the LoLat user 804 (i.e., the subordinate entity addressed in the LoLat grant 810) may be configured to receive and buffer the frame on the TDD carrier, even if it is not actively receiving the regular downlink data on the TDD carrier. Upon processing the LoLat downlink grant (which may occur at the end of each long TTI), if a corresponding LoLat grant 810 is received on the LoLat grant channel 808, that LoLat user 804 may accordingly decode the LoLat downlink data transmitted on the TDD carrier.

At the scheduling entity, prior to the LoLat downlink data transmission on the TDD carrier, it is receiving the regular uplink transmissions from regular users 802. At the time of the LoLat transmission, to accommodate the downlink transmission of the LoLat data on the TDD carrier, the scheduling entity may cease receiving any regular uplink data transmissions on the TDD carrier, and may begin transmitting the downlink LoLat data on the TDD carrier. Here, the regular users 802 may continue transmitting their regular uplink data on the TDD carrier, since they may not have received any advance warning or indication that the scheduling entity would not be listening to their uplink transmissions on the TDD carrier during the corresponding short TTIs. Following completion of the LoLat downlink transmissions on the TDD carrier, the scheduling entity may switch back and turn its receiver on, to receive the ongoing further regular uplink data transmissions on the TDD carrier.

In some aspects of the disclosure, the regular users 802 that were interrupted by the LoLat downlink transmission might not have any indication that they were, in fact, interrupted and that their uplink transmissions were temporarily ignored. That is, the scheduling entity need not necessarily inform the regular users 802 that their uplink transmissions are being interrupted/ignored to accommodate the LoLat downlink transmission.

One potential impact of this scheme may be some degree of inter-cell interference caused by the scheduling entity, when it transmits its LoLat downlink transmission on the TDD carrier, upon other neighboring scheduling entities (e.g., where two high-power base stations neighbor one another). Furthermore, inter-user interference may occur, wherein the regular users 802, which may continue to transmit their uplink data on the TDD carrier, may impact the reception performance of the LoLat user 804.

Accordingly, in a further aspect of the disclosure, the regular users 802 may have the capability to monitor the FDD downlink carrier, including transmissions on the LoLat grant channel 808, during their transmissions of regular uplink data on the TDD carrier. Here, in some examples, the FDD downlink carrier may include further control information directed to the regular users 802, which may indicate to those users that their uplink transmissions on the TDD carrier are being interrupted for a LoLat user. In this way, the regular users 802 may be enabled to cease their uplink transmissions on the TDD carrier, reducing or preventing their potential jamming of the LoLat user's 804 reception of the LoLat downlink data on the TDD carrier. In a further aspect of the disclosure, a guard time 806 may be utilized after the end of the LoLat downlink transmission, before the regular users 802 resume their transmissions of regular uplink data on the TDD carrier. The guard time 806 may be eliminated in some examples.

Figure 9:
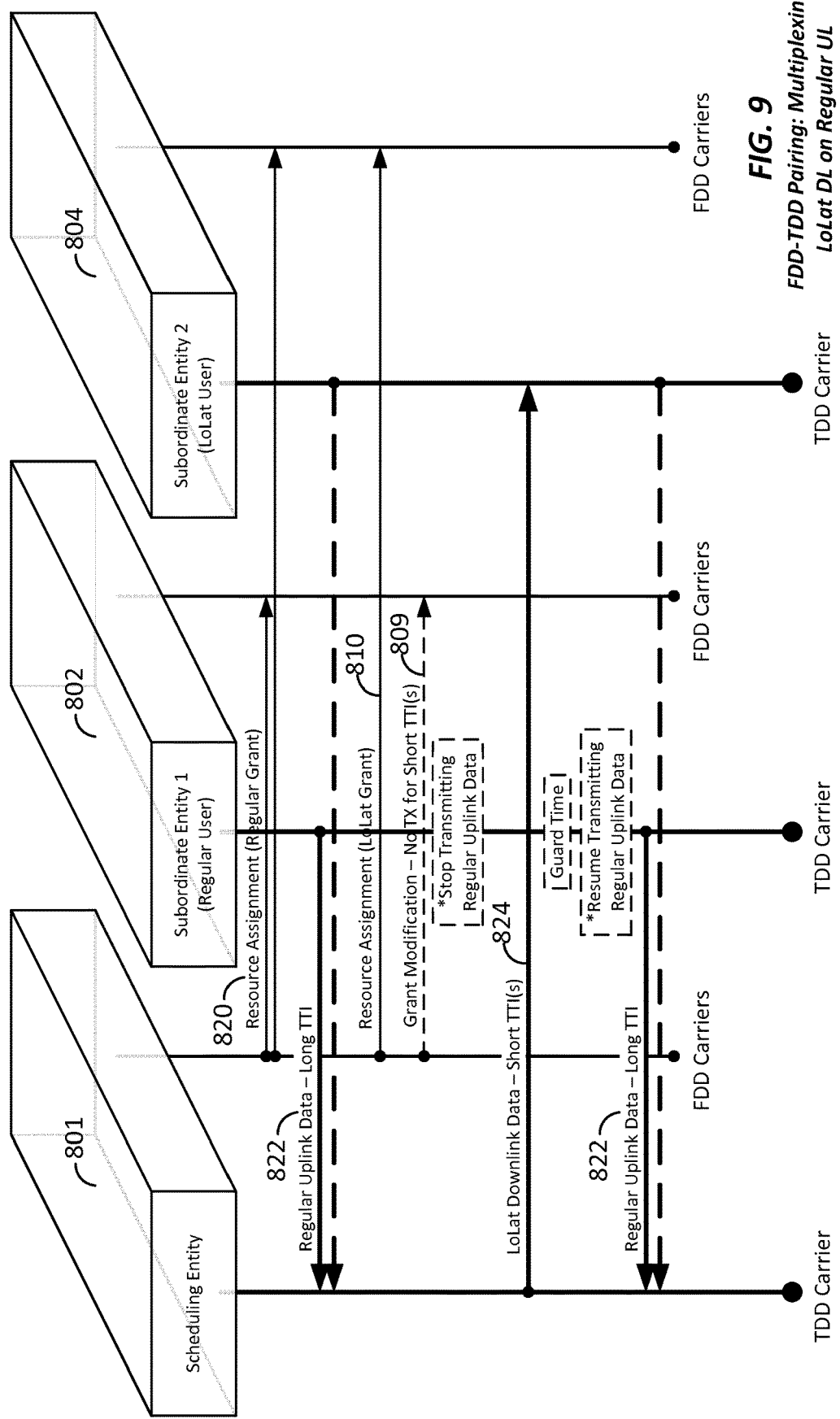
FIG. 9 is a call flow diagram illustrating an example of multiplexing low latency downlink data with regular uplink data utilizing a thin control channel according to some embodiments.

FIG. 9 is a call flow diagram illustrating an exemplary resource assignment and re-assignment procedure as it might occur in accordance with one example for multiplexing uplink and downlink data with different latency targets utilizing a TDD data carrier paired with FDD component carriers for control information. In this illustration, time moves forward in the downward direction, and communication signals between the illustrated entities are denoted with arrows between the lines below the respective entities. As illustrated, a scheduling entity 801 is in communication with a plurality of subordinate entities 104, including a regular user 802 and a LoLat user 804. Each entity 801, 802, and 804 is configured for communication over a TDD carrier, and an FDD carrier. The respective TDD and FDD carriers are illustrated schematically with the two vertical lines extending down from each respective entity.

FIG. 9 is described below in conjunction with a flow chart illustrated in FIG. 10. That is, FIG. 10 is a flow chart illustrating an exemplary process 1000 for resource assignment and re-assignment utilizing a TDD data carrier paired with FDD component carriers for control information in accordance with some aspects of the present disclosure. The process 1000 is described from the point-of-view of a scheduling entity 801, and may accordingly, as described in conjunction with FIG. 9, be operational at the scheduling entity 102 described above in conjunction with FIGS. 1 and/or 2. In other examples within the scope of the present disclosure, the process 1000 may be operational by a general purpose processor, a processing system 214 as described above and illustrated in FIG. 2, or any suitable means for carrying out the described functions. The specific order of steps or blocks shown in FIG. 10 is merely exemplary in nature, and in various aspects of the disclosure, these steps or blocks may occur in any suitable order, with some examples including two or more steps or blocks occurring simultaneously.

At block 1002, the scheduling entity 801 may transmit a first assignment or grant 820 of time-frequency resources to at least one subordinate entity on the FDD downlink component carrier. Any suitable control channel on the FDD downlink component carrier may be utilized for the first resource assignment, such as a downlink assignment channel. Here, the first resource assignment 820 may be configured to indicate which time-frequency resource or resources are assigned to the respective subordinate entities for regular transmissions of uplink data, that is, transmissions utilizing the long TTI. In accordance with the first resource assignment 820, at block 1004, the scheduling entity 801 may receive regular uplink data 822 on the TDD uplink carrier from the at least one subordinate entity (e.g., the subordinate entities 802 and 804) utilizing the long TTI. Here, with reference to FIG. 8, this regular uplink data 822 may correspond to the transmissions from regular users 802. As illustrated in FIG. 9 with the dashed-line arrow, regular uplink data may optionally be transmitted from the second subordinate entity 804, depending on the contents of the first resource assignment 820 and whether the second subordinate entity 804 is configured to transmit uplink data transmissions utilizing the long TTI.

The blocks 1002 and 1004 may repeat, or be iterated a plurality of times in various examples, as regular uplink data 822 may continue to be transmitted from the subordinate entities. However, at any given time, it may arise that the scheduling entity 801 may wish to transmit LoLat data to a particular subordinate entity (i.e., the LoLat user 804). Accordingly, at block 1006, the scheduling entity 801 may transmit an assignment or grant 820 of time-frequency resources on the LoLat grant channel 808 on the FDD downlink component carrier, to at least one subordinate entity (e.g., the LoLat user 804). Here, the resource assignment 810 may indicate for the LoLat user 804 to receive LoLat downlink data from the scheduling entity 801 utilizing at least one short TTI. Specifically, the resource assignment 810 may include information identifying a particular subordinate entity 804, and information identifying time-frequency resources granted on the TDD carrier for the LoLat downlink transmission.

At block 1008, the scheduling entity 801 may optionally (as indicated by the dashed-line box 1008) transmit an uplink scheduling grant modification 809 on any suitable channel on the FDD downlink component carrier. Here, the uplink scheduling grant modification 809 may instruct the regular users such as the first subordinate entity 802, having granted time-frequency resources for long-TTI uplink transmissions, to puncture their uplink transmissions during at least one designated short TTI (i.e., the short TTI(s) corresponding to the LoLat grant 810).

Block 1010 represents operations at one or more subordinate entities, such as regular users 802 and LoLat user(s) 804. That is, in response to the uplink grant modification 809, the regular users (e.g., the first subordinate entity 802) may optionally puncture their previously scheduled uplink data transmissions that utilize the long TTI. The puncturing is an optional step, operable on subordinate entities configured to monitor the control channels on the FDD downlink component carrier while transmitting uplink data on the TDD carrier.

At block 1012, in accordance with the resource assignment 810, the scheduling entity 801 may transmit the LoLat downlink data 824 on the TDD carrier. In some examples, the transmission of the LoLat grant 810 and the LoLat downlink data 824 may occur at the same time, i.e., during the same short TTI. However, this is not necessarily the case, and in other examples, the LoLat downlink grant 810 and the LoLat downlink data may be transmitted during completely non-overlapping short TTIs, or, as illustrated in FIG. 8, a single short TTI may be utilized for the LoLat downlink grant 810, which may overlap with any number (including zero) of short TTIs during which the LoLat downlink data is transmitted on the TDD carrier.

Blocks 1014 and 1016 represent operations at one or more subordinate entities, such as the regular users 802 and, in some examples, LoLat user(s) 804. That is, at block 1014, the regular subordinate entities may optionally wait for a suitable gap or guard time 806, after the end of the scheduled LoLat downlink transmissions 824. This guard time 806 may for example compensate for any propagation delay or other air interface delay, allowing full completion of the LoLat downlink transmissions to all users in the service area prior to resumption of any uplink transmissions on the TDD carrier. At block 1016, the regular subordinate entities (i.e., regular user 802) may resume their regular uplink data transmissions on the TDD carrier when transmission of the LoLat downlink data has been completed (and optionally after the guard time 806). Accordingly, at block 1018, the scheduling entity 802 may resume receiving regular uplink data on the TDD carrier from one or more subordinate entities utilizing the long TTI.

By utilizing the above scheme, pairing a TDD carrier for data transmissions with an FDD carrier for control channel transmissions, a thin LoLat grant channel 808 can enable a scheduling entity to rapidly and dynamically control the multiplexing of uplink and downlink data on the TDD carrier having at least two different data types or categories, from a set of subordinate entities.

FDD-TDD Carrier Pairing: Multiplexing LoLat UL on Regular DL

Figure 11:
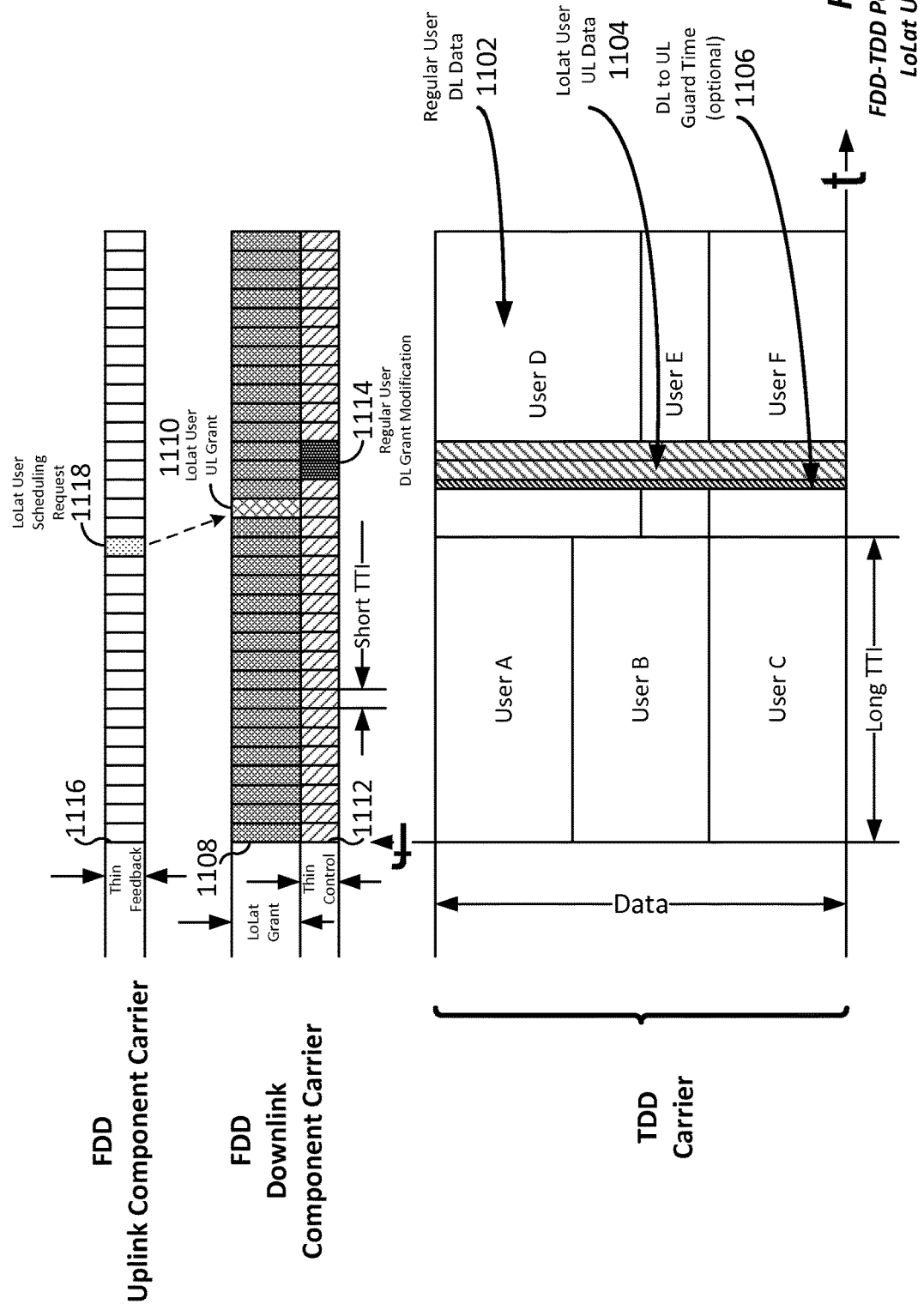
FIG. 11 is a schematic diagram illustrating a synchronous multiple access channel structure with a TDD carrier being paired with an FDD carrier for multiplexing low latency uplink data with regular downlink data according to one example.

FIG. 11 illustrates yet another example of pairing a TDD carrier with an FDD carrier, providing for multiplexing of LoLat uplink transmissions (i.e., transmissions from a subordinate entity) with regular downlink transmissions (i.e., transmissions from a scheduling entity). In the illustrated example, the TDD carrier is illustrated in much the same way as the TDD carrier in FIG. 8, with downlink resources shown with a scheduling entity transmitting "regular" downlink data utilizing a long TTI to plurality of users (subordinate entities). Here, as will be described in further detail below, at the request of a subordinate entity, the scheduling entity may modify the scheduling assignment or grant of time-frequency resources, interrupting the ongoing downlink transmissions on the TDD carrier, to enable uplink transmissions (e.g., LoLat data transmissions) on the TDD carrier.

In the illustrated example, a control channel for controlling the data carried on the TDD carrier is carried on an FDD downlink component carrier. That is, the FDD band includes in its downlink component carrier a LoLat grant channel 1108 in which a subordinate entity may receive information such as a LoLat uplink grant 1110, which may carry grant information for the LoLat user 1104 that requested LoLat scheduling to utilize for transmitting a LoLat uplink transmission. The FDD band further includes in its downlink component carrier a thin control channel 1112 that may carry a downlink grant modification 1114, which modifies a downlink time-frequency resource grant corresponding to the regular users' 1102 downlink data reception on the TDD carrier.

In the illustration, the LoLat grant 1110 is shown as occupying a wider bandwidth than the DL grant modification 1114. This represents that, while the DL grant modification 1114 may simply be a few bits representing the frequency resources that are being re-allocated away from a regular user 1102, and a number of short TTIs, the LoLat grant 1110 may include more precise information relating to the LoLat resource assignment such as a user ID, the assignment information, a modulation and coding scheme, etc.

Furthermore, a control channel for enabling subordinate entities to quickly send information to the scheduling entity is carried on an FDD uplink component carrier. That is, the FDD band includes in its uplink component carrier a thin feedback channel 1116 in which the scheduling entity may receive feedback information from subordinate entities such as a LoLat scheduling request 1118.

In addition to the illustrated channels, time-frequency resources corresponding to the long TTI may be granted for downlink transmissions on the TDD carrier to one or more subordinate entities (e.g., Users A-F) by utilizing any suitable downlink grant channel (not necessarily one of the illustrated channels). As these downlink transmissions are ongoing, if a particular subordinate entity, denoted as the LoLat user 1104, wishes to request resources for a LoLat uplink transmission, this subordinate entity may transmit a LoLat scheduling request 1118 on the thin feedback channel 1116 on the FDD uplink component carrier. Here, the LoLat scheduling request 1118 may utilize the short TTI, although this is not necessarily always the case. In response, if the scheduling entity wishes to grant the requested LoLat resource, the scheduling entity 102 may transmit, on the FDD downlink component carrier, a LoLat grant 1110 that informs the LoLat user 1104 that transmitted the LoLat user scheduling request 1118 of its granted resources. After a suitable delay to enable the LoLat user to receive and process the LoLat grant 1110 and prepare for its LoLat uplink transmission, the scheduling entity may further transmit, on the thin control channel 1112, a downlink grant modification that informs the regular users 1102 that are receiving downlink data transmissions on the TDD carrier, that some or all of their granted resources are being modified or removed to make way for the LoLat transmission.

Because the data carrier is a TDD carrier, during transmission of the uplink data by the LoLat user 1104, the downlink data transmissions to the regular users 1102 utilizing the long TTI are punctured, ceased, or suspended. During this time, the LoLat user 1104 may transmit its LoLat uplink transmission on the TDD carrier, resulting in an orthogonal multiple access scheme between regular downlink transmissions and LoLat uplink transmissions on the TDD carrier.

In some examples, just prior to the time at which LoLat uplink transmissions are scheduled to commence, the scheduling entity may suspend its regular downlink data transmissions on the TDD carrier. That is, a gap or guard time 1106 may optionally be utilized when multiplexing LoLat uplink transmissions and regular downlink transmissions on the TDD carrier. Here, this guard time 1106 may for example compensate for any propagation delay or other air interface delay, allowing full completion of the regular downlink transmissions to all users in the service area prior to the time when the LoLat uplink transmissions commence on the TDD carrier.

In the illustration, the downlink grant modification is illustrated as appearing at the same time as the downlink resources are modified. The need for advance timing of the grant modification can be avoided because the downlink grant modification and the downlink data may be buffered and post-processed by the receiving regular UEs, as described above.

Figure 12:
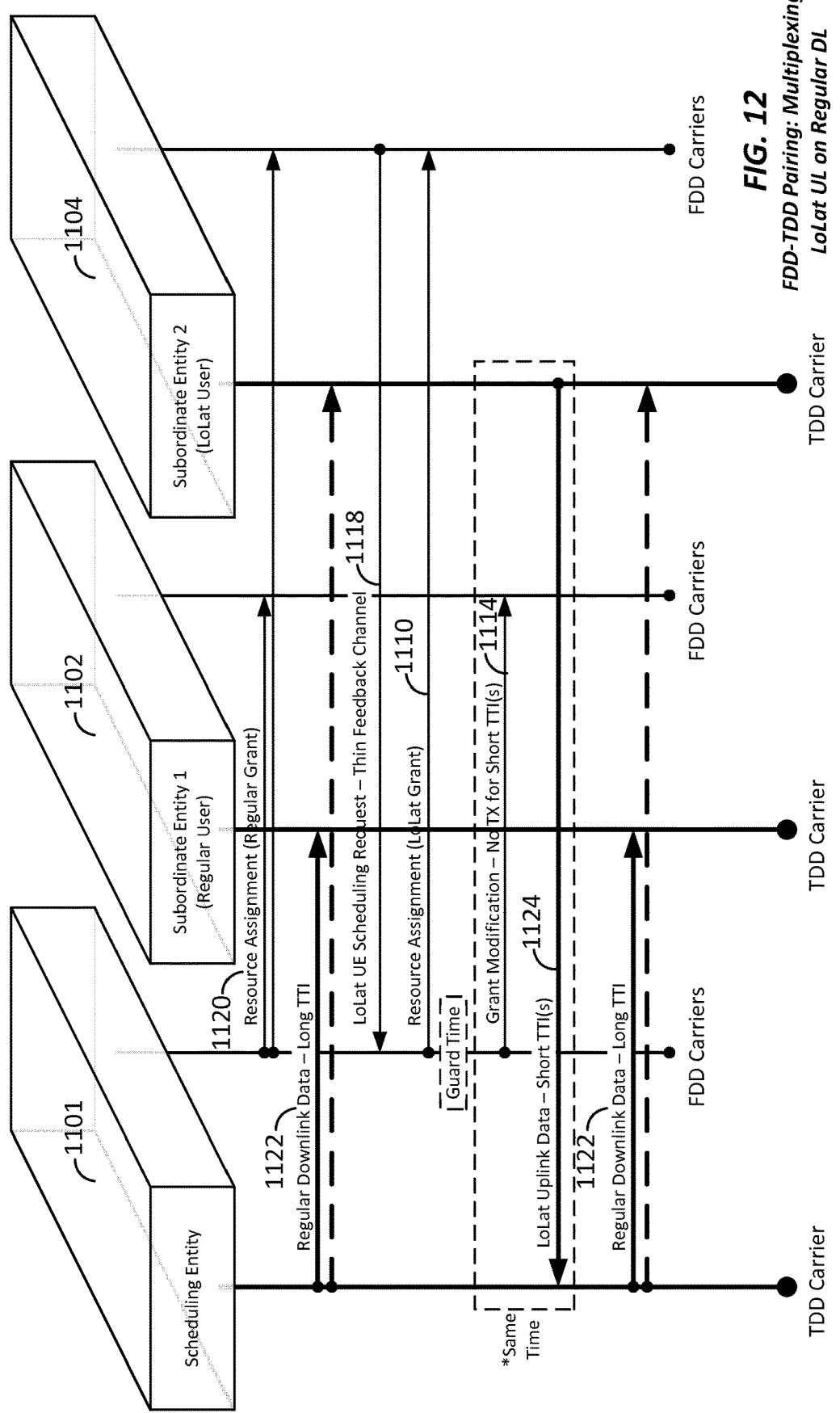
FIG. 12 is a call flow diagram illustrating an example of multiplexing low latency uplink data with regular downlink data utilizing a thin control channel according to some embodiments.

FIG. 12 is a call flow diagram illustrating an exemplary resource assignment and re-assignment procedure as it might occur in accordance with one example for multiplexing uplink and downlink data with different latency targets utilizing a TDD data carrier paired with FDD component carriers for control information. In this illustration, time moves forward in the downward direction, and communication signals between the illustrated entities are denoted with arrows between the lines below the respective entities. As illustrated, a scheduling entity 1101 is in communication with a plurality of subordinate entities 104, including a regular user 1102 and a LoLat user 1104. Each entity 1101, 1102, and 1104 is configured for communication over a TDD carrier, and an FDD carrier. The respective TDD and FDD carriers are illustrated schematically with the two vertical lines extending down from each respective entity.

Figure 13:
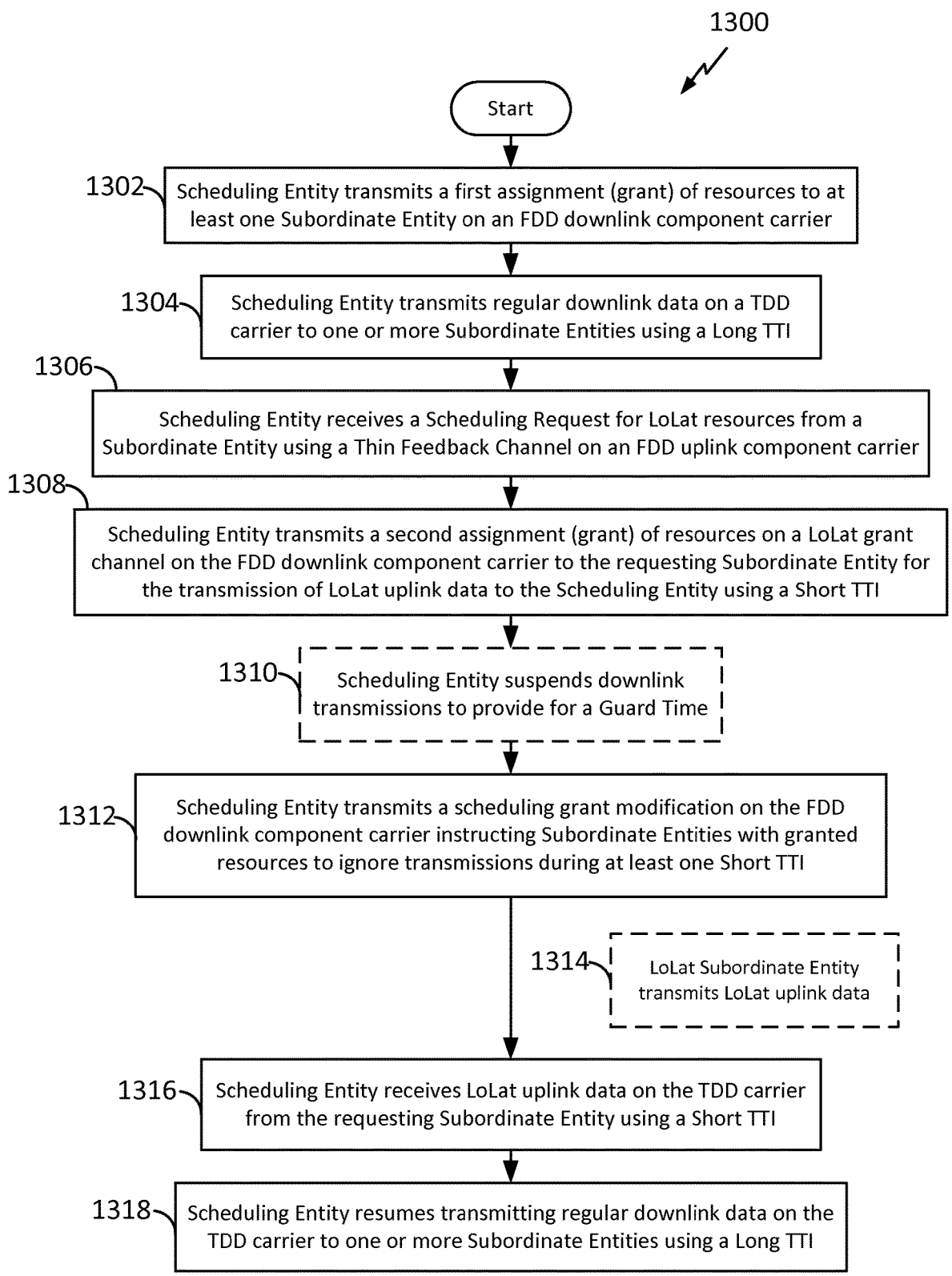
FIG. 13 is a flow chart illustrating an example of multiplexing low latency uplink data with regular downlink data utilizing a thin control channel from the point of view of a scheduling entity, according to some embodiments.

FIG. 12 is described below in conjunction with a flow chart illustrated in FIG. 13. That is, FIG. 13 is a flow chart illustrating an exemplary process 1300 for resource assignment and re-assignment utilizing a TDD data carrier paired with FDD component carriers for control information in accordance with some aspects of the present disclosure. The process 1300 is described from the point-of-view of a scheduling entity 1101, and may accordingly, as described in conjunction with FIG. 12, be operational at the scheduling entity 102 described above in conjunction with FIGS. 1 and/or 2. In other examples within the scope of the present disclosure, the process 1300 may be operational by a general purpose processor, a processing system 214 as described above and illustrated in FIG. 2, or any suitable means for carrying out the described functions. The specific order of steps or blocks shown in FIG. 13 is merely exemplary in nature, and in various aspects of the disclosure, these steps or blocks may occur in any suitable order, with some examples including two or more steps or blocks occurring simultaneously.

At block 1302, the scheduling entity 1101 may transmit a first assignment or grant 1120 of time-frequency resources to at least one subordinate entity on the FDD downlink component carrier. Any suitable control channel on the FDD downlink component carrier may be utilized for the first resource assignment, such as a downlink assignment channel. Here, the first resource assignment 1120 may be configured to indicate which time-frequency resource or resources are assigned to the respective subordinate entities for receiving regular transmissions of downlink data, that is, transmissions utilizing the long TTI. In accordance with the first resource assignment 1120, at block 1304, the scheduling entity 1101 may transmit regular downlink data 1122 on the TDD downlink carrier to the at least one subordinate entity (e.g., the subordinate entities 1102 and 1104) utilizing the long TTI. Here, with reference to FIG. 11, this regular uplink data 1122 may correspond to the downlink transmissions to regular users 1102. As illustrated in FIG. 12 with the dashed-line arrow, regular downlink data may optionally be transmitted to the second subordinate entity 1104, depending on the contents of the first resource assignment 1120 and whether the second subordinate entity 1104 is configured to receive downlink data transmissions utilizing the long TTI.

The blocks 1302 and 1304 may repeat, or be iterated a plurality of times in various examples, as regular downlink data 1122 may continue to be transmitted to the subordinate entities. However, at any given time, it may arise that the subordinate entity 1104 (i.e., the LoLat user 1104) may wish to transmit LoLat uplink data to the scheduling entity 1101. Accordingly, at block 1306, the scheduling entity 1101 may receive a LoLat scheduling request 1118 on the thin feedback channel 1116 on the FDD uplink component carrier from the LoLat user 1104 (i.e., the second subordinate entity 1104). The LoLat scheduling request 1118 may include information identifying the requesting subordinate entity 1104, and including any pertinent information relating to the LoLat data desired to be transmitted.

At block 1308, the scheduling entity 1101 may transmit a second assignment or grant 1110 of time-frequency resources on a LoLat grant channel 1108 on the FDD downlink component carrier, to the requesting subordinate entity 1104. Here, the second resource assignment 1110 may include information identifying the requesting subordinate entity 1104, and information identifying time-frequency resources granted on the TDD uplink carrier for the LoLat uplink transmission.

At optional block 1310, the scheduling entity 1101 may suspend its regular downlink data transmissions 1122 on the TDD carrier just prior to the time at which LoLat uplink transmissions are scheduled to commence. That is, a gap or guard time 1106 may optionally be utilized when multiplexing LoLat uplink transmissions 1124 and regular downlink transmissions 1122 on the TDD carrier.

At block 1312, the scheduling entity 1101 may transmit a downlink scheduling grant modification 1114 on the thin control channel 1112 on the FDD downlink component carrier. Here, the downlink scheduling grant modification 1114 may instruct the regular users such as the first subordinate entity 1102, having granted time-frequency resources for long-TTI downlink transmissions, to ignore any uplink transmissions during at least one designated short TTI. That is, since the transmissions during that TTI will be LoLat uplink transmissions from the LoLat user 1104, not directed to the regular user 1102, the data may not be decodable by the regular user 1102 and can be ignored by the regular user 1102 during post-processing of the corresponding long TTI.

Block 1314 represents operations at one or more subordinate entities, such as the LoLat user 1104. That is, in response to the second resource assignment 1110, the LoLat user (i.e., the second subordinate entity 1104) may transmit the LoLat uplink data 1124 utilizing the assigned time-frequency resources on the TDD carrier.

In some examples, the transmission of the downlink scheduling grant modification 1114 at block 1312, and the transmission of the LoLat uplink data 1124 on the TDD carrier at block 1314 (and the corresponding suspension of downlink data transmissions on the TDD carrier, not including any guard time that may be added), may occur simultaneously. That is, these transmissions may be multiplexed, for example, utilizing different time-frequency resources. In other examples, these transmissions may be at different times, according to the details of a particular implementation. That is, the regular users 1102 may be configured to buffer or cache the contents of the thin control channel 1112 and the TDD carrier, such that the ignoring of data during the designated short TTI(s) may be performed during post-processing by the regular users 1102.

At block 1316, the scheduling entity 1101 may receive the LoLat uplink data 1124 transmitted from the requesting subordinate entity 1104 utilizing the short TTI on the TDD carrier. At block 1318, the scheduling entity 1101 may resume transmitting the regular downlink data 1122 on the TDD carrier, to one or more subordinate entities, such as the regular user 1102 utilizing the long TTI.

By utilizing the above scheme, pairing a TDD carrier for uplink data transmissions with FDD carriers for control channel transmissions, a thin control channel 1112 can enable a scheduling entity to multiplex uplink and downlink data having at least two different data types or categories, for set of subordinate entities.

TDD-TDD Carrier Pairing

Figure 14:
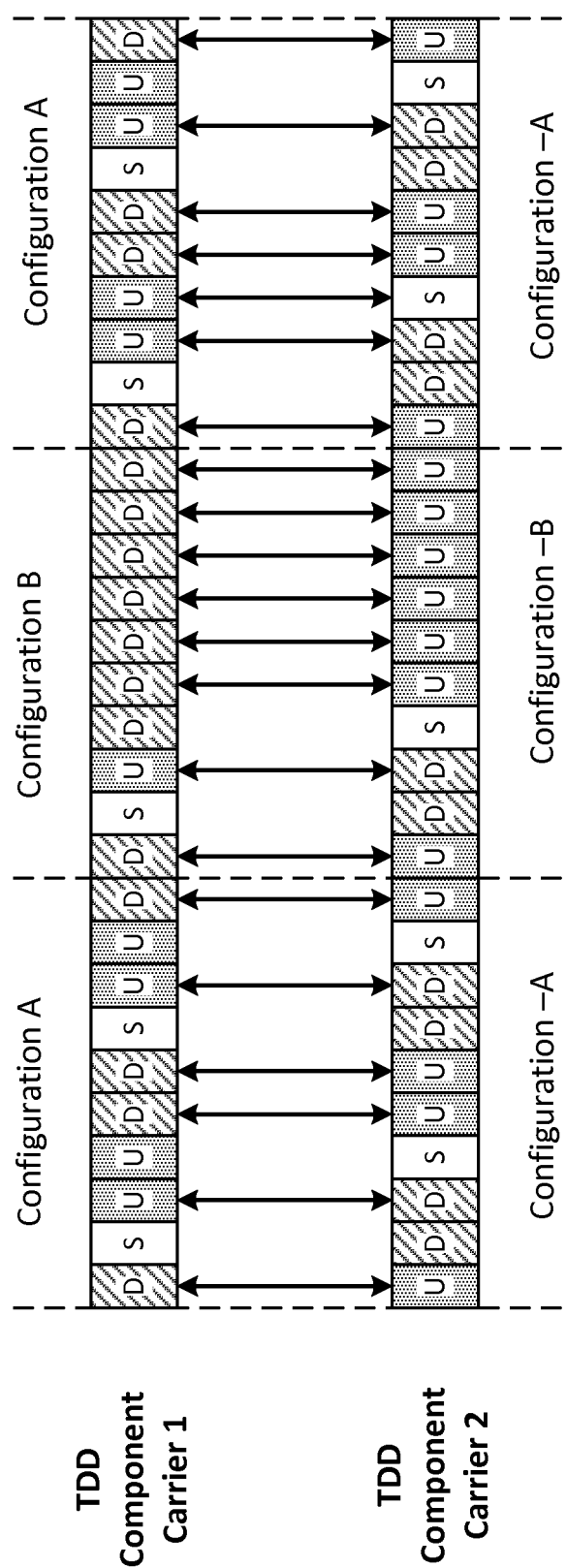
FIG. 14 is a schematic diagram illustrating inverse (conjugate) pairing of time division duplex carriers according to one example.

In a further aspect of the disclosure, rather than pairing an FDD carrier with a TDD carrier, two TDD carriers may be paired with one another in a way that can enable full duplex communication. FIG. 14 illustrates one example of a pairing of two TDD component carriers (CC). In this illustration, a first CC (component carrier 1 or CC1) is paired with a second CC (component carrier 2 or CC2). The horizontal axis represents time, and the vertical axis represents frequency (not to scale). Both CC1 and CC2 are TDD carriers, wherein uplink time slots, indicated with a U, are time-multiplexed with downlink time slots, indicated with a D on each respective carrier. Additionally, some time slots are identified as special time slots, and indicated with an S, described further below. Herein, a time slot may correspond to any suitable duration of time, and may correspond to other nomenclature such as a transmission time interval (TTI), subframe, frame, symbol duration, etc.

If only CC1 were usable by a communication device, it is seen that only downlink, uplink, or special time slots exist at any single time. The illustration shows two different types of frames, identified as Configuration A and Configuration B. In the first frame, identified as Configuration A, there is the same number of uplink time slots U and downlink time slots D, with two of the time slots identified as special time slots S. In the second frame, identified as Configuration B, most of the time slots are downlink time slots D, with one uplink time slot U and one special time slot S. The third frame is shown as another Configuration A frame. These configurations are merely one example, which corresponds to some existing configurations defined in TD-LTE standards.

At any moment, for example, during the second frame identified as Configuration B, if the communication device has a need to send feedback on the uplink, it may not be presented with such an opportunity, because it is faced with a long stretch of downlink-only time slots. Here, the feedback would need to be buffered at least until the next opportunity is presented in the third time slot of the third frame.

Therefore, in an aspect of the present disclosure, the first TDD component carrier CC1 may be paired with a second TDD component carrier CC2. Here, CC2 may implement an inverse, conjugate, or complementary transmit/receive organization relative to that of CC1. In the present disclosure, the terms inverse, complementary, and conjugate are utilized interchangeably, generally referring to a configuration wherein at least some of the downlink time slots D in CC1 are paired with uplink time slots U in CC2, and at least some of the uplink time slots U in CC1 are paired with downlink time slots D in CC2. The configuration illustrated is merely exemplary in nature, and other configurations may be utilized within the scope of the present disclosure, some of which may pair all time slots across the two component carriers, and others of which may include some unpaired uplink/downlink time slots.

As shown, the Configuration A frame is paired with a Configuration −A frame, wherein Configuration −A represents the inverse (or conjugate) of Configuration A. Likewise, the Configuration B frame is paired with a Configuration −B frame.

The special time slot, indicated with the S, in the illustrated example may be utilized for downlink-to-uplink switching. That is, with reference to communication by a subordinate entity 104, when utilizing a TDD carrier, where the timing for both the uplink and downlink transmissions is driven by a scheduling entity 102, there may be a need for a certain time gap when transitioning from a downlink time slot D and an uplink time slot U. That is, there is a certain propagation delay between the transmission of the downlink time slot D from the scheduling entity 102 to the subordinate entity 104, as well as between the transmission of the uplink time slot U from the subordinate entity 104 to the scheduling entity 102. To account for these propagation delays, special time slots S insert a gap between the end of a downlink time slot D and the beginning of an uplink time slot U, so that the scheduling entity 102 and the subordinate entity 104 can maintain synchronization. Here, the gap may correspond to a time when neither uplink nor downlink communications occur. The length of the gap in the special time slot S can be configured in accordance with the size of the cell.

In various aspects of the disclosure, the special time slots S in one component carrier can be paired with any suitable time slot on its paired component carrier, including a downlink time slot D, an uplink time slot U, or another special time slot S. In some examples, such as the illustrated example in FIG. 14, each of the special time slots S in one component carrier (CC1) may be mapped (e.g., time-aligned) to a respective downlink time slot in its paired component carrier (CC2). However, this is merely one example, and is not intended to be limiting in nature.

In a further example, special time slots S may be inserted in the inverse or paired component carrier CC2 as needed, in between transitions from downlink time slots to uplink time slots.

In some examples, the paired component carriers may be inter-band carriers. That is, each of the component carriers CC1 and CC2 may lie in a different band from that of its paired component carrier. By placing the component carriers in different bands, the RF functionality at a device such as a scheduling entity 102 and a subordinate entity 104 can be improved, reducing interference and de-sense between the respective carriers. This is not a requirement, however, and intra-band component carriers may be utilized within the scope of the present disclosure; however, it may be beneficial in such case to choose component carriers that are as far apart in frequency as feasible.

The illustration in FIG. 14 shows, as one example, two paired TDD component carriers having essentially the same bandwidth. That is, each component carrier has the same width in the vertical frequency dimension. Here, if two TDD component carriers of the same bandwidth are paired with one another, one of the benefits of a conventional TDD carrier may be lost. That is, conventional TDD has an advantage that, depending on the characteristics of the traffic, it can be decided how many time slots can be used for downlink traffic, and how many time slots can be used for uplink traffic, enabling a dynamic assignment and providing for the most efficient use of available resources. This flexibility would be lost if all time slots in one direction in one component carrier are paired with time slots in the other direction in its paired component carrier, if the paired component carriers have the same bandwidth. That is, with such a configuration the sum of downlink time slots on both component carriers would be equal to the sum of uplink time slots on both component carriers.

Figure 15:
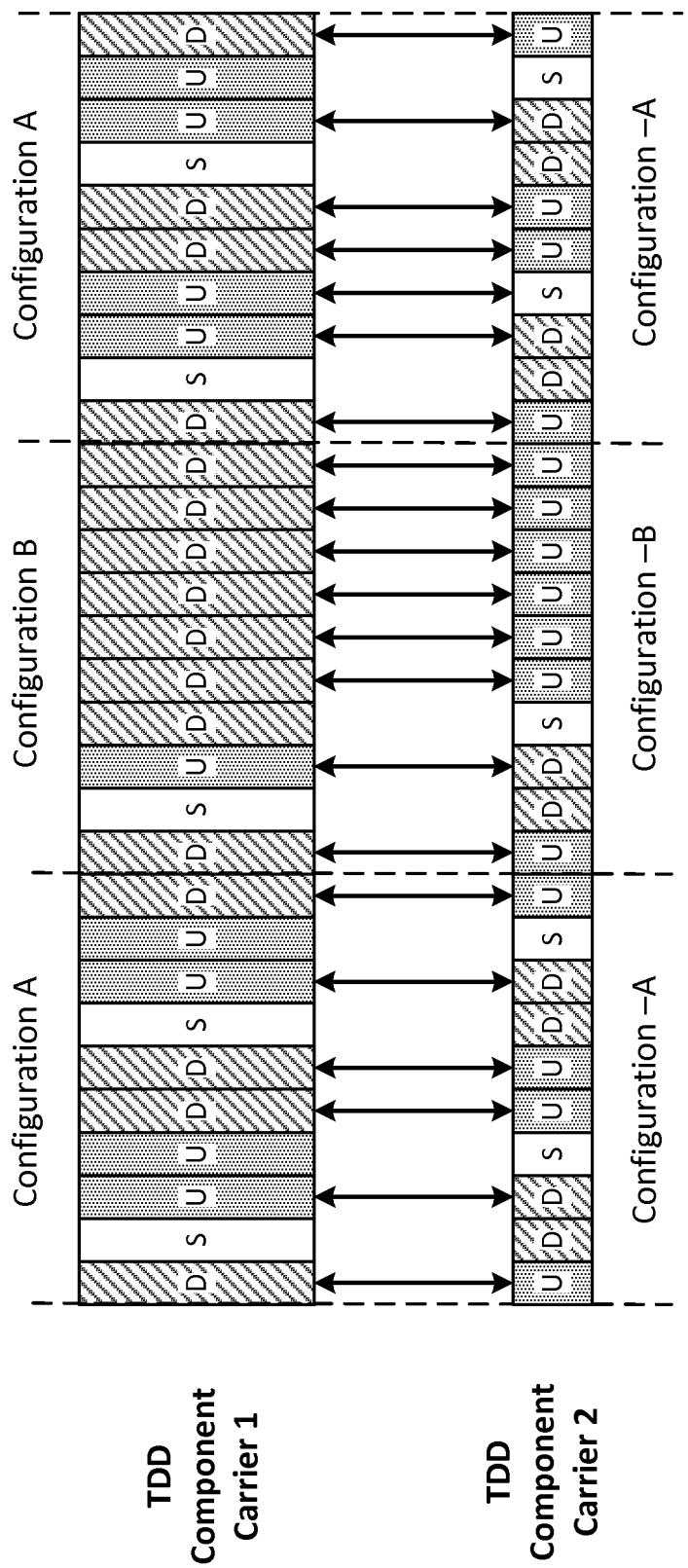
FIG. 15 is a schematic diagram illustrating inverse (conjugate) pairing of time division duplex carriers according to another example.

FIG. 15 illustrates a conjugate pairing of component carriers in accordance with a further aspect of the present disclosure, configured to afford a degree of flexibility in the allocation of uplink and downlink time slots.

The reason full duplex is desired is not necessarily for the benefit of the traffic channels. Rather, as described above, full duplex communication may be desirable because it can provide additional control, e.g., by the enablement of thin feedback and a thin grant for dynamic modification of the communication.

Accordingly, as illustrated in FIG. 14, a first TDD component carrier, CC1, having a wide bandwidth (e.g., 100 MHz) may be paired with a second TDD component carrier, CC2, having a narrow bandwidth (e.g., 10 MHz). The ratio between the bandwidth of the two component carriers need not be the 10:1 ratio given here, but any suitable ratio may be utilized within the scope of the present disclosure. The choice of the ratio may be made in accordance with characteristics of the traffic being carried on the uplink and downlink, such as the degree of asymmetry between uplink and downlink traffic. For example, traffic that is substantially heavier on the downlink side could be accommodated by deploying a larger number of downlink time slots on the wider bandwidth component carrier.

In some examples, the bandwidth of one or both of the TDD component carriers may be selected according to the bandwidth desired or needed; and in some examples, the bandwidth of one or both of the TDD component carriers may be configurable by the scheduling entity or the subordinate entity.

TDD-TDD Carrier Pairing: Multiplexing LoLat UL on Regular UL

Figure 16:
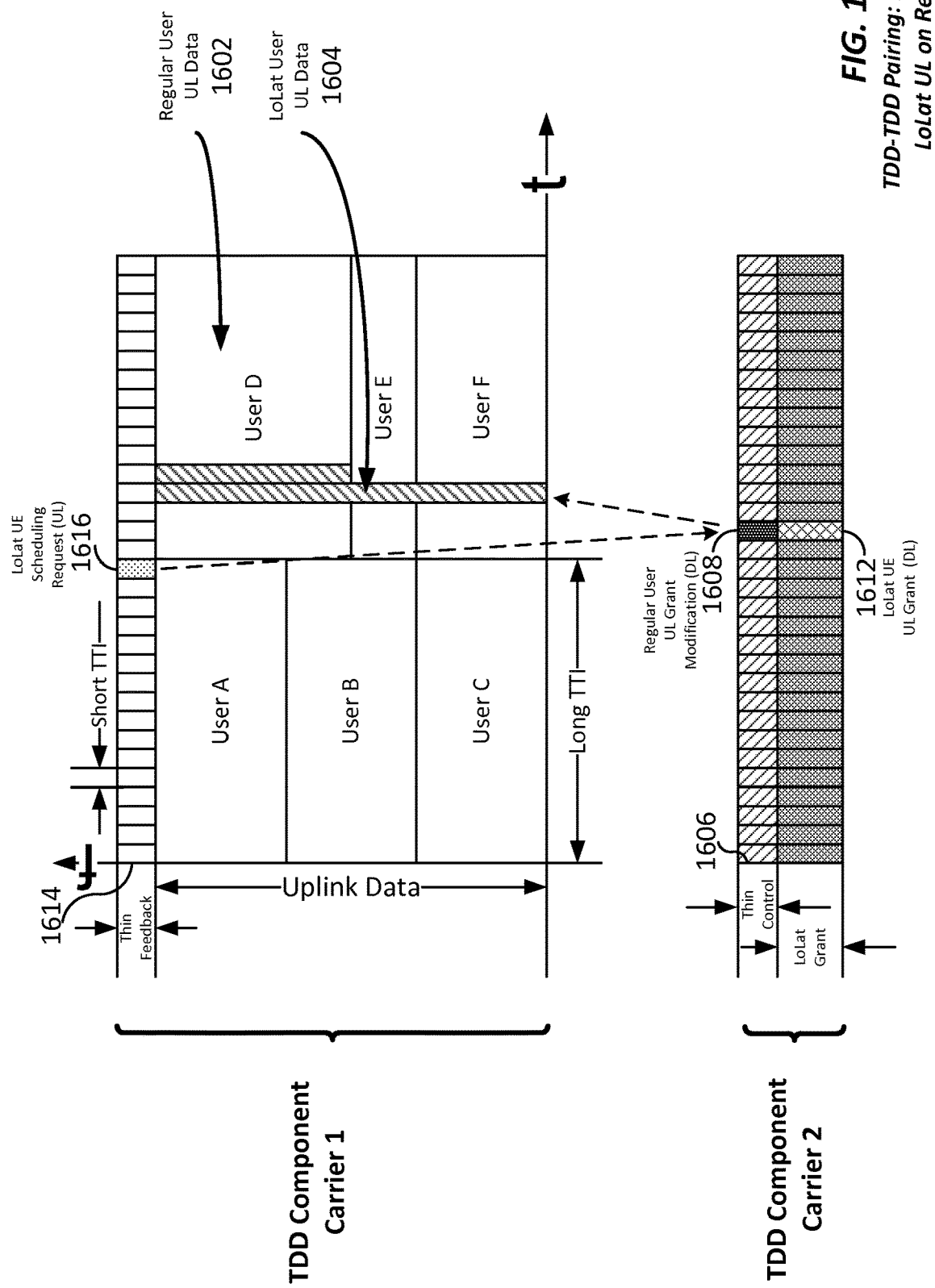
FIG. 16 is a schematic diagram illustrating a synchronous multiple access channel structure with paired TDD carriers for multiplexing low latency uplink data with regular uplink data according to one example.

FIG. 16 illustrates one example of pairing a first TDD component carrier with a second TDD component carrier, providing for multiplexing of LoLat uplink transmissions with regular uplink transmissions (i.e., transmissions from a subordinate entity) on the primary TDD component carrier. In the illustrated example, the primary TDD component carrier is illustrated in much the same way as the TDD carrier in FIG. 5, with uplink resources allocated to different users being represented by the large blocks spanning a long TTI. Here, as will be described in further detail below, a subordinate entity (e.g., a UE) may request, and be granted, resources for a LoLat transmission that may be multiplexed with the regular uplink transmissions from other users. At the bottom of the figure, resources on a second TDD component carrier are allocated for use.

In the illustrated example, control channels for controlling the uplink data transmissions on the primary TDD component carrier are carried on the secondary TDD component carrier. That is, the secondary TDD component carrier includes a thin control channel 1606, which may carry uplink grant modification information 1608 that modifies an uplink resource grant corresponding to the subordinate entity (i.e., the regular user 1602) uplink transmission on the primary TDD component carrier. Further, the secondary TDD component carrier includes a LoLat grant channel 1610, which may carry grant information 1612 for the subordinate entity that requests LoLat scheduling (i.e., the LoLat user 1604) to utilize in a LoLat uplink transmission on the primary TDD component carrier.

Further, in addition to data carriers, the primary TDD component carrier includes a thin feedback channel 1614 that a subordinate entity (i.e., the LoLat user 1604) can utilize to transmit information such as a LoLat scheduling request 1616.

In addition to the illustrated channels, time-frequency resources corresponding to the long TTI may be granted for uplink transmissions on the primary TDD component carrier to one or more subordinate entities (e.g., Users A-F) by utilizing any suitable downlink grant channel (not necessarily one of the illustrated channels). As these uplink transmissions are ongoing, if a particular subordinate entity, denoted as the LoLat user 1604, wishes to request resources for a LoLat uplink transmission, this subordinate entity may transmit a LoLat scheduling request 1616 on the thin feedback channel 1614 on the primary TDD component carrier. Here, the LoLat scheduling request 1616 may utilize the short TTI, although this is not necessarily always the case. In response, if the scheduling entity wishes to grant the requested LoLat resource, the scheduling entity 102 may transmit, on the secondary TDD component carrier, an uplink grant modification 1608 on the thin control channel 1606, and a LoLat grant 1612 on the LoLat grant channel 1610. Here, the an uplink grant modification 1608 on the thin control channel 1606 may be configured to inform all of the subordinate entities that are utilizing granted uplink time-frequency resources on the primary TDD component carrier that some or all of their granted resources are being modified or removed, to make way for the LoLat transmission. Further, the LoLat grant 1612 on the LoLat grant channel 1610 may be configured to inform the subordinate entity that transmitted the LoLat scheduling request (i.e., the LoLat user 1604) of its granted time-frequency resources. In the illustration, the LoLat grant 1612 is shown as occupying a wider bandwidth than the UL grant modification 1608. This represents that, while the UL grant modification 1608 may simply be a few bits representing the frequency resources that are being re-allocated away from a regular user 1602, and a number of short TTIs, the LoLat grant 1612 may include more precise information relating to the LoLat resource assignment such as a user ID, the assignment information, a modulation and coding scheme, etc. Accordingly, the LoLat user 1604 may transmit its LoLat uplink transmission on the primary TDD component carrier, while other regular users 1602 (such as Users D, E, and F) may cease their uplink transmissions, resulting in an orthogonal multiple access scheme between regular and LoLat uplink transmissions on the TDD carrier.

In this example, the regular users 1602 (e.g., subordinate entities 104), whose uplink resources were punctured, may benefit from having an ability to quickly decode the uplink grant modification 1608. That is, the time from when the uplink grant modification 1608 is received at the regular user 1602, until that user ceases its uplink transmissions, may be very short. To accommodate the quick reaction time, the subordinate entity 104 may be configured for a fast suspension of its uplink transmissions, e.g., by driving a zero input to a power amplifier within the transceiver 310, or in another example, being capable of quickly turning off the power amplifier. Furthermore, the LoLat user 1604 also may have only a brief time from the receiving of its LoLat uplink grant 1612, and its transmission of LoLat uplink data. Accordingly, fast processing of the LoLat grant 1612 and transmission utilizing the scheduled time-frequency resources would be beneficial and reduce latency.

Figure 17:
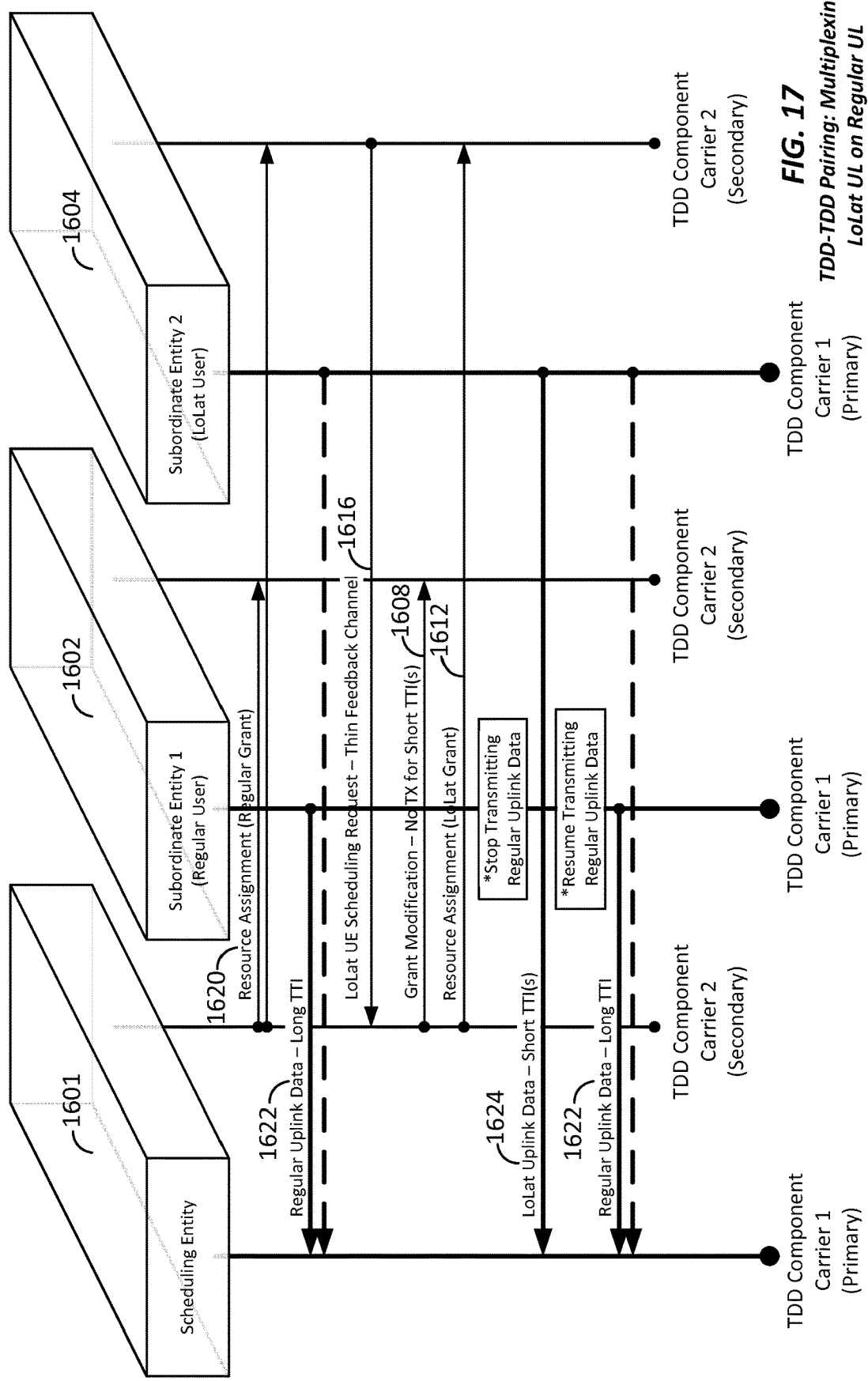
FIG. 17 is a call flow diagram illustrating an example of multiplexing low latency uplink data with regular uplink data utilizing a thin control channel according to some embodiments.

FIG. 17 is a call flow diagram illustrating an exemplary resource assignment and re-assignment procedure as it might occur in accordance with one example for multiplexing uplink data with different latency targets utilizing a primary TDD component carrier paired with a secondary TDD component carrier. In this illustration, time moves forward in the downward direction, and communication signals between the illustrated entities are denoted with arrows between the lines below the respective entities. As illustrated, a scheduling entity 1601 is in communication with a plurality of subordinate entities 104, including a regular user 1602 and a LoLat user 1604. Each entity 1601, 1602, and 1604 is configured for communication over a primary TDD component carrier, and a secondary TDD component carrier. The respective primary and secondary TDD component carriers are illustrated schematically with the two vertical lines extending down from each respective entity.

Figure 18:
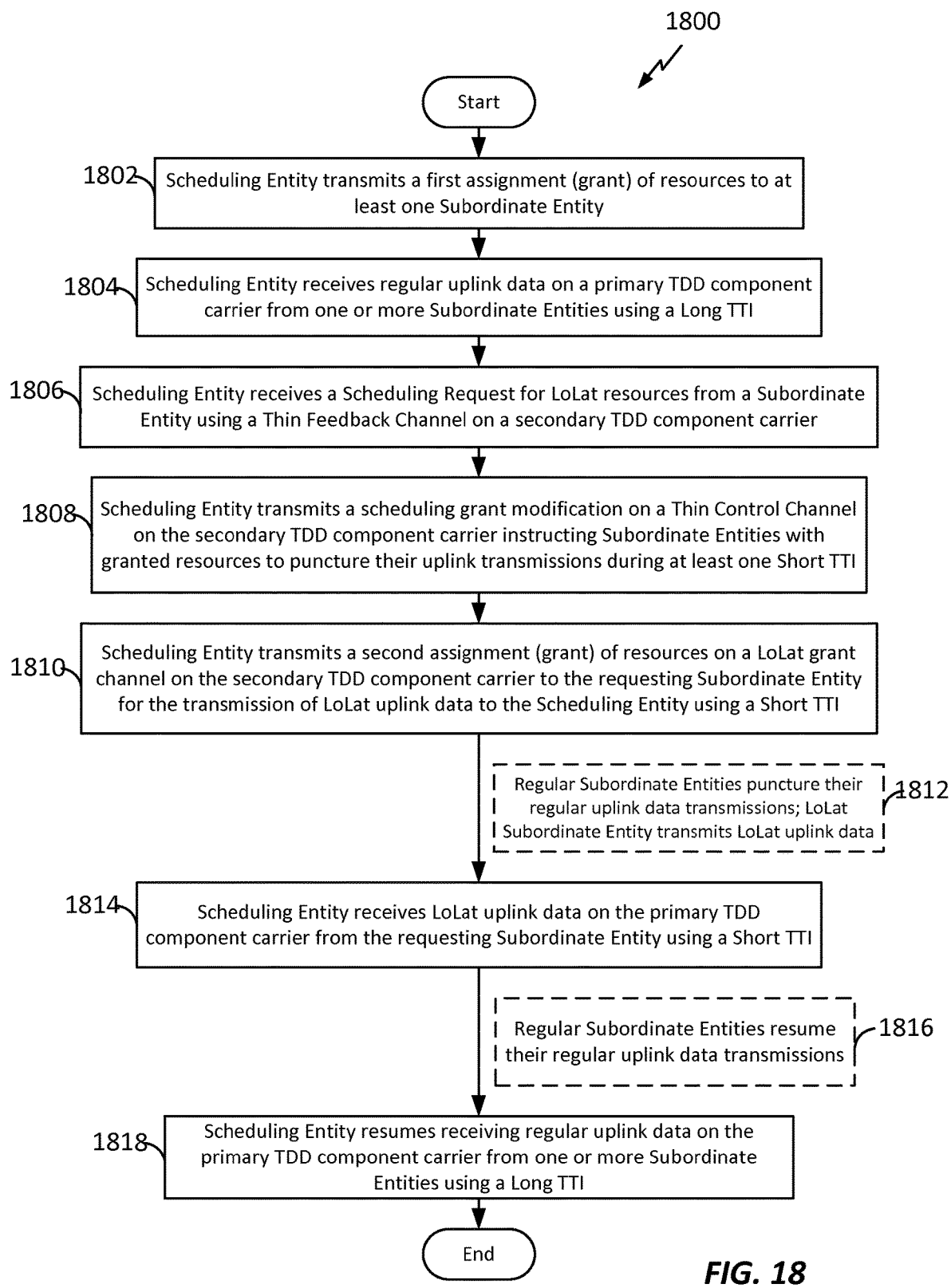
FIG. 18 is a flow chart illustrating an example of multiplexing low latency uplink data with regular uplink data utilizing a thin control channel from the point of view of a scheduling entity, according to some embodiments.

FIG. 17 is described below in conjunction with a flow chart illustrated in FIG. 18. That is, FIG. 18 is a flow chart illustrating an exemplary process 1800 for resource assignment and re-assignment in accordance with some aspects of the present disclosure. The process 1800 is described from the point-of-view of a scheduling entity 1601, and may accordingly, as described in conjunction with FIG. 17, be operational at the scheduling entity 102 described above in conjunction with FIGS. 1 and/or 2. In other examples within the scope of the present disclosure, the process 1800 may be operational by a general purpose processor, a processing system 214 as described above and illustrated in FIG. 2, or any suitable means for carrying out the described functions. The specific order of steps or blocks shown in FIG. 18 is merely exemplary in nature, and in various aspects of the disclosure, these steps or blocks may occur in any suitable order, with some examples including two or more steps or blocks occurring simultaneously.

At block 1802, the scheduling entity 1601 may transmit a first assignment or grant 1620 of time-frequency resources to at least one subordinate entity on the secondary TDD component carrier. Any suitable control channel may be utilized for the first resource assignment, such as a downlink assignment channel. Here, the first resource assignment 1620 may be configured to indicate which time-frequency resource or resources are assigned to the respective subordinate entities for regular transmissions of uplink data, that is, transmissions utilizing the long TTI. In accordance with the first resource assignment 1620, at block 1804, the scheduling entity 1601 may receive regular uplink data 1622 on the primary TDD component carrier from the at least one subordinate entity (e.g., the subordinate entities 1602 and 1604) utilizing the long TTI. Here, with reference to FIG. 16, this regular uplink data 1622 may correspond to the transmissions from regular users 1602. As illustrated in FIG. 17 with the dashed-line arrow, regular uplink data may optionally be transmitted from the second subordinate entity 1604, depending on the contents of the first resource assignment 1620 and whether the second subordinate entity 1604 is configured to transmit uplink data transmissions utilizing the long TTI.

The blocks 1802 and 1804 may repeat, or be iterated a plurality of times in various examples, as regular uplink data 1622 may continue to be transmitted from the subordinate entities. However, at any given time, it may arise that the subordinate entity 1604 (i.e., the LoLat user 1604) may wish to transmit LoLat data to the scheduling entity 1601. Accordingly, at block 1806, the scheduling entity 1601 may receive a LoLat scheduling request 1616 on the thin feedback channel 1614 on the primary TDD component carrier from the LoLat user 1604 (i.e., the second subordinate entity 1604). The LoLat scheduling request 1616 may include information identifying the requesting subordinate entity 1604, and including any pertinent information relating to the LoLat data desired to be transmitted.

At block 1808, the scheduling entity 1601 may transmit an uplink scheduling grant modification 1608 on the thin control channel 1606 on the secondary TDD component carrier. Here, the uplink scheduling grant modification 1608 may instruct the regular users such as the first subordinate entity 1602, having granted time-frequency resources for long-TTI uplink transmissions, to puncture their uplink transmissions during at least one designated short TTI. Further at block 1810, the scheduling entity 1601 may transmit a second resource assignment or grant 1612 of time-frequency resources to the requesting subordinate entity (i.e., the LoLat user 1604) on the LoLat grant channel 1610 on the secondary TDD component carrier. Here, the second resource assignment 1612 may include information identifying the requesting subordinate entity 1604, and information identifying time-frequency resources granted on the primary TDD component carrier for the LoLat uplink transmission. In some examples, the transmission of the uplink scheduling grant modification 1608 at block 1808, and the transmission of the second resource assignment 1612 at block 1810, may occur simultaneously. That is, these transmissions may be multiplexed, for example, utilizing different time-frequency resources. In other examples, these transmissions may be at different times, according to the details of a particular implementation.

Block 1812 represents operations at one or more subordinate entities, such as regular users 1602 and LoLat user(s) 1604. That is, in response to the uplink grant modification 1608, the regular users (i.e., the first subordinate entity 1602) may puncture their previously scheduled uplink data transmissions that utilize the long TTI. Further, in response to the second resource assignment 1612, the LoLat user(s) (i.e., the second subordinate entity 1604) may transmit the LoLat uplink data 1624 utilizing the assigned time-frequency resources on the primary TDD component carrier.

At block 1814, the scheduling entity 1601 may receive the LoLat uplink data 1624 transmitted from the requesting subordinate entity 1604 utilizing the short TTI on the primary TDD component carrier.

Block 1816 represents operations at one or more subordinate entities, such as the regular users 1602 and, in some examples, LoLat user(s) 1604. That is, the regular subordinate entities may resume their regular uplink data transmissions on the primary TDD component carrier when transmission of the LoLat uplink data 1624 has been completed. Accordingly, at block 1818, the scheduling entity 1602 may resume receiving regular uplink data 1622 on the primary TDD component carrier from one or more subordinate entities utilizing the long TTI.

By utilizing the above scheme, pairing a primary TDD carrier for uplink data transmissions and uplink feedback transmissions, with a secondary TDD component carrier for control channel transmissions, a thin control channel 1606 can enable a scheduling entity to multiplex at least two different data types or categories, having different TTIs, for uplink transmissions from a set of subordinate entities.

TDD-TDD Carrier Pairing: Multiplexing LoLat DL on Regular UL

Figure 19:
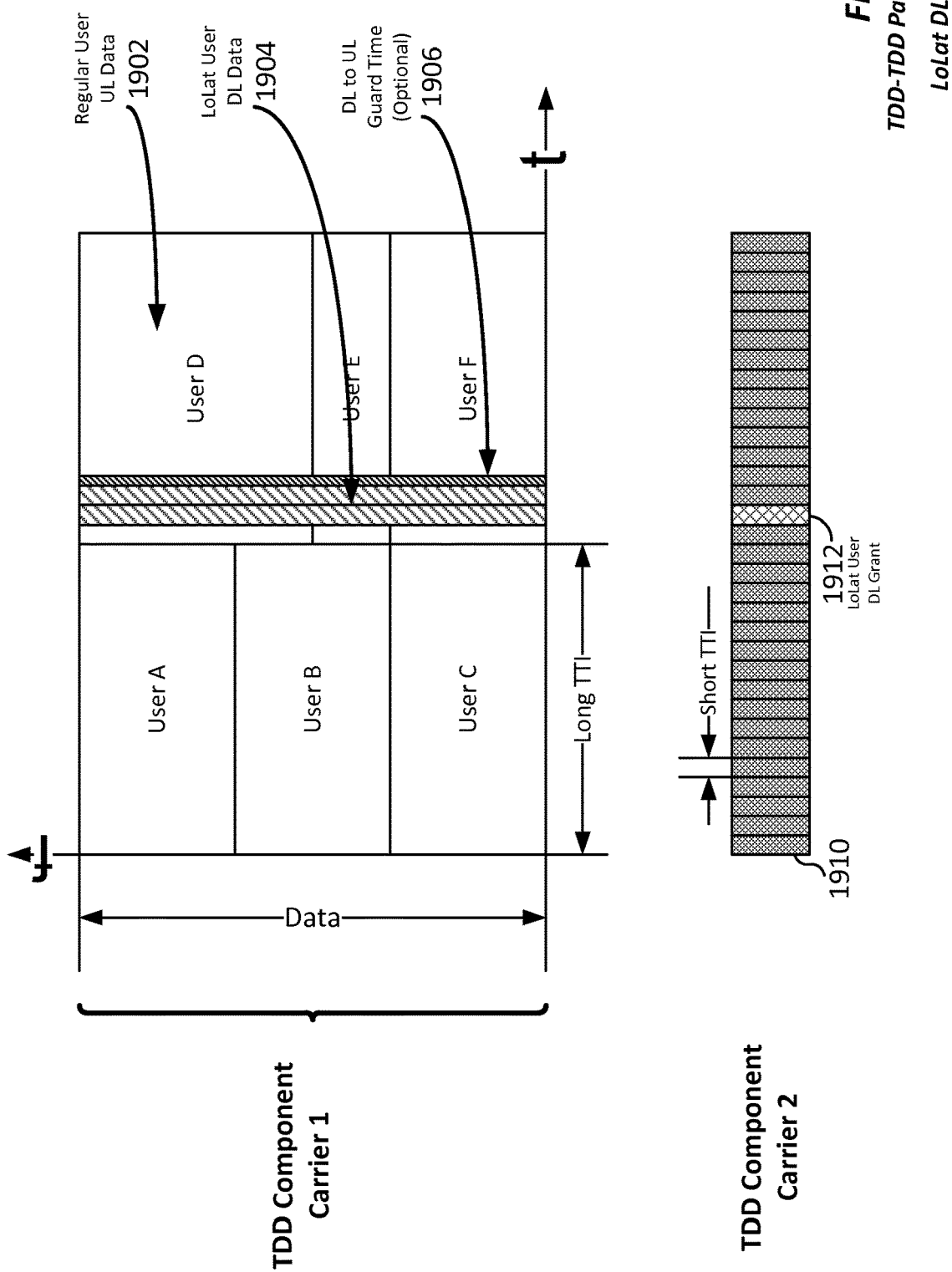
FIG. 19 is a schematic diagram illustrating a synchronous multiple access channel structure with paired TDD carriers for multiplexing low latency downlink data with regular uplink data according to one example.

FIG. 19 illustrates another example of TDD-TDD component carrier pairing, providing for multiplexing of LoLat downlink transmissions (i.e., transmissions from a scheduling entity) with regular uplink transmissions (i.e., transmissions from a subordinate entity) on the primary TDD component carrier. In the illustrated example, the primary TDD component carrier is illustrated in much the same way as the TDD carrier in FIG. 4, with uplink resources shown with a plurality of users (subordinate entities) transmitting "regular" uplink data utilizing a long TTI. Here, as will be described in further detail below, the scheduling entity may modify the scheduling assignment or grant of time-frequency resources, interrupting the ongoing uplink transmissions on the primary TDD component carrier, with downlink transmissions on the primary TDD component carrier.

In the illustrated example, a control channel for controlling the user data carried on the primary TDD component carrier is carried on a secondary TDD component carrier. That is, the secondary TDD component carrier includes a LoLat grant channel 1910, in which a subordinate entity may receive information such as a LoLat downlink grant 1912.

In this example, because a secondary TDD component carrier is paired with the primary TDD component carrier (e.g., utilizing the conjugate pairing described above), the subordinate entity may always (or most of the time) be receiving a control channel in the downlink direction on the secondary TDD component carrier, even while uplink transmissions are ongoing on the primary TDD component carrier. Furthermore, in an aspect of the disclosure, if a particular subordinate entity is not currently transmitting uplink data on the primary TDD component carrier, then that particular user may be configured always to listen for downlink data on the primary TDD component carrier.

In addition to the illustrated channels, time-frequency resources corresponding to the long TTI may be granted for uplink transmissions on the primary TDD component carrier to one or more subordinate entities (e.g., Users A-F) by utilizing any suitable downlink grant channel (not necessarily one of the illustrated channels).

At any given time, during the regular users' 1902 transmission of the uplink data on the primary TDD component carrier, the scheduling entity may determine to transmit LoLat downlink data on the primary TDD component carrier. That is, at any time, one or more subordinate entities in communication with the scheduling entity, such as a LoLat user 1904, may come to need LoLat communication with the network, wherein more stringent latency requirements for communication are needed than the relatively long latency resulting from the communication by regular users utilizing the long TTI. Thus, in an aspect of the present disclosure, the availability of the LoLat grant channel 1910 on the secondary TDD component carrier may enable dynamic multiplexing of the traffic for one or more subordinate entities that desire low latency communication (hereinafter referred to as LoLat users 1904), who can utilize a short TTI for data traffic, and the traffic for the regular users 1902, who utilize the long TTI for data traffic.

Accordingly, on the LoLat grant channel 1910 on the secondary TDD component carrier, at any given time, the scheduling entity may broadcast a LoLat downlink grant 1912. The LoLat downlink grant 1912 may be structured in any suitable manner. As one example, the LoLat downlink grant 1912 may include information to identify one or more LoLat users for which LoLat downlink data is being granted, information identifying time-frequency resources being allocated to the user, and any other suitable information regarding receiving and decoding of the downlink data.

At the same time, on the primary TDD component carrier, the scheduling entity may broadcast LoLat downlink data to the LoLat user(s) 1904, in accordance with the LoLat downlink grant 1912. That is, in some examples, the LoLat downlink grant 1912 and the LoLat downlink data may be transmitted at the same time, i.e., during the same short TTI. However, this is not necessarily the case, and in other examples, the LoLat downlink grant 1912 and the LoLat downlink data may be transmitted during completely non-overlapping short TTIs, or, as illustrated in FIG. 19, a single short TTI may be utilized for the LoLat downlink grant 1912, which may overlap with any number (including zero) of short TTIs during which the LoLat downlink data is transmitted on the primary TDD component carrier.

That is, the LoLat user 1904 (i.e., the subordinate entity addressed in the LoLat grant 1912) may be configured to receive and buffer the frame on the primary TDD component carrier, even if it is not actively receiving the regular downlink data on the primary TDD component carrier. Upon processing the LoLat downlink grant (which may occur at the end of each long TTI), if a corresponding LoLat grant 1912 is received on the LoLat grant channel 1910, that LoLat user 1904 may accordingly decode the LoLat downlink data transmitted on the primary TDD component carrier.

At the scheduling entity, prior to the LoLat downlink data transmission on the primary TDD component carrier, it is receiving the regular uplink transmissions from regular users 1902. At the time of the LoLat transmission, to accommodate the downlink transmission of the LoLat data on the primary TDD component carrier, the scheduling entity may cease receiving any regular uplink data transmissions on the primary TDD component carrier, and may begin transmitting the downlink LoLat data on the primary TDD component carrier. Here, the regular users 1902 may continue transmitting their regular uplink data on the primary TDD component carrier, since they may not have received any advance warning or indication that the scheduling entity would not be listening to their uplink transmissions on the primary TDD component carrier during the corresponding short TTIs. Following completion of the LoLat downlink transmissions on the primary TDD component carrier, the scheduling entity may switch back and turn its receiver on, to receive the ongoing further regular uplink data transmissions on the primary TDD component carrier.

In some aspects of the disclosure, the regular users 1902 that were interrupted by the LoLat downlink transmission might not have any indication that they were, in fact, interrupted and that their uplink transmissions were temporarily ignored. That is, the scheduling entity need not necessarily inform the regular users 1902 that their uplink transmissions are being interrupted/ignored to accommodate the LoLat downlink transmission.

One potential impact of this scheme may be some degree of inter-cell interference caused by the scheduling entity, when it transmits its LoLat downlink transmission on the primary TDD component carrier, upon other neighboring scheduling entities (e.g., where two high-power base stations neighbor one another). Furthermore, inter-user interference may occur, wherein the regular users 1902, which may continue to transmit their uplink data on the primary TDD component carrier, may impact the reception performance of the LoLat user 1904.

Accordingly, in a further aspect of the disclosure, the regular users 1902 may have the capability to monitor the secondary TDD component carrier, including transmissions on the LoLat grant channel 1910, during their transmissions of regular uplink data on the primary TDD component carrier. Here, in some examples, the secondary TDD component carrier may include further control information directed to the regular users 1902, which may indicate to those users that their uplink transmissions on the primary TDD component carrier are being interrupted for a LoLat user. In this way, the regular users 1902 may be enabled to cease their uplink transmissions on the primary TDD component carrier, reducing or preventing their potential jamming of the LoLat user's 1904 reception of the LoLat downlink data on the primary TDD component carrier. In a further aspect of the disclosure, a guard time 1906 may be utilized after the end of the LoLat downlink transmission, before the regular users 1902 resume their transmissions of regular uplink data on the primary TDD component carrier. The guard time 1906 may be eliminated in some examples.

Figure 20:
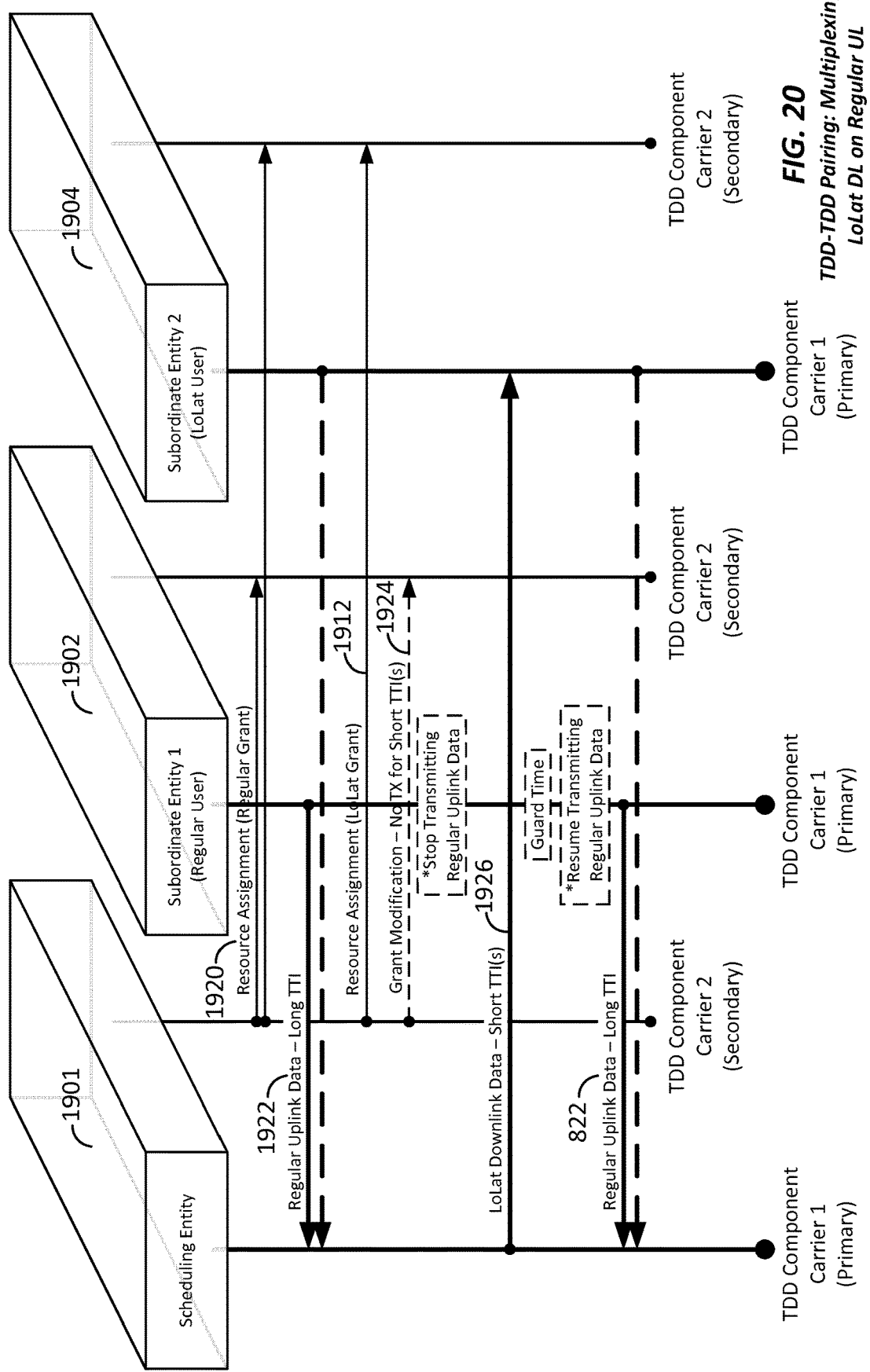
FIG. 20 is a call flow diagram illustrating an example of multiplexing low latency downlink data with regular uplink data utilizing a thin control channel according to some embodiments.

FIG. 20 is a call flow diagram illustrating an exemplary resource assignment and re-assignment procedure as it might occur in accordance with one example for multiplexing uplink and downlink data with different latency targets utilizing a paired set of primary and secondary TDD carriers. In this illustration, time moves forward in the downward direction, and communication signals between the illustrated entities are denoted with arrows between the lines below the respective entities. As illustrated, a scheduling entity 1901 is in communication with a plurality of subordinate entities 104, including a regular user 1902 and a LoLat user 1904. Each entity 1901, 1902, and 1904 is configured for communication over primary and secondary TDD component carriers. The respective primary and secondary TDD component carriers are illustrated schematically with the two vertical lines extending down from each respective entity.

Figure 21:
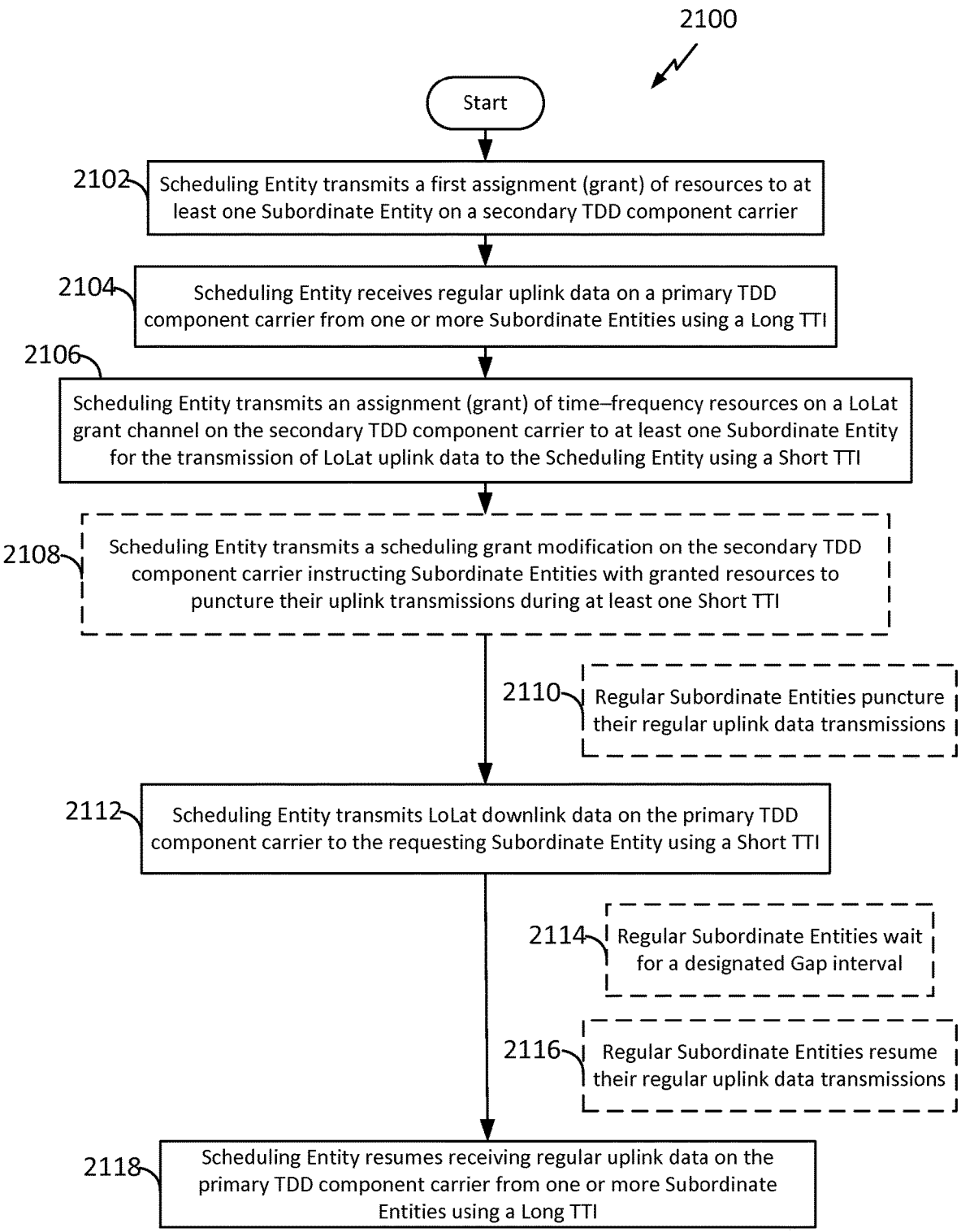
FIG. 21 is a flow chart illustrating an example of multiplexing low latency downlink data with regular uplink data utilizing a thin control channel from the point of view of a scheduling entity, according to some embodiments.

FIG. 20 is described below in conjunction with a flow chart illustrated in FIG. 21. That is, FIG. 21 is a flow chart illustrating an exemplary process 2100 for resource assignment and re-assignment utilizing a paired set of primary and secondary TDD carriers in accordance with some aspects of the present disclosure. The process 2100 is described from the point-of-view of a scheduling entity 1901, and may accordingly, as described in conjunction with FIG. 20, be operational at the scheduling entity 102 described above in conjunction with FIGS. 1 and/or 2. In other examples within the scope of the present disclosure, the process 2100 may be operational by a general purpose processor, a processing system 214 as described above and illustrated in FIG. 2, or any suitable means for carrying out the described functions. The specific order of steps or blocks shown in FIG. 21 is merely exemplary in nature, and in various aspects of the disclosure, these steps or blocks may occur in any suitable order, with some examples including two or more steps or blocks occurring simultaneously.

At block 2102, the scheduling entity 1901 may transmit a first assignment or grant 1920 of time-frequency resources to at least one subordinate entity on the secondary TDD component carrier. Any suitable control channel on the secondary TDD component carrier may be utilized for the first resource assignment 1920, such as a downlink assignment channel. Here, the first resource assignment 1920 may be configured to indicate which time-frequency resource or resources are assigned to the respective subordinate entities for regular transmissions of uplink data, that is, transmissions utilizing the long TTI. In accordance with the first resource assignment 1920, at block 2104, the scheduling entity 1901 may receive regular uplink data 1922 on the primary TDD component carrier from the at least one subordinate entity (e.g., the subordinate entities 1902 and 1904) utilizing the long TTI. Here, with reference to FIG. 19, this regular uplink data 1922 may correspond to the transmissions from regular users 1902. As illustrated in FIG. 20 with the dashed-line arrow, regular uplink data 1922 may optionally be transmitted from the second subordinate entity 1904, depending on the contents of the first resource assignment 1920 and whether the second subordinate entity 1904 is configured to transmit uplink data transmissions utilizing the long TTI.

The blocks 2102 and 2104 may repeat, or be iterated a plurality of times in various examples, as regular uplink data 1922 may continue to be transmitted from the subordinate entities. However, at any given time, it may arise that the scheduling entity 1901 may wish to transmit LoLat data to a particular subordinate entity (i.e., the LoLat user 1904). Accordingly, at block 2106, the scheduling entity 1901 may transmit an assignment or grant 1912 of time-frequency resources on the LoLat grant channel 1910 on the secondary TDD component carrier, to at least one subordinate entity (e.g., the LoLat user 1904). Here, the resource assignment 1912 may indicate for the LoLat user 1904 to receive LoLat downlink data from the scheduling entity 1901 utilizing at least one short TTI. Specifically, the resource assignment 1912 may include information identifying a particular subordinate entity 1904, and information identifying time-frequency resources granted on the primary TDD component carrier for the LoLat downlink transmission.

At block 2108, the scheduling entity 1901 may optionally (as indicated by the dashed-line box 2108) transmit an uplink scheduling grant modification 1924 on any suitable channel, e.g., on the secondary TDD component carrier. Here, the uplink scheduling grant modification 1924 may instruct the regular users such as the first subordinate entity 1902, having granted time-frequency resources for long-TTI uplink transmissions, to puncture their uplink transmissions during at least one designated short TTI (i.e., the short TTI(s) corresponding to the LoLat grant 1912).

Block 2110 represents operations at one or more subordinate entities, such as regular users 1902 and LoLat user(s) 1904. That is, in response to the uplink grant modification 1924, the regular users (e.g., the first subordinate entity 1902) may optionally puncture their previously scheduled uplink data transmissions that utilize the long TTI. The puncturing is an optional step, operable on subordinate entities configured to monitor the control channels on the secondary TDD component carrier while transmitting uplink data on the primary TDD component carrier.

At block 2112, in accordance with the resource assignment 1912, the scheduling entity 1901 may transmit the LoLat downlink data 1926 on the primary TDD component carrier. In some examples, the transmission of the LoLat grant 1912 and the LoLat downlink data 1926 may occur at the same time, i.e., during the same short TTI. However, this is not necessarily the case, and in other examples, the LoLat downlink grant 1912 and the LoLat downlink data may be transmitted during completely non-overlapping short TTIs, or, as illustrated in FIG. 19, a single short TTI may be utilized for the LoLat downlink grant 1912, which may overlap with any number (including zero) of short TTIs during which the LoLat downlink data is transmitted on the primary TDD component carrier.

Blocks 2114 and 2116 represent operations at one or more subordinate entities, such as the regular users 1902 and, in some examples, LoLat user(s) 1904. That is, at block 2114, the regular subordinate entities may optionally wait for a suitable gap or guard time 1906, after the end of the scheduled LoLat downlink transmissions 1926. This guard time 1906 may for example compensate for any propagation delay or other air interface delay, allowing full completion of the LoLat downlink transmissions to all users in the service area prior to resumption of any uplink transmissions on the primary TDD component carrier. At block 2116, the regular subordinate entities (i.e., regular user 1902) may resume their regular uplink data transmissions on the primary TDD component carrier when transmission of the LoLat downlink data has been completed (and optionally after the guard time 1906). Accordingly, at block 2118, the scheduling entity 1902 may resume receiving regular uplink data on the primary TDD component carrier from one or more subordinate entities utilizing the long TTI.

By utilizing the above scheme, pairing primary and secondary TDD component carriers, a thin LoLat grant channel 1912 can enable a scheduling entity to rapidly and dynamically control the multiplexing of uplink and downlink data on the primary TDD component carrier having at least two different data types or categories, from a set of subordinate entities.

TDD-TDD Carrier Pairing: Multiplexing LoLat UL on Regular DL

FIG. 22 illustrates yet another example of pairing primary and secondary TDD component carriers, providing for multiplexing of LoLat uplink transmissions (i.e., transmissions from a subordinate entity) with regular downlink transmissions (i.e., transmissions from a scheduling entity). In the illustrated example, the primary TDD component carrier is illustrated in much the same way as the TDD carrier in FIG. 8, with downlink resources shown with a scheduling entity transmitting regular downlink data utilizing a long TTI to plurality of users (subordinate entities). Here, as will be described in further detail below, at the request of a subordinate entity, the scheduling entity may modify the scheduling assignment or grant of time-frequency resources, interrupting the ongoing downlink transmissions on the primary TDD component carrier, to enable uplink transmissions (e.g., LoLat data transmissions) on the primary TDD component carrier.

In the illustrated example, control channels for controlling the data carried on the primary TDD component carrier may be carried on either or both of the primary and/or secondary TDD component carriers. For example, as illustrated the primary TDD component carrier includes a LoLat grant channel 2212 in which a subordinate entity may receive information such as a LoLat uplink grant 2214, which may carry grant information for the LoLat user 2204 that requested LoLat scheduling to utilize for transmitting a LoLat uplink transmission. The primary TDD component carrier further includes a thin control channel 2216 that may carry a downlink grant modification 2218, which modifies a downlink time-frequency resource grant corresponding to the regular users' 2202 downlink data reception on the primary TDD component carrier.

In the illustration, the LoLat grant 2214 is shown as occupying a wider bandwidth than the DL grant modification 2218. This represents that, while the DL grant modification 2218 may simply be a few bits representing the frequency resources that are being re-allocated away from a regular user 2202, and a number of short TTIs, the LoLat grant 2214 may include more precise information relating to the LoLat resource assignment such as a user ID, the assignment information, a modulation and coding scheme, etc.

Furthermore, a control channel for enabling subordinate entities to quickly send information to the scheduling entity is carried on the secondary TDD component carrier. That is, the secondary TDD component carrier includes a thin feedback channel 2208 in which the scheduling entity may receive feedback information from subordinate entities such as a LoLat scheduling request 2210.

In addition to the illustrated channels, time-frequency resources corresponding to the long TTI may be granted for downlink transmissions on the primary TDD component carrier to one or more subordinate entities (e.g., Users A-F) by utilizing any suitable downlink grant channel (not necessarily one of the illustrated channels). As these downlink transmissions are ongoing, if a particular subordinate entity, denoted as the LoLat user 2204, wishes to request resources for a LoLat uplink transmission, this subordinate entity may transmit a LoLat scheduling request 2210 on the thin feedback channel 2208 on the secondary TDD component carrier. Here, the LoLat scheduling request 2210 may utilize the short TTI, although this is not necessarily always the case. In response, if the scheduling entity wishes to grant the requested LoLat resource, the scheduling entity 102 may transmit, on the primary TDD component carrier, a LoLat grant 2214 that informs the LoLat user 2204 that transmitted the LoLat user scheduling request 2210 of its granted resources. After a suitable delay to enable the LoLat user to receive and process the LoLat grant 2214 and prepare for its LoLat uplink transmission, the scheduling entity may further transmit, on the thin control channel 2216, a downlink grant modification 2218 that informs the regular users 2202 that are receiving downlink data transmissions on the primary TDD component carrier, that some or all of their granted resources are being modified or removed to make way for the LoLat transmission.

Because the data carrier is a TDD carrier, during transmission of the uplink data by the LoLat user 2204, the downlink data transmissions to the regular users 2202 utilizing the long TTI are punctured, ceased, or suspended. During this time, the LoLat user 2204 may transmit its LoLat uplink transmission on the primary TDD component carrier, resulting in an orthogonal multiple access scheme between regular downlink transmissions and LoLat uplink transmissions on the primary TDD component carrier.

In some examples, just prior to the time at which LoLat uplink transmissions are scheduled to commence, the scheduling entity may suspend its regular downlink data transmissions on the primary TDD component carrier. That is, a gap or guard time 2206 may optionally be utilized when multiplexing LoLat uplink transmissions and regular downlink transmissions on the primary TDD component carrier. Here, this guard time 2206 may for example compensate for any propagation delay or other air interface delay, allowing full completion of the regular downlink transmissions to all users in the service area prior to the time when the LoLat uplink transmissions commence on the primary TDD component carrier.

In the illustration, the downlink grant modification 2218 is illustrated as appearing at the same time as the downlink resources are modified. The need for advance timing of the grant modification can be avoided because the downlink grant modification 2218 and the downlink data may be buffered and post-processed by the receiving regular users 2202, as described above.

Figure 23:
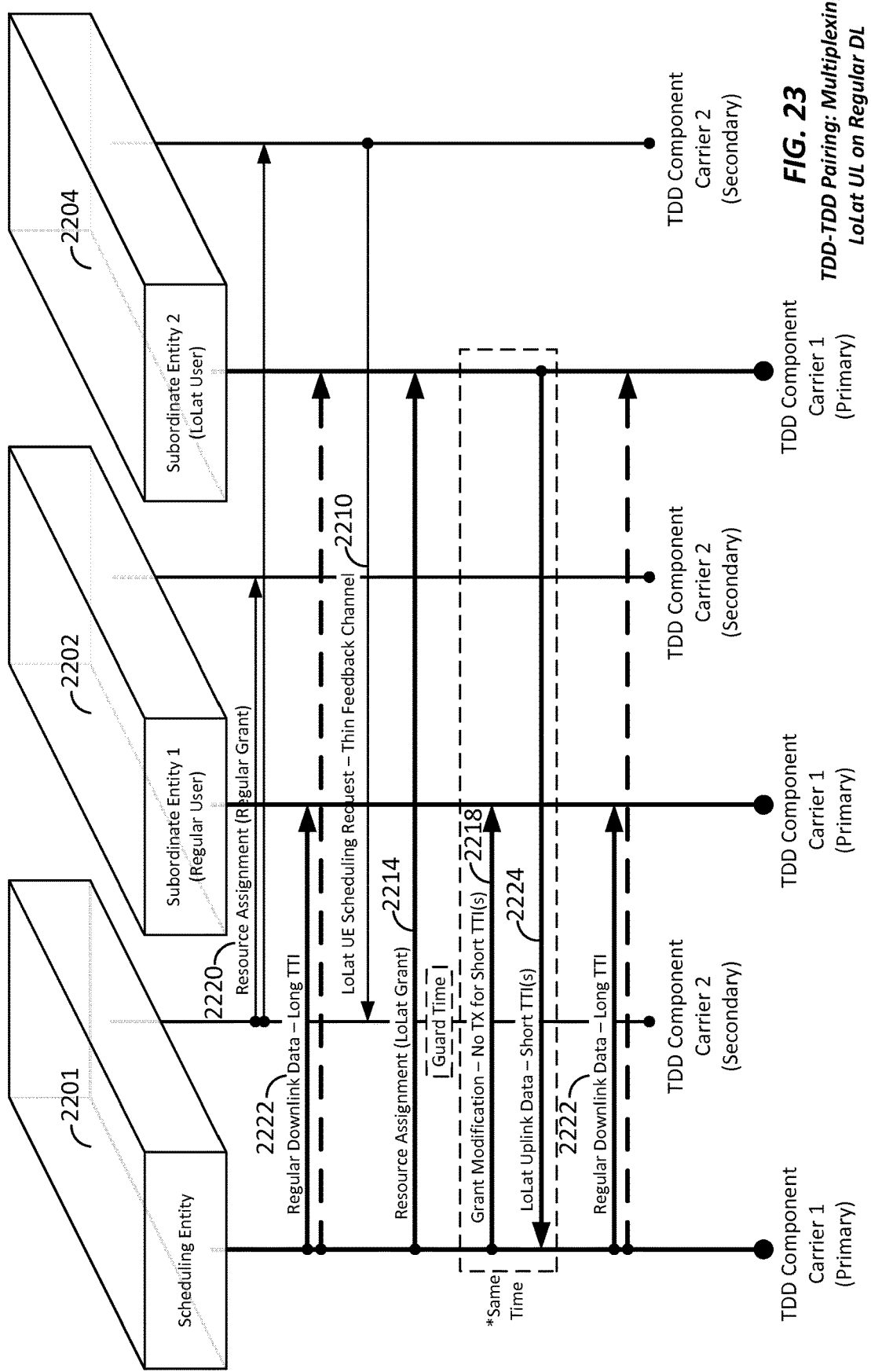
FIG. 23 is a call flow diagram illustrating an example of multiplexing low latency uplink data with regular downlink data utilizing a thin control channel according to some embodiments.

FIG. 23 is a call flow diagram illustrating an exemplary resource assignment and re-assignment procedure as it might occur in accordance with one example for multiplexing uplink and downlink data with different latency targets utilizing a paired set of primary and secondary TDD component carriers. In this illustration, time moves forward in the downward direction, and communication signals between the illustrated entities are denoted with arrows between the lines below the respective entities. As illustrated, a scheduling entity 2201 is in communication with a plurality of subordinate entities 104, including a regular user 2202 and a LoLat user 2204. Each entity 2201, 2202, and 2204 is configured for communication over primary and secondary TDD component carriers. The respective primary and secondary TDD component carriers are illustrated schematically with the two vertical lines extending down from each respective entity.

Figure 24:
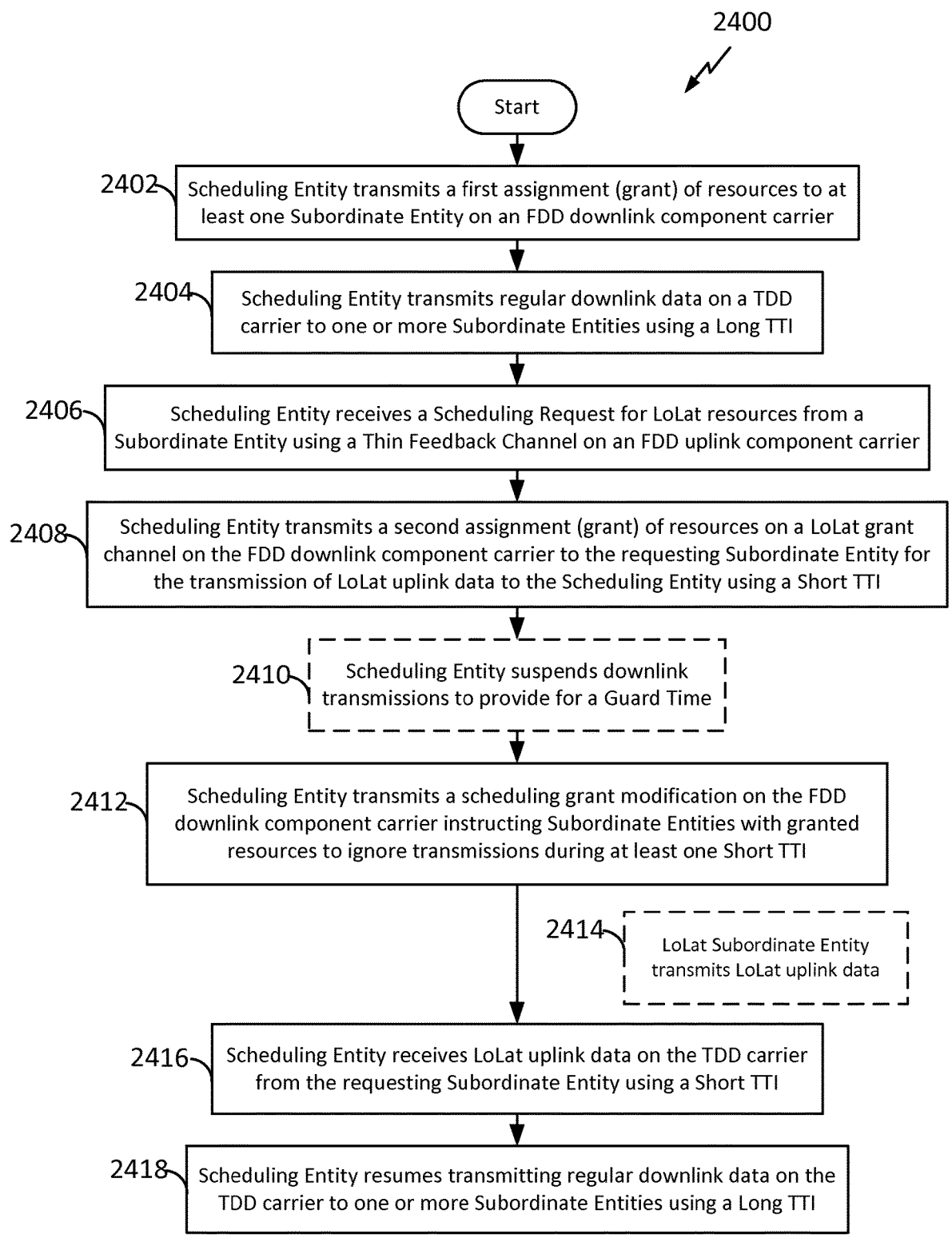
FIG. 24 is a flow chart illustrating an example of multiplexing low latency uplink data with regular downlink data utilizing a thin control channel from the point of view of a scheduling entity, according to some embodiments.

FIG. 23 is described below in conjunction with a flow chart illustrated in FIG. 24. That is, FIG. 24 is a flow chart illustrating an exemplary process 2400 for resource assignment and re-assignment utilizing a paired set of primary and secondary TDD carriers in accordance with some aspects of the present disclosure. The process 2400 is described from the point-of-view of a scheduling entity 2201, and may accordingly, as described in conjunction with FIG. 23, be operational at the scheduling entity 102 described above in conjunction with FIGS. 1 and/or 2. In other examples within the scope of the present disclosure, the process 2400 may be operational by a general purpose processor, a processing system 214 as described above and illustrated in FIG. 2, or any suitable means for carrying out the described functions. The specific order of steps or blocks shown in FIG. 24 is merely exemplary in nature, and in various aspects of the disclosure, these steps or blocks may occur in any suitable order, with some examples including two or more steps or blocks occurring simultaneously.

At block 2402, the scheduling entity 2201 may transmit a first assignment or grant 2220 of time-frequency resources to at least one subordinate entity on the secondary TDD component carrier. Any suitable control channel on the secondary TDD component carrier (or, in some examples, on the primary TDD component carrier) may be utilized for the first resource assignment 2220, such as a downlink assignment channel. Here, the first resource assignment 2220 may be configured to indicate which time-frequency resource or resources are assigned to the respective subordinate entities for receiving regular transmissions of downlink data, that is, transmissions utilizing the long TTI. In accordance with the first resource assignment 2220, at block 2404, the scheduling entity 2201 may transmit regular downlink data 2222 on the primary TDD component carrier to the at least one subordinate entity (e.g., the subordinate entities 2202 and 2204) utilizing the long TTI. Here, with reference to FIG. 22, this regular uplink data 2222 may correspond to the downlink transmissions to regular users 2202. As illustrated in FIG. 23 with the dashed-line arrow, regular downlink data 2222 may optionally be transmitted to the second subordinate entity 2204, depending on the contents of the first resource assignment 2220 and whether the second subordinate entity 2204 is configured to receive downlink data transmissions utilizing the long TTI.

The blocks 2402 and 2404 may repeat, or be iterated a plurality of times in various examples, as regular downlink data 2222 may continue to be transmitted to the subordinate entities. However, at any given time, it may arise that the subordinate entity 2204 (i.e., the LoLat user 2204) may wish to transmit LoLat uplink data to the scheduling entity 2201. Accordingly, at block 2406, the scheduling entity 2201 may receive a LoLat scheduling request 2210 on the thin feedback channel 2208 on the secondary TDD component carrier from the LoLat user 2204 (i.e., the second subordinate entity 2204). The LoLat scheduling request 2210 may include information identifying the requesting subordinate entity 2204, and including any pertinent information relating to the LoLat data desired to be transmitted.

At block 2408, the scheduling entity 2201 may transmit a second assignment or grant 2214 of time-frequency resources on a LoLat grant channel 2212 on the primary TDD component carrier, to the requesting subordinate entity 2204. Here, the second resource assignment 2214 may include information identifying the requesting subordinate entity 2204, and information identifying time-frequency resources granted on the TDD uplink carrier for the LoLat uplink transmission.

At optional block 2410, the scheduling entity 2201 may suspend its regular downlink data transmissions 2222 on the primary TDD component carrier just prior to the time at which LoLat uplink transmissions 2224 are scheduled to commence. That is, a gap or guard time 2206 may optionally be utilized when multiplexing LoLat uplink transmissions 2224 and regular downlink transmissions 2222 on the primary TDD component carrier.

At block 2412, the scheduling entity 2201 may transmit a downlink scheduling grant modification 2218 on the thin control channel 2216 on the primary TDD component carrier. Here, the downlink scheduling grant modification 2218 may instruct the regular users such as the first subordinate entity 2202, having granted time-frequency resources for long-TTI downlink transmissions, to ignore any uplink transmissions during at least one designated short TTI. That is, since the transmissions during that TTI will be LoLat uplink transmissions 2224 from the LoLat user 2204, not directed to the regular user 2202, the data may not be decodable by the regular user 2202 and can be ignored by the regular user 2202 during post-processing of the corresponding long TTI.

Block 2414 represents operations at one or more subordinate entities, such as the LoLat user 2204. That is, in response to the second resource assignment 2214, the LoLat user (i.e., the second subordinate entity 2204) may transmit the LoLat uplink data 2224 utilizing the assigned time-frequency resources on the primary TDD component carrier.

In some examples, the transmission of the downlink scheduling grant modification 2218 at block 2412, and the transmission of the LoLat uplink data 2224 on the primary TDD component carrier at block 2414 (and the corresponding suspension of downlink data transmissions on the primary TDD component carrier, not including any guard time that may be added), may occur simultaneously. While this may violate orthogonality, the regular users may be suitably configured to ignore the information corresponding to the time-frequency resources allocated to the LoLat user 2204 during post-processing, as indicated in the downlink grant modification 2218. In other examples, these transmissions may be at different times, according to the details of a particular implementation. That is, the regular users 2202 may be configured to buffer or cache the contents of the thin control channel 2216 and the primary TDD component carrier, such that the ignoring of data during the designated short TTI(s) may be performed during post-processing by the regular users 2202.

At block 2416, the scheduling entity 2201 may receive the LoLat uplink data 2224 transmitted from the requesting subordinate entity 2204 utilizing the short TTI on the primary TDD component carrier. At block 2418, the scheduling entity 2201 may resume transmitting the regular downlink data 2222 on the primary TDD component carrier, to one or more subordinate entities, such as the regular user 2202 utilizing the long TTI.

By utilizing the above scheme, pairing primary and secondary TDD component carriers, a thin control channel 2216 and thin feedback channel 2208 can enable a scheduling entity to multiplex uplink and downlink data having at least two different data types or categories, for set of subordinate entities.

Figure 25:
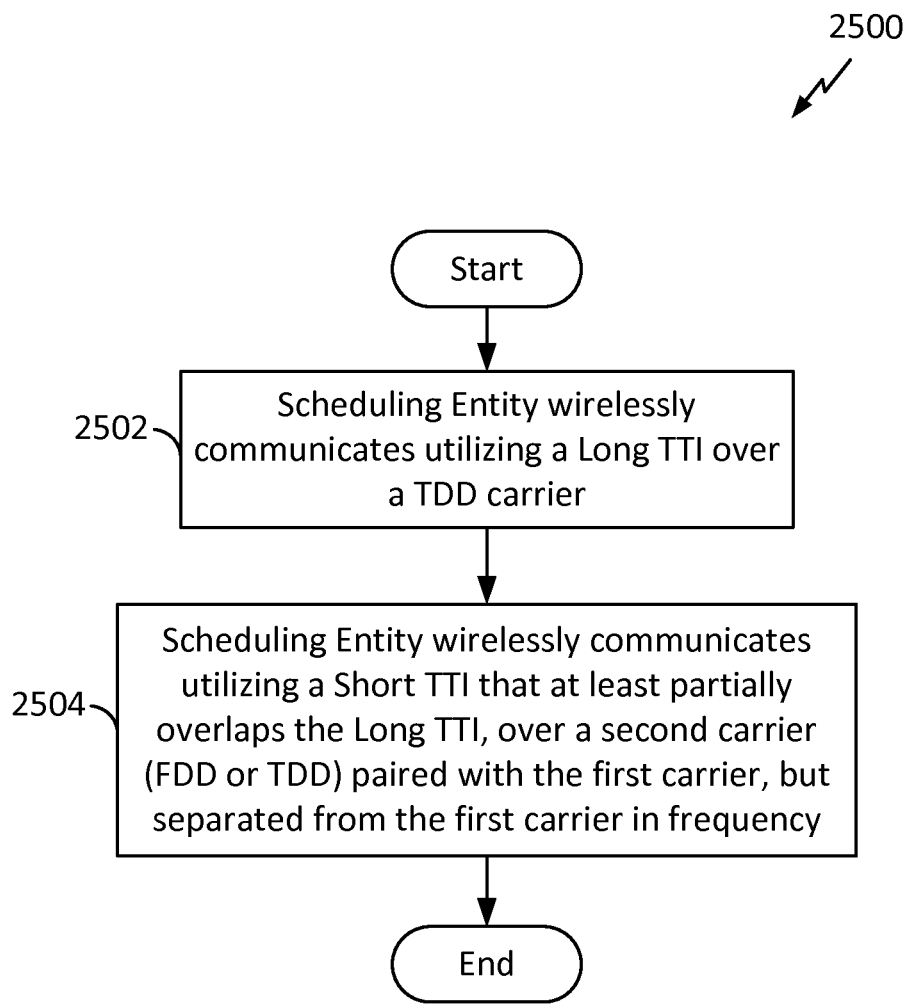
FIG. 25 is a flow chart illustrating an example of wireless communication utilizing a TDD carrier paired with a second carrier, and multiplexing long and short TTIs, according to some embodiments.

Referring now to FIG. 25, a flow chart is provided illustrating an exemplary process 2500 of wireless communication utilizing a TDD carrier paired with a second carrier, and multiplexing long and short TTIs, according to some aspects of the disclosure. In various examples, the process 2500 may be implemented by the scheduling entity 102 illustrated in FIGS. 1 and 2; the scheduling entities 501, 801, 1101, 1601, 1901, or 2201 illustrated in FIGS. 5, 8, 11, 16, 19, and 22, respectively; by a processing system 214 including a processor 204; or by any suitable means for carrying out the described functions.

At block 2502, a scheduling entity 102 may wirelessly communicate with one or more subordinate entities 104 utilizing a first (e.g., long) TTI over a TDD carrier. Here, wirelessly communicating may include transmitting and/or receiving data and/or control information on one or more communication channels, as described above. Further, at block 2504, the scheduling entity 102 may wirelessly communicate utilizing a second (e.g., short) TTI that at least partially overlaps with the long TTI, utilizing a second carrier paired with the first carrier but separated from the first carrier in frequency. Here, the second, paired carrier may be an FDD carrier or a TDD carrier.

Figure 26:
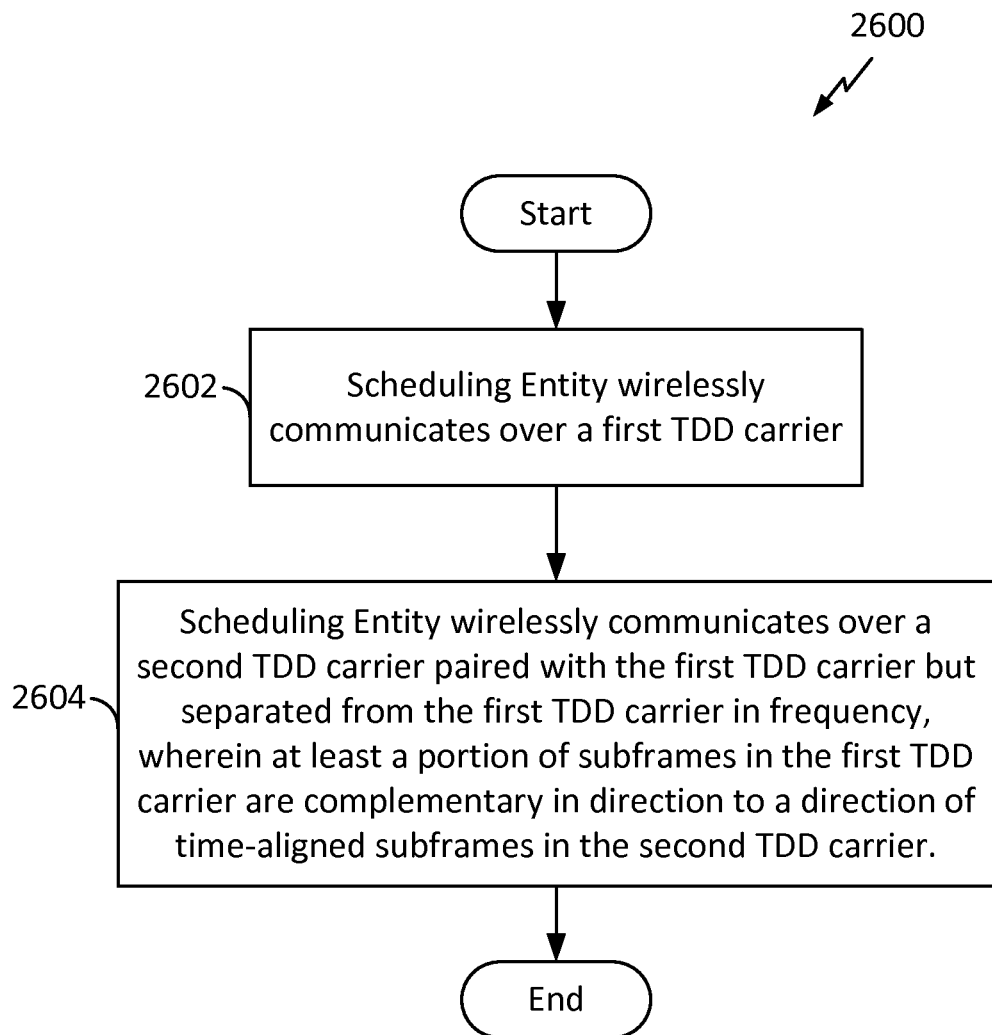
FIG. 26 is a flow chart illustrating an example of wireless communication utilizing a pair of TDD carriers for full duplex communication, according to some embodiments.

Referring now to FIG. 26, flow chart is provided illustrating an exemplary process 2600 of wireless communication utilizing a pair of TDD carriers for full duplex communication, according to some aspects of the disclosure. In various examples, the process 2600 may be implemented by the scheduling entity 102 illustrated in FIGS. 1 and 2; the scheduling entities 501, 801, 1101, 1601, 1901, or 2201 illustrated in FIGS. 5, 8, 11, 16, 19, and 22, respectively; by a processing system 214 including a processor 204; or by any suitable means for carrying out the described functions.

At block 2602, a scheduling entity 102 may wirelessly communicate over a first TDD carrier. Here, wirelessly communicating may include transmitting and/or receiving data and/or control information on one or more communication channels, as described above. Further, at block 2604, the scheduling entity 102 may wirelessly communicate over a second TDD carrier paired with the first TDD carrier, but separated from the first TDD carrier in frequency. Here, at least a portion of time slots in the first TDD carrier may be complementary in direction to a direction of time-aligned time slots in the second TDD carrier. That is, at least one uplink time slot in the first TDD carrier may be time-aligned with a downlink time slot in the second TDD carrier.

As those skilled in the art will readily appreciate, various aspects described throughout this disclosure may be extended to any suitable telecommunication systems, network architectures and communication standards. By way of example, various aspects may be applied to UMTS systems such as W-CDMA, TD-SCDMA, and TD-CDMA. Various aspects may also be applied to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems, including those described by yet-to-be defined wide area network standards. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-26 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1-26 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for."

What is claimed is:

1. A method of wireless communication operable at a subordinate entity, comprising:
   wirelessly communicating with a scheduling entity utilizing a first transmission time interval (TTI) over a first carrier, the first carrier being a time division duplex (TDD) carrier;
   wirelessly communicating with the scheduling entity utilizing a second TTI shorter in duration than the first TTI and overlapping a portion of the first TTI, over a second carrier paired with the first carrier and separated from the first carrier in frequency; and
   receiving a control channel utilizing the second TTI over the second carrier, the control channel comprising information configured to modify data communication on the first carrier utilizing the first TTI with other data communication utilizing the second TTI.

2. The method of claim 1, wherein the second carrier is a frequency division duplex (FDD) carrier.

3. The method of claim 2, further comprising:
   transmitting a scheduling request to the scheduling entity on a feedback channel on the FDD carrier;
   receiving an uplink grant from the scheduling entity on the FDD carrier in response to the scheduling request, the uplink grant configured to identify granted resources on the TDD carrier for an uplink data transmission utilizing the second TTI; and
   transmitting the uplink data to the scheduling entity utilizing the second TTI in accordance with the uplink grant.

4. The method of claim 2, further comprising:
   receiving from the scheduling entity a grant modification via the control channel on the FDD carrier, the grant modification configured to modify an existing grant of resources for an uplink data transmission utilizing the first TTI; and
   driving a zero input to a power amplifier associated with a transceiver to suspend uplink transmissions in accordance with the grant modification.

5. The method of claim 2, further comprising:
   receiving a downlink grant from the scheduling entity on a grant channel on the FDD carrier utilizing the second TTI; and
   receiving downlink data corresponding to the downlink grant from the scheduling entity on the TDD carrier utilizing the second TTI.

6. The method of claim 5, wherein the downlink grant and the downlink data corresponding to the downlink grant are received simultaneous to one another.

7. The method of claim 2, further comprising:
   receiving and buffering a downlink grant from the scheduling entity on a grant channel on the FDD carrier utilizing the second TTI, while transmitting uplink data on the TDD carrier.

8. The method of claim 2, further comprising:
   receiving from the scheduling entity a grant modification via the control channel on the FDD carrier, the grant modification configured to modify an existing grant of resources for downlink data utilizing the first TTI; and
   modifying reception of the downlink data on the TDD carrier utilizing the first TTI in accordance with the grant modification.

9. The method of claim 8, wherein the modifying reception of the downlink data comprises suspending reception of the downlink data during at least one second TTI.

10. The method of claim 1, wherein the second carrier is a TDD carrier having a conjugate pairing with the first carrier, wherein at least a portion of time slots in the first carrier are complementary in direction to a direction of time-aligned time slots in the second carrier.

11. The method of claim 10, further comprising:
    transmitting a scheduling request to a scheduling entity on a feedback channel on the first carrier;
    receiving an uplink grant from the scheduling entity on the second carrier in response to the scheduling request, the uplink grant configured to identify granted resources on the first carrier for an uplink data transmission utilizing the second TTI; and
    transmitting the uplink data to the scheduling entity utilizing the second TTI in accordance with the uplink grant.

12. The method of claim 10, further comprising:
    receiving a grant modification on the second carrier, the grant modification configured to modify an existing grant of resources for an uplink data transmission utilizing the first TTI; and
    modifying the uplink data transmission in accordance with the grant modification.

13. The method of claim 12, wherein the modifying the uplink data comprises suspending transmission of the uplink data.

14. The method of claim 10, further comprising:
    receiving a downlink grant from a scheduling entity on a grant channel on the second carrier utilizing the second TTI; and
    receiving downlink data corresponding to the downlink grant, from the scheduling entity on the first carrier utilizing the second TTI.

15. The method of claim 14, wherein the downlink grant and the downlink data are received simultaneous to one another.

16. The method of claim 10, further comprising:
    receiving and buffering a downlink grant from a scheduling entity on a grant channel on the second carrier utilizing the second TTI, while transmitting uplink data on the first carrier utilizing the first TTI.

17. The method of claim 10, further comprising:
    transmitting a scheduling request to a scheduling entity on a feedback channel on the second carrier;

receiving an uplink grant from the scheduling entity in response to the scheduling request, the uplink grant configured to identify granted resources on the first carrier for an uplink data transmission utilizing the second TTI; and transmitting the uplink data to the scheduling entity utilizing the second TTI on the first carrier in accordance with the uplink grant.

18. The method of claim 17, wherein the grant modification and the downlink data are received simultaneous to one another.

19. The method of claim 10, further comprising:

receiving from the scheduling entity a grant modification on the first carrier, the grant modification configured to modify an existing grant of resources for downlink data utilizing the first TTI; and modifying reception of the downlink data on the second carrier utilizing the first TTI in accordance with the grant modification.

20. The method of claim 19, wherein the modifying reception of the downlink data comprises suspending reception of the downlink data during at least one second TTI.

21. A subordinate entity configured for wireless communication, comprising:

at least one processor;

a non-transitory computer-readable medium communicatively coupled to the at least one processor; and a transceiver communicatively coupled to the at least one processor, wherein the at least one processor is configured to:

utilize the transceiver to wirelessly communicate with a scheduling entity utilizing a first transmission time interval (TTI) over a first carrier, the first carrier being a time division duplex (TDD) carrier;

utilize the transceiver to wirelessly communicate with the scheduling entity utilizing a second TTI shorter in duration than the first TTI and overlapping a portion of the first TTI, over a second carrier paired with the first carrier and separated from the first carrier in frequency; and utilize a control channel of the second carrier to modify data communication on the first carrier utilizing the first TTI with other data communication utilizing the second TTI.

22. The subordinate entity of claim 21, wherein the second carrier is a frequency division duplex (FDD) carrier.

23. The subordinate entity of claim 22, wherein the at least one processor is further configured to:

utilize the transceiver to transmit a scheduling request to the scheduling entity on a feedback channel on the FDD carrier;

utilize the transceiver to receive an uplink grant from the scheduling entity on the FDD carrier in response to the scheduling request, the uplink grant configured to identify granted resources on the TDD carrier for an uplink data transmission utilizing the second TTI; and utilize the transceiver to transmit the uplink data to the scheduling entity utilizing the second TTI in accordance with the uplink grant.

24. The subordinate entity of claim 22, wherein the at least one processor is further configured to:

utilize the transceiver to receive from the scheduling entity a grant modification via the control channel on the FDD carrier, the grant modification configured to modify an existing grant of resources for an uplink data transmission utilizing the first TTI; and drive a zero input to a power amplifier associated with the transceiver to suspend uplink transmissions in accordance with the grant modification.

25. The subordinate entity of claim 22, wherein the at least one processor is further configured to:

utilize the transceiver to receive a downlink grant from the scheduling entity on a grant channel on the FDD carrier utilizing the second TTI; and utilize the transceiver to receive downlink data corresponding to the downlink grant from the scheduling entity on the TDD carrier utilizing the second TTI.

26. The subordinate entity of claim 25, wherein the downlink grant and the downlink data corresponding to the downlink grant are received simultaneous to one another.

27. The subordinate entity of claim 22, wherein the at least one processor is further configured to:

utilize the transceiver to receive a downlink grant from the scheduling entity on a grant channel on the FDD carrier utilizing the second TTI; and buffer the downlink grant while transmitting uplink data on the TDD carrier.

28. The subordinate entity of claim 22, wherein the at least one processor is further configured to:

utilize the transceiver to receive from the scheduling entity a grant modification via the control channel on the FDD carrier, the grant modification configured to modify an existing grant of resources for downlink data utilizing the first TTI; and modify reception of the downlink data on the TDD carrier utilizing the first TTI in accordance with the grant modification.

29. The subordinate entity of claim 28, wherein the at least one processor, being configured to modify reception of the downlink data, is further configured to suspend reception of the downlink data during at least one second TTI.

30. The subordinate entity of claim 21, wherein the second carrier is a TDD carrier having a conjugate pairing with the first carrier, wherein at least a portion of time slots in the first carrier are complementary in direction to a direction of time-aligned time slots in the second carrier.

31. The subordinate entity of claim 30, wherein the at least one processor is further configured to:

utilize the transceiver to transmit a scheduling request to a scheduling entity on a feedback channel on the first carrier;

utilize the transceiver to receive an uplink grant from the scheduling entity on the second carrier in response to the scheduling request, the uplink grant configured to identify granted resources on the first carrier for an uplink data transmission utilizing the second TTI; and utilize the transceiver to transmit the uplink data to the scheduling entity utilizing the second TTI in accordance with the uplink grant.

32. The subordinate entity of claim 30, wherein the at least one processor is further configured to:

utilize the transceiver to receive a grant modification on the second carrier, the grant modification configured to modify an existing grant of resources for an uplink data transmission utilizing the first TTI; and modify the uplink data transmission in accordance with the grant modification.

33. The subordinate entity of claim 32, wherein the at least one processor, being configured to modify the uplink data, is further configured to suspend transmission of the uplink data.

34. The subordinate entity of claim 30, wherein the at least one processor is further configured to:
    utilize the transceiver to receive a downlink grant from a scheduling entity on a grant channel on the second carrier utilizing the second TTI; and
    utilize the transceiver to receive downlink data corresponding to the downlink grant, from the scheduling entity on the first carrier utilizing the second TTI.

35. The subordinate entity of claim 34, wherein the at least one processor is further configured to receive the downlink grant and the downlink data simultaneous to one another.

36. The subordinate entity of claim 30, wherein the at least one processor is further configured to:
    utilize the transceiver to receive a downlink grant from a scheduling entity on a grant channel on the second carrier utilizing the second TTI; and
    buffer the downlink grant while transmitting uplink data on the first carrier utilizing the first TTI.

37. The subordinate entity of claim 30, wherein the at least one processor is further configured to:
    utilize the transceiver to transmit a scheduling request to a scheduling entity on a feedback channel on the second carrier;
    utilize the transceiver to receive an uplink grant from the scheduling entity in response to the scheduling request, the uplink grant configured to identify granted resources on the first carrier for an uplink data transmission utilizing the second TTI; and
    utilize the transceiver to transmit the uplink data to the scheduling entity utilizing the second TTI on the first carrier in accordance with the uplink grant.

38. The subordinate entity of claim 37, wherein the at least one processor is further configured to receive the grant modification and the downlink data simultaneous to one another.

39. The subordinate entity of claim 30, wherein the at least one processor is further configured to:
    utilize the transceiver to receive from the scheduling entity a grant modification on the first carrier, the grant modification configured to modify an existing grant of resources for downlink data utilizing the first TTI; and
    utilize the transceiver to modify reception of the downlink data on the second carrier utilizing the first TTI in accordance with the grant modification.

40. The subordinate entity of claim 39, wherein the at least one processor, being configured to modify reception of the downlink data, is further configured to suspend reception of the downlink data during at least one second TTI.

41. A subordinate entity configured for wireless communication, comprising:
    means for wirelessly communicating with a scheduling entity utilizing a first transmission time interval (TTI) over a first carrier, the first carrier being a time division duplex (TDD) carrier;
    means for wirelessly communicating with the scheduling entity utilizing a second TTI shorter in duration than the first TTI and overlapping a portion of the first TTI, over a second carrier paired with the first carrier and separated from the first carrier in frequency; and
    means for utilizing a control channel of the second carrier to modify data communication on the first carrier utilizing the first TTI with other data communication utilizing the second TTI.

42. The subordinate entity of claim 41, wherein the second carrier is a frequency division duplex (FDD) carrier.

43. The subordinate entity of claim 42, further comprising:
    means for transmitting a scheduling request to the scheduling entity on a feedback channel on the FDD carrier;
    means for receiving an uplink grant from the scheduling entity on the FDD carrier in response to the scheduling request, the uplink grant configured to identify granted resources on the TDD carrier for an uplink data transmission utilizing the second TTI; and
    means for transmitting the uplink data to the scheduling entity utilizing the second TTI in accordance with the uplink grant.

44. The subordinate entity of claim 42, further comprising:
    means for receiving from the scheduling entity a grant modification via the control channel on the FDD carrier, the grant modification configured to modify an existing grant of resources for an uplink data transmission utilizing the first TTI; and
    means for driving a zero input to a power amplifier associated with a transceiver to suspend uplink transmissions in accordance with the grant modification.

45. The subordinate entity of claim 42, further comprising:
    means for receiving a downlink grant from the scheduling entity on a grant channel on the FDD carrier utilizing the second TTI; and
    means for receiving downlink data corresponding to the downlink grant from the scheduling entity on the TDD carrier utilizing the second TTI.

46. The subordinate entity of claim 45, wherein the means for receiving the downlink grant and the means for receiving the downlink data corresponding to the downlink grant are configured to receive the downlink grant and the downlink data simultaneous to one another.

47. The subordinate entity of claim 42, further comprising:
    means for receiving and buffering a downlink grant from the scheduling entity on a grant channel on the FDD carrier utilizing the second TTI while transmitting uplink data on the TDD carrier.

48. The subordinate entity of claim 42, further comprising:
    means for receiving from the scheduling entity a grant modification via the control channel on the FDD carrier, the grant modification configured to modify an existing grant of resources for downlink data utilizing the first TTI; and
    means for modifying reception of the downlink data on the TDD carrier utilizing the first TTI in accordance with the grant modification.

49. The subordinate entity of claim 48, wherein the means for modifying reception of the downlink data is configured for suspending reception of the downlink data during at least one second TTI.

50. The subordinate entity of claim 41, wherein the second carrier is a TDD carrier having a conjugate pairing with the first carrier, wherein at least a portion of time slots in the first carrier are complementary in direction to a direction of time-aligned time slots in the second carrier.

51. The subordinate entity of claim 50, further comprising:
    means for transmitting a scheduling request to a scheduling entity on a feedback channel on the first carrier;
    means for receiving an uplink grant from the scheduling entity on the second carrier in response to the scheduling request, the uplink grant configured to identify granted resources on the first carrier for an uplink data transmission utilizing the second TTI; and means for transmitting the uplink data to the scheduling entity utilizing the second TTI in accordance with the uplink grant.

52. The subordinate entity of claim 50, further comprising:

means for receiving a grant modification on the second carrier, the grant modification configured to modify an existing grant of resources for an uplink data transmission utilizing the first TTI; and means for modifying the uplink data transmission in accordance with the grant modification.

53. The subordinate entity of claim 52, wherein the means for modifying the uplink data are configured for suspending transmission of the uplink data.

54. The subordinate entity of claim 50, further comprising:

means for receiving a downlink grant from a scheduling entity on a grant channel on the second carrier utilizing the second TTI; and means for receiving downlink data corresponding to the downlink grant, from the scheduling entity on the first carrier utilizing the second TTI.

55. The subordinate entity of claim 54, wherein the means for receiving the downlink grant and the means for receiving the downlink data are configured to receive the downlink grant and the downlink data simultaneous to one another.

56. The subordinate entity of claim 50, further comprising:

means for receiving and buffering a downlink grant from a scheduling entity on a grant channel on the second carrier utilizing the second TTI, while transmitting uplink data on the first carrier utilizing the first TTI.

57. The subordinate entity of claim 50, further comprising:

means for transmitting a scheduling request to a scheduling entity on a feedback channel on the second carrier;

means for receiving an uplink grant from the scheduling entity in response to the scheduling request, the uplink grant configured to identify granted resources on the first carrier for an uplink data transmission utilizing the second TTI; and means for transmitting the uplink data to the scheduling entity utilizing the second TTI on the first carrier in accordance with the uplink grant.

58. The subordinate entity of claim 57, wherein the means for receiving the grant modification and the means for receiving the downlink data are configured to receive the grant modification and the downlink data simultaneous to one another.

59. The subordinate entity of claim 50, further comprising:

means for receiving from the scheduling entity a grant modification on the first carrier, the grant modification configured to modify an existing grant of resources for downlink data utilizing the first TTI; and means for modifying reception of the downlink data on the second carrier utilizing the first TTI in accordance with the grant modification.

60. The subordinate entity of claim 59, wherein the means for modifying reception of the downlink data are configured for suspending reception of the downlink data during at least one second TTI.

61. A non-transitory computer-readable medium storing computer-executable code on a subordinate entity comprising at least one processor configured for wireless communication, comprising:

instructions for causing a computer to wirelessly communicate with a scheduling entity utilizing a first transmission time interval (TTI) over a first carrier, the first carrier being a time division duplex (TDD) carrier;

instructions for causing a computer to wirelessly communicate with the scheduling entity utilizing a second TTI shorter in duration than the first TTI and at least partially overlapping the first TTI, over a second carrier paired with the first carrier and separated from the first carrier in frequency; and instructions for causing a computer to utilize a control channel of the second carrier to modify data communication on the first carrier utilizing the first TTI with other data communication utilizing the second TTI.

62. The computer-readable medium of claim 61, wherein the second carrier is a frequency division duplex (FDD) carrier.

63. The computer-readable medium of claim 62, further comprising:

instructions for causing a computer to transmit a scheduling request to the scheduling entity on a feedback channel on the FDD carrier;

instructions for causing a computer to receive an uplink grant from the scheduling entity on the FDD carrier in response to the scheduling request, the uplink grant configured to identify granted resources on the TDD carrier for an uplink data transmission utilizing the second TTI; and instructions for causing a computer to transmit the uplink data to the scheduling entity utilizing the second TTI in accordance with the uplink grant.

64. The computer-readable medium of claim 62, further comprising:

instructions for causing a computer to receive from the scheduling entity a grant modification via the control channel on the FDD carrier, the grant modification configured to modify an existing grant of resources for an uplink data transmission utilizing the first TTI; and instructions for causing a computer to drive a zero input to a power amplifier associated with a transceiver to suspend uplink transmissions in accordance with the grant modification.

65. The computer-readable medium of claim 62, further comprising:

instructions for causing a computer to receive a downlink grant from the scheduling entity on a grant channel on the FDD carrier utilizing the second TTI; and instructions for causing a computer to receive downlink data corresponding to the downlink grant from the scheduling entity on the TDD carrier utilizing the second TTI.

66. The computer-readable medium of claim 65, wherein the instructions for causing a computer to receive a downlink grant and the instructions for causing a computer to receive downlink data corresponding to the downlink grant are configured to receive the downlink grant and the downlink data simultaneous to one another.

67. The computer-readable medium of claim 62, further comprising:

instructions for causing a computer to receive and buffer a downlink grant from the scheduling entity on a grant channel on the FDD carrier utilizing the second TTI, while transmitting uplink data on the TDD carrier.

68. The computer-readable medium of claim 62, further comprising:
instructions for causing a computer to receive from the scheduling entity a grant modification via the control channel on the FDD carrier, the grant modification configured to modify an existing grant of resources for downlink data utilizing the first TTI; and
instructions for causing a computer to modify reception of the downlink data on the TDD carrier utilizing the first TTI in accordance with the grant modification.

69. The computer-readable medium of claim 68, wherein the instructions for causing a computer to modify reception of the downlink data are further configured for suspending reception of the downlink data during at least one second TTI.

70. The computer-readable medium of claim 61, wherein the second carrier is a TDD carrier having a conjugate pairing with the first carrier, wherein at least a portion of time slots in the first carrier are complementary in direction to a direction of time-aligned time slots in the second carrier.

71. The computer-readable medium of claim 70, further comprising:
instructions for causing a computer to transmit a scheduling request to a scheduling entity on a feedback channel on the first carrier;
instructions for causing a computer to receive an uplink grant from the scheduling entity on the second carrier in response to the scheduling request, the uplink grant configured to identify granted resources on the first carrier for an uplink data transmission utilizing the second TTI; and
instructions for causing a computer to transmit the uplink data to the scheduling entity utilizing the second TTI in accordance with the uplink grant.

72. The computer-readable medium of claim 70, further comprising:
instructions for causing a computer to receive a grant modification on the second carrier, the grant modification configured to modify an existing grant of resources for an uplink data transmission utilizing the first TTI; and
instructions for causing a computer to modify the uplink data transmission in accordance with the grant modification.

73. The computer-readable medium of claim 72, wherein the instructions for causing a computer to modify the uplink data are further configured for suspending transmission of the uplink data.

74. The computer-readable medium of claim 70, further comprising:
instructions for causing a computer to receive a downlink grant from a scheduling entity on a grant channel on the second carrier utilizing the second TTI; and
instructions for causing a computer to receive downlink data corresponding to the downlink grant, from the scheduling entity on the first carrier utilizing the second TTI.

75. The computer-readable medium of claim 74, wherein the instructions for causing a computer to receive a downlink grant and the instructions for causing a computer to receive downlink data are configured to receive the downlink grant and the downlink data simultaneous to one another.

76. The computer-readable medium of claim 70, further comprising:
instructions for causing a computer to receive and buffer a downlink grant from a scheduling entity on a grant channel on the second carrier utilizing the second TTI, while transmitting uplink data on the first carrier utilizing the first TTI.

77. The computer-readable medium of claim 70, further comprising:
instructions for causing a computer to transmit a scheduling request to a scheduling entity on a feedback channel on the second carrier;
instructions for causing a computer to receive an uplink grant from the scheduling entity in response to the scheduling request, the uplink grant configured to identify granted resources on the first carrier for an uplink data transmission utilizing the second TTI; and
instructions for causing a computer to transmit the uplink data to the scheduling entity utilizing the second TTI on the first carrier in accordance with the uplink grant.

78. The computer-readable medium of claim 77, wherein the instructions for causing a computer to receive a grant modification and the instructions for causing a computer to receive downlink data are configured to receive the grant modification and the downlink data simultaneous to one another.

79. The computer-readable medium of claim 70, further comprising:
instructions for causing a computer to receive from the scheduling entity a grant modification on the first carrier, the grant modification configured to modify an existing grant of resources for downlink data utilizing the first TTI; and
instructions for causing a computer to modify reception of the downlink data on the second carrier utilizing the first TTI in accordance with the grant modification.

80. The computer-readable medium of claim 79, wherein the instructions for causing a computer to modify reception of the downlink data are further configured for suspending reception of the downlink data during at least one second TTI.

* * * * *